US012746575B2

(12) United States Patent
Sung et al.

(10) Patent No.: US 12,746,575 B2
(45) Date of Patent: Sep. 29, 2026

(54) APPARATUS AND DISPLAY APPARATUS WITH ENHANCED VIBRATION

(71) Applicant: LG Display Co., Ltd., Seoul (KR)

(72) Inventors: Seunghyun Sung, Paju-si (KR); Yong-Su Ham, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 977 days.

(21) Appl. No.: 17/992,195

(22) Filed: Nov. 22, 2022

(65) Prior Publication Data

US 2023/0211376 A1 Jul. 6, 2023

(30) Foreign Application Priority Data

Dec. 31, 2021 (KR) ........................ 10-2021-0194789

(51) Int. Cl.

*B06B 1/00* (2006.01)
*B06B 1/06* (2006.01)
*H04R 1/28* (2006.01)
*H04R 17/00* (2006.01)

(52) U.S. Cl.

CPC .......... *B06B 1/0622* (2013.01); *H04R 1/2811* (2013.01); *H04R 17/005* (2013.01); *H04R 2499/15* (2013.01)

(58) Field of Classification Search

CPC . B06B 1/0622; B06B 2201/56; B06B 1/0692; B06B 1/0696; B06B 1/0629; B06B 1/0607; H04R 1/2811; H04R 17/005; H04R 2499/15; H04R 5/02; H04R 2440/05; H04R 2499/13; H04R 17/00; H04R 7/045; H04R 9/02; H04R 9/06; H04R 7/04; H10H 20/85; H10K 59/00

See application file for complete search history.

(56) References Cited

U.S. PATENT DOCUMENTS

| | | | | |
|---|---|---|---|---|
| 2011/0291530 | A1 | 12/2011 | Koizumi et al. | |
| 2014/0367191 | A1 | 12/2014 | Grez et al. | |
| 2017/0195798 | A1 * | 7/2017 | Makino .................... | H04R 1/06 |
| 2019/0182572 | A1 | 6/2019 | Kim | |

(Continued)

FOREIGN PATENT DOCUMENTS

| | | | |
|---|---|---|---|
| CN | 105637898 | A | 6/2016 |
| CN | 111381672 | A | 7/2020 |

(Continued)

OTHER PUBLICATIONS

Office Action dated Jul. 31, 2025 issued in corresponding Chinese Patent Application No. 202211484289.X.

(Continued)

*Primary Examiner* — Julio C. Gonzalez

(74) *Attorney, Agent, or Firm* — Morgan, Lewis & Bockius LLP

(57) ABSTRACT

An apparatus may include a vibration member and a vibration apparatus provided at a rear surface of the vibration member to vibrate the vibration member. The vibration apparatus may include at least one or more first vibration portions and a plurality of second vibration portions different from the at least one or more first vibration portions. The at least one or more first vibration portions may be at a periphery of, or may be adjacent to, the plurality of second vibration portions.

30 Claims, 20 Drawing Sheets

(56) References Cited

U.S. PATENT DOCUMENTS

| | | | | |
|---|---|---|---|---|
| 2019/0182573 | A1* | 6/2019 | Shin | G06F 1/1605 |
| 2020/0213699 | A1* | 7/2020 | You | H04R 1/028 |
| 2020/0213768 | A1 | 7/2020 | Lee et al. | |
| 2020/0314556 | A1 | 10/2020 | Lee et al. | |
| 2020/0319842 | A1 | 10/2020 | Wagatsuma et al. | |
| 2021/0183966 | A1 | 6/2021 | Kho et al. | |
| 2021/0193901 | A1 | 6/2021 | Umezawa et al. | |
| 2021/0200265 | A1 | 7/2021 | Ko et al. | |
| 2021/0306741 | A1* | 9/2021 | Kim | H04R 1/403 |
| 2021/0352390 | A1 | 11/2021 | Lee et al. | |
| 2022/0109098 | A1 | 4/2022 | Fujikata | |

FOREIGN PATENT DOCUMENTS

| | | | | |
|---|---|---|---|---|
| CN | 111383563 | A | 7/2020 | |
| CN | 113038334 | A | 6/2021 | |
| CN | 113467634 | A | 10/2021 | |
| EP | 3890349 | A1 | 10/2021 | |
| JP | 2002-44785 | A | 2/2002 | |
| JP | 2008-522538 | A | 6/2008 | |
| JP | 2011-251861 | A | 12/2011 | |
| JP | WO 2014/050214 | A1 | 4/2014 | |
| JP | 5883201 | B1 | 3/2016 | |
| JP | 2020-109933 | A | 7/2020 | |
| JP | 2020-171013 | A | 10/2020 | |
| JP | 2021-164165 | A | 10/2021 | |
| KR | 10-1323323 | B1 | 10/2013 | |
| WO | 97/16048 | A1 | 5/1997 | |
| WO | WO-2006059856 | A1 * | 6/2006 | H04R 17/00 |
| WO | 2020/121596 | A1 | 6/2020 | |
| WO | 2020/261837 | A1 | 12/2020 | |

OTHER PUBLICATIONS

Examination Report for Application No. GB2217448.6, dated May 22, 2023, 7 pages.

Office Action issued in corresponding Japanese Patent Application No. 2022-201657, dated Jul. 24, 2024.

Office Action dated Jan. 17, 2024 for Japanese Patent Application No. 2022-201657.

* cited by examiner

180: 180A ~ 180L 230: 230A ~ 230D 30-1: 31A ~ 31G 30-2: 30H ~ 30L 30-3: 31M ~ 31P 30: 30-1 ~ 30-3

180D: 180D1 ~ 180D4 180B: 180B1 ~ 180B3 180E: 180E1 ~ 180E3 230B: 230B1 ~ 230B4 : WS

APPARATUS AND DISPLAY APPARATUS WITH ENHANCED VIBRATION

CROSS-REFERENCE TO RELATED APPLICATIONS

This application claims the benefit of and priority to Korean Patent Application No. 10-2021-0194789 filed on Dec. 31, 2021, the entirety of which is incorporated herein by reference for all purposes.

BACKGROUND

1. Technical Field

The present disclosure relates to an apparatus and particularly to, for example, without limitation, an apparatus relating to vibration or an apparatus for vibration.

2. Discussion of the Related Art

Apparatuses may include a separate speaker or sound apparatus, for providing a sound. When a speaker is provided in an apparatus, a problem may occur where the design and space arrangement of the apparatus are limited due to a space occupied by the speaker.

A speaker applied to apparatuses may be, for example, an actuator including a magnet and a coil. However, when an actuator is applied to an apparatus, there is a drawback where a thickness is thick. Piezoelectric devices for implementing a thin thickness are thus attracting much attention.

Due to a fragile characteristic, piezoelectric devices are easily damaged upon external impact, causing a problem where the reliability of sound reproduction is low. Further, when a speaker such as a piezoelectric device is applied to a flexible apparatus, there is a problem where damages may occur due to a fragile characteristic.

The description provided in the discussion of the related art section should not be assumed to be prior art merely because it is mentioned in or associated with that section. The discussion of the related art section may include information that describes one or more aspects of the subject technology, and the description in this section does not limit the invention.

SUMMARY

The inventors of the present disclosure have recognized the problems and disadvantages of the related art and have performed extensive research and experiments for implementing a vibration apparatus which may enhance the quality of a sound and may enhance a sound pressure level characteristic. Through the extensive research and experiments, the inventors have invented an apparatus including a new vibration apparatus which may enhance the quality of a sound and may enhance a sound pressure level characteristic. Accordingly, embodiments of the present disclosure are directed to an apparatus that substantially obviates one or more of the problems due to limitations and disadvantages of the related art.

One or more aspects of the present disclosure are to provide an apparatus that may vibrate a vibration member to generate a vibration or a sound and may enhance a sound characteristic and/or a sound pressure level characteristic.

Additional features, advantages, and aspects of the present disclosure are set forth in the present disclosure and will also be apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the appended drawings.

To achieve these and other advantages and aspects of the present disclosure, as embodied and broadly described herein, in one or more aspects, an apparatus according to one or more embodiments of the present disclosure may comprise a vibration member and a vibration apparatus provided on or at a rear surface of the vibration member to vibrate the vibration member. The vibration apparatus may include at least one or more first vibration portions and a plurality of second vibration portions different from the at least one or more first vibration portions, and the at least one or more first vibration portions may be at a periphery of the plurality of second vibration portions.

In one or more aspects of the present disclosure, an apparatus may include an exterior material covering a main structure, an interior material covering one or more of the main structure and the exterior material, and one or more vibration generating apparatuses in or at one or more of the exterior material, the interior material, a region between the main structure and the exterior material, and a region between the main structure and the interior material. The apparatus may include a vibration member. The one or more vibration generating apparatuses may include a vibration apparatus. The vibration apparatus may be provided on or at a rear surface of the vibration member to vibrate the vibration member. The vibration apparatus may include at least one or more first vibration portions and a plurality of second vibration portions which are different from the at least one or more first vibration portions. The at least one or more first vibration portions may be at a periphery of the plurality of second vibration portions. The vibration member may be the exterior material or the interior material. One or more of the exterior material and the interior material may output a sound based on vibrations of the one or more vibration generating apparatuses.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are exemplary and explanatory, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles of the disclosure.

Figure 1:
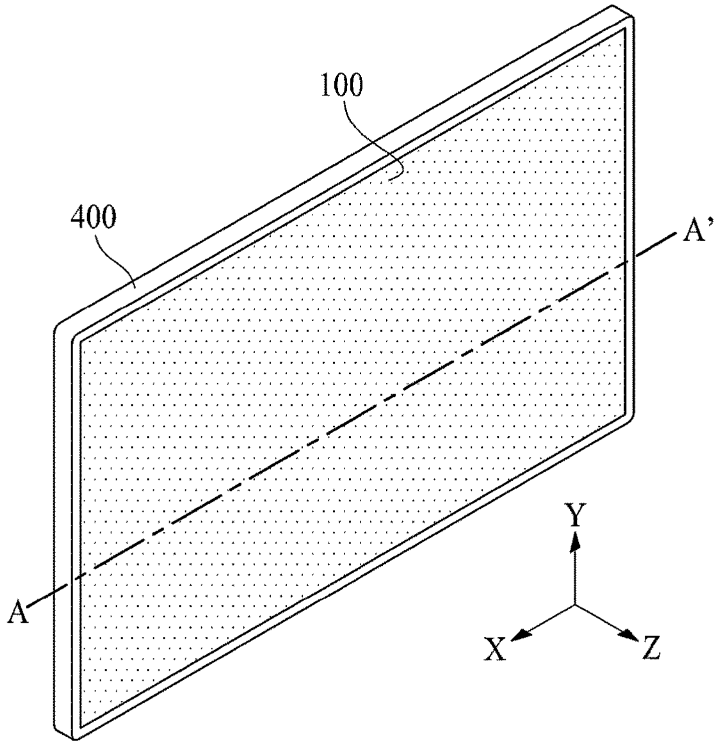
FIG. 1 illustrates an apparatus according to an example embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and convenience.

DETAILED DESCRIPTION

Reference is now made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted for brevity. The progression of processing steps and/or operations described is an example; however, the sequence of steps and/or operations is not limited to that set forth herein and may be changed, with the exception of steps and/or operations necessarily occurring in a particular order.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure.

The shapes, sizes, areas, ratios, angles, numbers, and the like disclosed in the drawings for describing embodiments of the present disclosure are merely examples, and thus, the present disclosure is not limited to the illustrated details.

When the term “comprise,” “have,” “include,” “contain,” “constitute,” “make up of,” “formed of,” or the like is used, one or more other elements may be added unless a term such as “only” or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. The word “exemplary” is used to mean serving as an example or illustration. Embodiments are example embodiments. Aspects are example aspects. Any implementation described herein as an “example” is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, noise, or the like). Further, the term “may” encompasses all the meanings of the term “can.”

In describing a positional relationship, where the positional relationship between two parts is described, for example, using “on,” “over,” “under,” “above,” “below,” “beneath,” “near,” “close to,” “adjacent to,” “beside,” “next to,” or the like, one or more other parts may be located between the two parts unless a more limiting term, such as “immediate(ly),” “direct(ly),” or “close(ly),” is used. For example, when a structure is described as being positioned “on,” “over,” “under,” “above,” “below,” “beneath,” “near,” “close to,” “adjacent to,” “beside,” or “next to” another structure, this description should be construed as including a case in which the structures contact each other as well as a case in which one or more additional structures are disposed or interposed therebetween. Furthermore, the terms “front,” “rear,” “back,” “left,” “right,” “top,” “bottom,” “downward,” “upward,” “upper,” “lower,” “up,” “down,” “column,” “row,” “vertical,” “horizontal,” and the like refer to an arbitrary frame of reference.

In describing a temporal relationship, when the temporal order is described as, for example, “after,” “subsequent,” “next,” “before,” “preceding,” “prior to,” or the like, a case that is not consecutive or not sequential may be included unless a more limiting term, such as “just,” “immediate(ly),” or “direct(ly),” is used.

It is understood that, although the term “first,” “second,” or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. The terms “first,” “second,” and the like may be used to distinguish components from each other, but the functions or structures of the components are not limited by ordinal numbers or component names in front of the components.

In describing elements of the present disclosure, the terms “first,” “second,” “A,” “B,” “(a),” “(b),” or the like may be used. These terms are intended to identify the corresponding element(s) from the other element(s), and these are not used to define the essence, basis, order, or number of the elements.

For the expression that an element or layer is “connected,” “coupled,” or “adhered” to another element or layer, the element or layer can not only be directly connected, coupled, or adhered to another element or layer, but also be indirectly connected, coupled, or adhered to another element or layer with one or more intervening elements or layers disposed or interposed between the elements or layers, unless otherwise specified.

For the expression that an element or layer “contacts,” “overlaps,” or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

The terms such as a “line” or “direction” should not be interpreted only based on a geometrical relationship in which the respective lines or directions are parallel or perpendicular to each other, and may be meant as lines or directions having wider directivities within the range within which the components of the present disclosure can operate functionally.

The term “at least one” should be understood as including any and all combinations of one or more of the associated listed items. For example, the meaning of “at least one of a first item, a second item, and a third item” denotes the combination of items proposed from two or more of the first item, the second item, and the third item as well as only one of the first item, the second item, or the third item.

The expression of a first element, a second elements “and/or” a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression “element A/element B” may be understood as element A and/or element B.

In one or more aspects, the terms “between” and “among” may be used interchangeably simply for convenience unless stated otherwise. For example, an expression “between a plurality of elements” may be understood as among a plurality of elements. In another example, an expression “among a plurality of elements” may be understood as between a plurality of elements. In one or more examples, the number of elements may be two. In one or more examples, the number of elements may be more than two.

In one or more aspects, the phrases “each other” and “one another” may be used interchangeably simply for convenience unless stated otherwise. For example, an expression “different from each other” may be understood as being different from one another. In another example, an expression “different from one another” may be understood as being different from each other. In one or more examples, the number of elements involved in the foregoing expression may be two. In one or more examples, the number of elements involved in the foregoing expression may be more than two.

In one or more aspects, the phrases “one or more among” and “one or more of” may be used interchangeably simply for convenience unless stated otherwise. In one or more aspects, unless stated otherwise, the term “nth” or “$n^{th}$” may refer to “nnd” or “$n^{nd}$” (e.g., 2nd where n is 2), or “nrd” or “$n^{rd}$” (e.g., 3rd where n is 3), and n may be a natural number.

An apparatus according to one or more example embodiments of the present disclosure may include a display apparatus such as a liquid crystal display (LCD) device or an organic light emitting display (OLED) device including a display panel and a driver for driving the display panel. In addition, the apparatus may include a set device (or a set apparatus) or a set electronic device such as a notebook computer, a television (TV), a computer monitor, an equipment apparatus including an automotive apparatus or another type of apparatus for vehicles, or a mobile electronic device such as a smartphone or an electronic pad, which is a complete product (or a final product) including an LCD or an OLED.

Therefore, in one or more embodiments of the present disclosure, examples of the apparatus may include a display apparatus itself, such as an LCD or an OLED, and a set device which is a final consumer device or an application product including the LCD or the OLED.

In one or more example embodiments, an LCD or an OLED including a display panel and a driver may be referred to as a display apparatus, and an electronic device which is a final product including an LCD or an OLED may be referred to as a set device. For example, the display apparatus may include a display panel, such as an LCD or an OLED, and a source printed circuit board (PCB) which is a controller for driving the display panel. The set device may further include a set PCB which is a set controller electrically connected to the source PCB to control the set device.

A display panel applied to an embodiment of the present disclosure may use all types of display panels such as a liquid crystal display panel, an organic light emitting diode (OLED) display panel, and an electroluminescent display panel, but is not limited to a specific display panel which is vibrated by a sound generating apparatus according to an example embodiment of the present disclosure to output a sound. Further, a shape or a size of a display panel applied to a display apparatus according to an example embodiment of the present disclosure is not limited.

For example, when the display panel is a liquid crystal display panel, the display panel may include a plurality of gate lines, a plurality of data lines, and a plurality of pixels provided in a plurality of intersection areas defined by the gate lines and the data lines. In addition, the display panel may include an array substrate which includes a thin film transistor (TFT) which is a switching element for adjusting a light transmittance of each pixel, an upper substrate which includes a color filter and/or a black matrix, and a liquid crystal layer which is formed between the array substrate and the upper substrate.

When the display panel is an organic light emitting display panel, the display panel may include a plurality of gate lines, a plurality of data lines, and a plurality of pixels respectively provided in a plurality of pixel areas defined by intersections of the gate lines and the data lines. In addition, the display panel may include an array substrate including a thin film transistor (TFT) which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Moreover, a layer provided on the array substrate may include an inorganic light emitting layer (for example, a nano-sized material layer, a quantum dot, or the like). As another example, the layer provided on the array substrate may include a micro light emitting diode.

The display panel may further include a backing such as a metal plate attached on or at the display panel. However, the present embodiment is not limited to the metal plate, and the display panel may include another structure (for example, another structure including another or different material).

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

Figure 2:
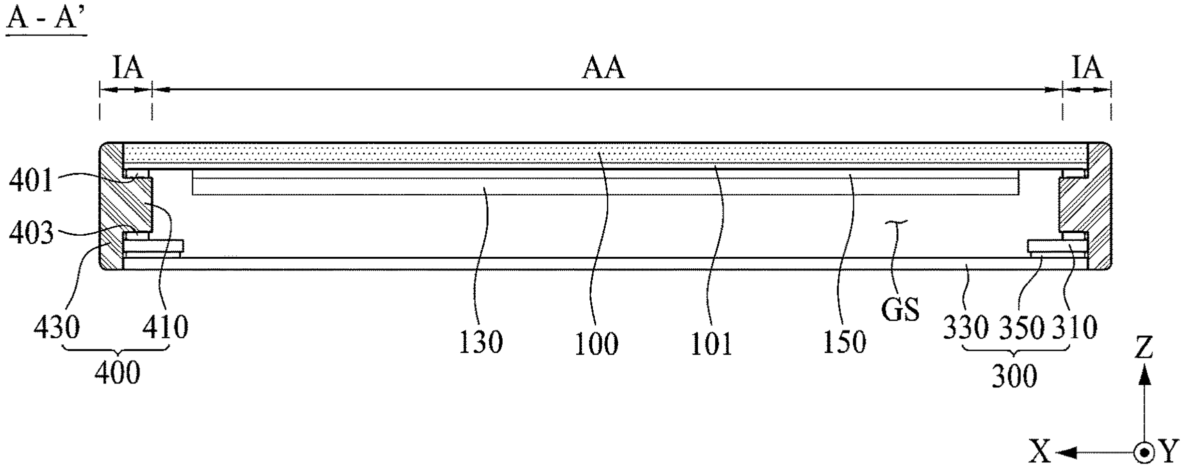
FIG. 2 is an example of a cross-sectional view taken along line A-A' of FIG. 1.

FIG. 1 illustrates an apparatus according to an example embodiment of the present disclosure. FIG. 2 is an example of a cross-sectional view taken along line A-A' of FIG. 1.

Referring to FIGS. 1 and 2, the apparatus according to an example embodiment of the present disclosure may include a vibration member 100 and a vibration apparatus 130 which is disposed at a rear surface (or a backside surface) of the vibration member 100. For example, the vibration member 100 may be a passive vibration member, a vibration object, a display panel, a vibration plate, or a front member, but embodiments of the present disclosure are not limited thereto. Hereinafter, one or more embodiments where a vibration member is a display panel will be described. The vibration member 100 may have a first surface facing or exposed to an exterior of the apparatus and a second surface facing an interior of the apparatus. As used herein, references to the vibration apparatus 130 being disposed on the rear surface of the vibration member 100 may refer to the vibration apparatus 130 being disposed on the second surface of the vibration member 100, either directly on the second surface or with one or more further components therebetween.

The vibration member 100 according to an example embodiment of the present disclosure may be a display panel which displays an image. The display panel may display an image (for example, an electronic image, a digital image, a still image, or a video image). For example, the display panel may emit light to display an image. The display panel may be a curved display panel or all types of display panels such as a liquid crystal display panel, an organic light emitting display panel, a quantum dot light emitting display panel, a micro light emitting diode display panel, and an electrophoresis display panel. The display panel may be a flexible display panel. For example, the display panel may be a flexible light emitting display panel, a flexible electrophoresis display panel, a flexible electro-wetting display panel, a flexible micro light emitting diode display panel, or a flexible quantum dot light emitting display panel.

The display panel according to an example embodiment of the present disclosure may include a display area AA which displays an image based on driving of a plurality of pixels. Furthermore, the display panel may include a non-display area IA which surrounds the display area AA, but embodiments of the present disclosure are not limited thereto.

The display panel according to an example embodiment of the present disclosure may include an anode electrode, a cathode electrode, and a light emitting device and may display an image of a type such as a top emission type, a bottom emission type, or a dual emission type, based on a structure of a pixel array layer including a plurality of pixels. For the top emission type, visible light emitted from the pixel array layer may be irradiated in a forward direction of a base substrate to allow an image to be displayed, and for the bottom emission type, the visible light emitted from the pixel array layer may be irradiated in a rearward direction of the base substrate to allow an image to be displayed.

The display panel according to an example embodiment of the present disclosure may include a pixel array portion provided in a pixel area configured by a plurality of gate lines and/or a plurality of data lines. The pixel array portion may include a plurality of pixels which display an image based on a signal supplied through each of signal lines. The signal lines may include a gate line, a data line, and a pixel driving power line, but embodiments of the present disclosure are not limited thereto.

Each of the plurality of pixels may include a pixel circuit layer including a driving thin film transistor (TFT) provided in a pixel area, an anode electrode electrically connected to the driving TFT, a light emitting device formed on the anode electrode, and a cathode electrode electrically connected to the light emitting device.

The driving TFT may be provided in a transistor region of each pixel area provided at a substrate. The driving TFT may include a gate electrode, a gate insulation layer, a semiconductor layer, a source electrode, and a drain electrode. The semiconductor layer of the driving TFT may include silicon such as amorphous silicon (a-Si), polysilicon (poly-Si), or low temperature poly-Si or may include oxide such as indium-gallium-zinc-oxide (IGZO), but embodiments of the present disclosure are not limited thereto.

The anode electrode (or a pixel electrode) may be provided in an opening region provided in each pixel area and may be electrically connected to the driving TFT.

The light emitting device according to an example embodiment of the present disclosure may include a light emitting device layer provided on the anode electrode. The light emitting device layer may be implemented so that pixels emit light of the same color (for example, white light) or emit lights of different colors (for example, red light, green light, and blue light). The cathode electrode (or a common electrode) may be connected to the light emitting device layer provided in each pixel area. For example, the light emitting device layer may have a stack structure including two or more structures or a single structure including the same color.

In another embodiment of the present disclosure, the light emitting device layer may have a stack structure including two or more structures including one or more different colors for each pixel. Two or more structures including one or more different colors may be configured in one or more of blue, red, yellow-green, and green, or a combination thereof, but embodiments of the present disclosure are not limited thereto. An example of the combination may include blue and red, red and yellow-green, red and green, and red/yellow-green/green, but embodiments of the present disclosure are not limited thereto. Further, regardless of a stack order thereof, the combination may be applied. A stack structure including two or more structures having the same color or one or more different colors may further include a charge generating layer between two or more structures. The charge generating layer may have a PN junction structure and may include an N-type charge generating layer and a P-type charge generating layer.

According to another example embodiment of the present disclosure, the light emitting device may include a micro light emitting diode device which is electrically connected to each of the anode electrode and the cathode electrode. The micro light emitting diode device may be a light emitting diode implemented as an integrated circuit (IC) type or a chip type. The micro light emitting diode device may include a first terminal electrically connected to the anode electrode and a second terminal electrically connected to the cathode electrode. The cathode electrode may be connected to the second terminal of the micro light emitting diode device provided in each pixel area.

An encapsulation portion may be formed on the substrate to surround the pixel array portion, and thus, may prevent oxygen or water from penetrating into the light emitting device layer of the pixel array portion. The encapsulation portion according to an example embodiment of the present disclosure may be formed in a multi-layer structure where an organic material layer and an inorganic material layer are alternately stacked, but embodiments of the present disclosure are not limited thereto. The inorganic material layer may prevent oxygen or water from penetrating into the light emitting device layer of the pixel array portion. The organic material layer may be formed to have a thickness which is relatively thicker than that of the inorganic material layer, so as to cover particles occurring in a manufacturing process. For example, the encapsulation portion may include a first inorganic layer, an organic layer on the first inorganic layer, and a second inorganic layer on the organic layer. The organic layer may be a particle covering layer, but embodiments of the present disclosure are not limited thereto. A touch panel may be disposed at or on the encapsulation portion, or may be disposed at or on a rear surface of the pixel array portion or in the pixel array portion.

The display panel according to an example embodiment of the present disclosure may include a first substrate, a second substrate, and a liquid crystal layer. The first substrate may be an upper substrate or a TFT array substrate. For example, the first substrate may include a pixel array (or a display portion or a display area) including a plurality of pixels provided in a pixel area configured by the plurality of gate lines and/or the plurality of data lines. Each of the plurality of pixels may include a TFT connected to a gate line and/or a data line, a pixel electrode connected to the TFT, and a common electrode which is formed to be adjacent to the pixel electrode and is supplied with a common voltage.

The first substrate may further include a pad portion provided at a first edge (or a non-display portion or a first periphery) thereof and a gate driving circuit provided at a second edge (or a second non-display portion or a second periphery) thereof.

The pad portion may supply a signal, supplied from the outside, to the pixel array portion and/or the gate driving circuit. For example, the pad portion may include a plurality of data pads connected to the plurality of data lines through a plurality of data link lines and/or a plurality of gate input pads connected to the gate driving circuit through a gate control signal line. For example, a size of the first substrate may be greater than that of the second substrate, but embodiments of the present disclosure are not limited thereto.

The gate driving circuit may be embedded (or integrated) into the second edge (or the second periphery) of the first substrate so as to be connected to the plurality of gate lines. For example, the gate driving circuit may be implemented with a shift register including a transistor formed by the same process as a TFT provided in the pixel area. According to another example embodiment of the present disclosure, the gate driving circuit may not be embedded into the first substrate and may be provided in a panel driving circuit in an IC type.

The second substrate may be a lower substrate or a color filter array substrate. For example, the second substrate may include a pixel pattern (or a pixel definition pattern) capable of including an opening region overlapping the pixel arear formed in the first substrate and a color filter layer formed in the opening region. The second substrate may have a size which is less than that of the first substrate, but embodiments of the present disclosure are not limited thereto. The second substrate may overlap the other portion, except the first edge (or the first periphery), of the first substrate. The second substrate may be bonded (or attached) to the other portion, except the first edge (or the first periphery), of the first substrate by a sealant with the liquid crystal layer therebetween.

The liquid crystal layer may be disposed between the first substrate and the second substrate. The liquid crystal layer may include liquid crystal where an alignment direction of liquid crystal molecules is changed based on an electrical field generated by the common voltage and a data voltage applied to the pixel electrode for each pixel.

A second polarization member may be attached on a bottom surface (or a lower surface) of the second substrate and may polarize light which is incident from a backlight and travels to the liquid crystal layer. The first polarization member may be attached on a top surface (or an upper surface) of the first substrate and may polarize light which passes through the first substrate and is discharged to the outside.

The display panel according to an example embodiment of the present disclosure may drive the liquid crystal layer with the electrical field which is generated by the common voltage and the data voltage applied to each pixel, thereby displaying an image based on light passing through the liquid crystal layer.

In the display panel according to another example embodiment of the present disclosure, the first substrate may be a color filter array substrate, and the second substrate may be a TFT array substrate. For example, the display panel according to another example embodiment of the present disclosure may have a form where the display panel according to an example embodiment of the present disclosure is vertically reversed. In this case, a pad portion of the display panel according to another example embodiment of the present disclosure may be covered by a separate mechanism (or structure).

The display panel according to another example embodiment of the present disclosure may include a bending portion which is bent or curved to have a certain curvature radius or a curved shape.

The bending portion of the display panel may be implemented at one or more of one edge portion (or one periphery portion) and the other edge portion (or the other periphery portion) of the display panel parallel to each other. The one edge portion (or one periphery portion) and the other edge portion (or the other periphery portion) of the display panel implementing the bending portion may include only the non-display area IA, or may include an edge portion (or a periphery portion) of the display area AA and the non-display area IA. The display panel including a bending portion implemented by bending of the non-display area IA may have a one-side bezel bending structure or a both-side bezel bending structure. Further, the display panel including the edge portion (or the periphery portion) of the display area AA and the bending portion implemented by bending of the non-display area IA may have a one-side active bending structure or a both-side active bending structure.

According to another example embodiment of the present disclosure, the vibration member 100 may include one or more of metal, wood, plastic, glass, cloth, fiber, rubber, paper, a mirror, and leather, but embodiments of the present disclosure are not limited thereto. For example, the paper may be cone paper for speakers. For example, the cone paper may be pulp or foam plastic, but embodiments of the present disclosure are not limited thereto.

For example, the vibration member 100 may include a display panel including a plurality of pixels which display an image and/or may be (or may include) one or more of an interior material of a vehicle, a window of a vehicle, an indoor ceiling of a building, a window of a building, an interior material of a building, an interior material of an aircraft, and a window of an aircraft, but embodiments of the present disclosure are not limited thereto. For example, the vibration member 100 may include one or more of a display panel including a plurality of pixels configured to display an image, a screen panel on which an image is to be projected from a display apparatus, a lighting panel, a signage panel, a vehicular interior material, a vehicular window (e.g., a vehicular glass window), a vehicular exterior material, a ceiling material of a building, an interior material of a building, a window of a building, and a mirror, but embodiments of the present disclosure are not limited thereto. For example, the display panel may be a flexible display panel. For example, the display panel may be a flexible light emitting display panel, a flexible electrophoresis display panel, a flexible electro-wetting display panel, a flexible micro light emitting diode display panel, or a flexible quantum dot light emitting display panel, but embodiments of the present disclosure are not limited thereto. For example, the non-display panel may be a light emitting diode lighting panel (or apparatus), an organic light emitting diode lighting panel (or apparatus), or an inorganic light emitting diode lighting panel (or apparatus), but embodiments of the present disclosure are not limited thereto. For example, the vibration member 100 (or a vibration object) may include a display panel including a plurality of pixels configured to display an image, or may be (or may include) one or more of a light emitting diode lighting panel (or apparatus), an organic light emitting diode lighting panel (or apparatus), or an inorganic light emitting diode lighting panel (or apparatus), but embodiments of the present disclosure are not limited thereto.

The vibration apparatus 130 may vibrate the vibration member 100. For example, the vibration apparatus 130 may be implemented on a rear surface of the vibration member 100 to directly vibrate the vibration member 100. For example, the vibration apparatus 130 may vibrate the vibration member 100 at the rear surface of the vibration member 100, and thus, may provide a user with a sound and/or a haptic feedback based on a vibration of the vibration member 100. For example, the vibration member 100 may output a sound based on a vibration of the vibration apparatus 130. The vibration apparatus 130 may output a sound by the vibration member 100 as a vibration plate. For example, the vibration apparatus 130 may output a sound toward a front surface of the vibration member 100 by the vibration member 100 as a vibration plate. For example, the vibration apparatus 130 may generate a sound so that the sound travels toward the front surface of each of the display panel or the vibration member 100. The vibration apparatus 130 may vibrate the vibration member 100 to output a sound. For example, the vibration apparatus 130 may directly vibrate the vibration member 100 to output a sound. For example, the vibration member 100 may be (or may include) a vibration object, a vibration plate, or a front member, but embodiments of the present disclosure are not limited thereto.

According to an example embodiment of the present disclosure, the vibration apparatus 130 may vibrate based on a vibration driving signal synchronized with an image displayed by the display panel which is the vibration member 100, thereby vibrating the display panel. According to another example embodiment of the present disclosure, the vibration apparatus 130 may vibrate based on a haptic feedback signal (or a tactile feedback signal) synchronized with a user touch applied to a touch panel (or a touch sensor layer) which is disposed on the display panel or embedded into the display panel, and thus, may vibrate the display panel. Accordingly, the display panel may vibrate based on a vibration of the vibration apparatus 130 to provide a user (or a viewer) with one or more of a sound and a haptic feedback.

The vibration apparatus 130 according to an example embodiment of the present disclosure may be implemented to have a size corresponding to the vibration member 100 or the display area AA of the display panel. A size of the vibration apparatus 130 may be 0.9 to 1.1 times a size of the vibration member 100 or the display area AA, but embodiments of the present disclosure are not limited thereto. For example, a size of the vibration apparatus 130 may be less than or equal to that of the vibration member 100 or the display area AA. For example, a size of the vibration apparatus 130 may be equal to or almost equal to that of the vibration member 100 or the display area AA of the display panel, and thus, may cover a large region of the display panel or the vibration member 100 and a vibration generated by the vibration apparatus 130 may vibrate a whole (or entire) region of the display panel or the vibration member 100, thereby enhancing satisfaction of a user and increasing a sense of localization of a sound. Furthermore, a contact area (or a panel coverage) between the display panel or the vibration member 100 and the vibration apparatus 130 may increase, and thus, a vibration region of the display panel or the vibration member 100 may increase, thereby enhancing a sound of a middle-low-pitched sound band generated based on a vibration of the display panel or the vibration member 100. Moreover, the vibration apparatus 130 applied to a large-sized apparatus may vibrate all of the display panel or the vibration member 100 having a large size (or a large area), and thus, a sense of localization of a sound based on a vibration of the display panel or the vibration member 100 may be further enhanced, thereby realizing an enhanced sound effect. Accordingly, the vibration apparatus according to an example embodiment of the present disclosure may be disposed at or on the rear surface of the display panel or the vibration member 100 to sufficiently vibrate the display panel or the vibration member 100 in a vertical (or forward and rearward) direction, thereby outputting a desired sound in a forward direction of the apparatus.

The vibration apparatus 130 may be implemented as a film type, and thus, may have a thickness which is thinner than the display panel or the vibration member 100, thereby minimizing an increase in thickness of the apparatus caused by the arrangement of the vibration apparatus 130. For example, the vibration apparatus 130 may use the display panel or the vibration member 100 as a sound vibration plate. For example, the vibration apparatus 130 according to an example embodiment of the present disclosure may be referred to as a vibration generating apparatus, a displacement apparatus, a sound apparatus, a sound generating module, a sound generating apparatus, a film actuator, a film type piezoelectric composite actuator, a film speaker, a film type piezoelectric speaker, or a film type piezoelectric composite speaker, but the terms are not limited thereto. According to another example embodiment of the present disclosure, the vibration apparatus 130 may not be disposed on the rear surface of the display panel and may be applied to a non-display panel instead of the display panel. For example, the vibration apparatus 130 may be applied to one or more of wood, plastic, glass, metal, cloth, fiber, rubber, paper, a mirror, leather, an interior material of a vehicle, a ceiling of a building, and an aircraft, but embodiments of the present disclosure are not limited thereto. In this case, the non-display panel may be applied as a vibration plate, and the vibration apparatus 130 may vibrate the non-display panel to output a sound.

The vibration apparatus 130 according to an example embodiment of the present disclosure may be disposed in or at the rear surface of the display panel or the vibration member 100 to overlap the display area of the display panel or the vibration member 100. For example, the vibration apparatus 130 may overlap a display area, corresponding to half or more, of the display area of the display panel or the vibration member 100. According to another example embodiment of the present disclosure, the vibration apparatus 130 may overlap the whole (or entire) display area of the display panel or all of the vibration member 100.

According to another example embodiment of the present disclosure, the vibration member 100 may include a plate 101. The plate 101 may include a metal material, or may include a single nonmetal material or a composite nonmetal material including one or more of wood, plastic, glass, cloth, fiber, rubber, paper, a mirror, and leather, but embodiments of the present disclosure are not limited thereto.

When an alternating current (AC) voltage is applied, the vibration apparatus 130 according to an example embodiment of the present disclosure may alternately contract and expand based on an inverse piezoelectric effect and may vibrate the vibration member 100 or the display panel based on a vibration. According to an example embodiment of the present disclosure, the vibration apparatus 130 may vibrate based on a voice signal synchronized with an image displayed by the display panel to vibrate the display panel. According to another example embodiment of the present disclosure, the vibration apparatus 130 may vibrate based on a haptic feedback signal (or a tactile feedback signal) synchronized with a user touch applied to a touch panel (or a touch sensor layer) which is disposed on the display panel or embedded into the display panel, and thus, may vibrate the display panel. Accordingly, the display panel may vibrate based on a vibration of the vibration apparatus 130 to provide a user (or a viewer) with one or more of a sound and a haptic feedback.

Therefore, the apparatus according to an example embodiment of the present disclosure may output a sound, generated by a vibration of the display panel or the vibration member 100 based on a vibration of the vibration apparatus 130, in a forward direction of the display panel or the vibration member 100. Further, the apparatus according to an example embodiment of the present disclosure may vibrate a large region of the vibration member 100 (or the display panel) by the vibration apparatus 130 of a film type, thereby further enhancing a sense of sound localization and a sound pressure level characteristic of a sound based on a vibration of the vibration member 100 (or the display panel).

The apparatus according to an example embodiment of the present disclosure may further include a connection member 150 (or a first connection member) between the vibration apparatus 130 and the vibration member 100.

For example, the connection member 150 may be disposed between the vibration apparatus 130 and the rear surface (or a backside surface) of the vibration member 100. For example, the vibration apparatus 130 may be connected or coupled to the rear surface of the vibration member 100 by the connection member 150, and thus, may be supported by or disposed on the rear surface of the vibration member 100.

The connection member 150 according to an example embodiment of the present disclosure may include a material including an adhesive layer which has a relatively strong adhesive force or attaching force with respect to each of the rear surface of the vibration member 100 and the vibration apparatus 130. For example, the connection member 150 may include a foam pad, a double-sided tape, a double-sided foam pad, a double-sided foam tape, or an adhesive, but embodiments of the present disclosure are not limited thereto. For example, an adhesive layer of the connection member 150 may include epoxy, acryl, silicone, or urethane, but embodiments of the present disclosure are not limited thereto. For example, the adhesive layer of the connection member 150 may include an acryl-based material which has a relatively strong adhesive force and a relatively high hardness compared to a urethane-based material. Accordingly, a vibration of the vibration apparatus 130 may be transferred effectively to the vibration member 100.

The adhesive layer of the connection member 150 may further include an additive such as a tackifier, a wax component, or an anti-oxidation agent, but embodiments of the present disclosure are not limited thereto. The additive may prevent the connection member 150 from being detached (stripped) from the vibration member 100 by a vibration of the vibration apparatus 130. For example, the tackifier may be rosin derivative, the wax component may be paraffin wax, and the anti-oxidation agent may be a phenol-based anti-oxidation agent such as thioester, but embodiments of the present disclosure are not limited thereto.

According to another example embodiment of the present disclosure, the connection member 150 may further include a hollow portion provided between the vibration apparatus 130 and the vibration member 100. The hollow portion of the connection member 150 may provide an air gap between the vibration apparatus 130 and the vibration member 100. Based on the air gap, a sound wave (or a sound pressure level) based on a vibration of the vibration apparatus 130 may not be dispersed by the connection member 150 and may concentrate on the vibration member 100, and thus, the loss of a vibration based on the connection member 150 may be minimized, thereby increasing a sound pressure level characteristic and/or a sound characteristic of a sound generated based on a vibration of the vibration member 100.

The apparatus according to an example embodiment of the present disclosure may further include a supporting member 300 which is disposed on the rear surface (or a backside surface) of the vibration member 100.

The supporting member 300 may be disposed on the rear surface of the vibration member 100 or the display panel. For example, the supporting member 300 may cover the whole (or entire) rear surface of the vibration member 100 or the display panel. For example, the supporting member 300 may cover the whole rear surface of the vibration member 100 or the display panel with a gap space GS therebetween. The supporting member 300 may be spaced apart from a rearmost surface of the display panel or the vibration member 100 with the gap space GS therebetween, or may be spaced apart from the vibration apparatus 130. For example, the gap space GS may be referred to as an air gap, a vibration space, and a sound sounding box, but the terms are not limited thereto.

For example, the supporting member 300 may include one or more of a glass material, a metal material, and a plastic material. Fox example, the supporting member 300 may be a rear structure, a set structure, a supporting structure, a supporting cover, a rear member, a case, or a housing, but the terms are not limited thereto. The supporting member 300 may be referred to as the other term such as a cover bottom, a plate bottom, a back cover, a base frame, a metal frame, a metal chassis, a chassis base, or an m-chassis. For example, the supporting member 300 may be implemented as an arbitrary type of frame or a plate structure disposed at the rear surface of the vibration member 100.

An edge or a sharp corner portion (or a periphery) of the supporting member 300 may have an inclined shape or a curved shape through a chamfer process or a corner rounding process. For example, the glass material of the supporting member 300 may be sapphire glass. In another embodiment of the present disclosure, the supporting member 300 including the metal material may include one or more materials of aluminum (Al), an Al alloy, a magnesium (Mg) alloy, and an iron (Fe)-nickel (Ni) alloy.

The supporting member 300 according to an example embodiment of the present disclosure may include a first supporting member 310 and a second supporting member 330.

The first supporting member 310 may be disposed between the second supporting member 330 and the rear surface of the display panel or the vibration member 100. For example, the first supporting member 310 may be disposed between a front edge (or a front periphery) of the second supporting member 330 and a rear edge (or a rear periphery) of the display panel or the vibration member 100. The first supporting member 310 may support one or more of an edge portion (or a periphery portion) of the second supporting member 330 and an edge portion (or a periphery portion) of the display panel or the vibration member 100. In another embodiment of the present disclosure, the first supporting member 310 may cover the rear surface of the display panel or the vibration member 100. For example, the first supporting member 310 may cover the whole (or entire) rear surface of the display panel or the vibration member 100. For example, the first supporting member 310 may be a member which covers the whole rear surface of the display panel or the vibration member 100. For example, the first supporting member 310 may include one or more of a glass material, a metal material, and a plastic material. For example, the first supporting member 310 may be an inner plate, a first rear structure, a first supporting structure, a first supporting cover, a first back cover, a first rear member, an internal plate, or an internal cover, but embodiments of the present disclosure are not limited thereto. For example, the first supporting member 310 may be omitted.

The first supporting member 310 may be spaced apart from the rearmost surface of the vibration member 100 with the gap space GS therebetween, or may be spaced apart from the vibration apparatus 130. For example, the gap space GS may be referred to as an air gap, a vibration space, and a sound sounding box, but embodiments of the present disclosure are not limited thereto.

The second supporting member 330 may be disposed at or on a rear surface of the first supporting member 310. The second supporting member 330 may cover the whole (or entire) rear surface of the display panel or the vibration member 100. For example, the second supporting member 330 may include one or more of a glass material, a metal material, and a plastic material. For example, the second supporting member 330 may be an outer plate, a rear plate, a back plate, a back cover, a rear cover, a second rear structure, a second supporting structure, a second supporting cover, a second back cover, a second rear member, an external plate, or an external cover, but embodiments of the present disclosure are not limited thereto.

The supporting member 300 according to an example embodiment of the present disclosure may further include a connection member 350 (or a second connection member).

The connection member 350 may be disposed between the first supporting member 310 and the second supporting member 330. For example, the first supporting member 310 may be coupled or connected to the second supporting member 330 by the connection member 350. For example, the connection member 350 may be an adhesive resin, a double-sided tape, or a double-sided foam tape, but embodiments of the present disclosure are not limited thereto. For example, the connection member 350 may have elasticity for impact absorption, but embodiments of the present disclosure are not limited thereto. For example, the connection member 350 may be disposed in or at a whole (or entire) region between the first supporting member 310 and the second supporting member 330. In another embodiment of the present disclosure, the connection member 350 may be formed in a mesh structure including an air gap between the first supporting member 310 and the second supporting member 330.

The apparatus according to an example embodiment of the present disclosure may further include a middle frame 400. The middle frame 400 may be disposed between a rear edge (or a rear periphery) of the display panel or the vibration member 100 and a front edge (or a front periphery) of the supporting member 300. The middle frame 400 may support one or more of an edge portion (or a periphery portion) of the display panel and an edge portion (or a periphery portion) of the supporting member. The middle frame 400 may surround one or more of lateral surfaces of each of the display panel and the supporting member 300. The middle frame 400 may provide the gap space GS between the display panel and the supporting member 300. The middle frame 400 may be referred to as a middle cabinet, a middle cover, a middle chassis, a connection member, a frame, a frame member, a middle member, or a lateral cover member, but embodiments of the present disclosure are not limited thereto.

The middle frame 400 according to an example embodiment of the present disclosure may include a first supporting portion 410 and a second supporting portion 430. For example, the first supporting portion 410 may be a supporting portion, but embodiments of the present disclosure are not limited thereto. For example, the second supporting portion 430 may be a sidewall portion, but embodiments of the present disclosure are not limited thereto.

The first supporting portion 410 may be disposed between a rear edge (or a rear periphery) of the display panel or the vibration member 100 and a front edge (or a front periphery) of the supporting member 300, and thus, may provide a gap space GS between the display panel or the vibration member 100 and the supporting member 300. A front surface of the first supporting portion 410 may be coupled or connected to the rear edge (or the rear periphery) of the display panel or the vibration member 100 by a first adhesive member 401. A rear surface of the first supporting portion 410 may be coupled or connected to the front edge (or the front periphery) of the supporting member 300 by a second adhesive member 403. For example, the first supporting portion 410 may have a single picture frame structure having a tetragonal shape or a picture frame structure having a plurality of division bar forms, but embodiments of the present disclosure are not limited thereto.

The second supporting portion 430 may be disposed in parallel with a thickness direction Z of the apparatus. For example, the second supporting portion 430 may be vertically coupled to an outer surface of the first supporting portion 410 in parallel with the thickness direction Z of the apparatus. The second supporting portion 430 may surround one or more of an outer surface of the vibration member 100 and an outer surface of the supporting member 300, thereby protecting the outer surface of each of the vibration member 100 and the supporting member 300. The first supporting portion 410 may protrude from an inner surface of the second supporting portion 430 to the gap space GS between the vibration member 100 and the supporting member 300.

The apparatus according to an example embodiment of the present disclosure may include a panel connection member (or a connection member) instead of the middle frame 400.

The panel connection member may be disposed between the rear edge (or the rear periphery) of the vibration member 100 and the front edge (or the front periphery) of the supporting member 300, and thus, may provide a gap space GS between the vibration member 100 and the supporting member 300. The panel connection member may be disposed between the rear edge (or the rear periphery) of the vibration member 100 and the front edge (or the front periphery) of the supporting member 300 and may attach the vibration member 100 on the supporting member 300. For example, the panel connection member may be implemented with a double-sided tape, a single-sided tape, or a double-sided foam tape, but embodiments of the present disclosure are not limited thereto. For example, an adhesive layer of the panel connection member may include epoxy, acryl, silicone, or urethane, but embodiments of the present disclosure are not limited thereto. For example, in order to minimize the transfer of a vibration of the vibration member 100 to the supporting member 300, the adhesive layer of the panel connection member may include an acryl-based material which has a relatively strong adhesive force and a relatively high hardness compared to a urethane-based material. Accordingly, a vibration of the display panel or the vibration member 100 transferred to the supporting member 300 may be minimized.

In the apparatus according to an example embodiment of the present disclosure, in a case where the panel connection member is provided instead of the middle frame 400, the supporting member 300 may include a bending sidewall which is bent from one side (or an end or one portion) of the second supporting member 330 to surround one or more of outer surfaces (or outer sidewalls) of the first supporting member 310, the panel connection member, and the vibration member 100. The bending sidewall according to an example embodiment of the present disclosure may have a single sidewall structure or a hemming structure. The hemming structure may be a structure where an end portion of an arbitrary member is bent in a curved shape and overlaps or is spaced apart from another portion in parallel. For example, to enhance a sense of beauty of a lateral surface in design, the bending sidewall may include a first bending sidewall which is bent from one side (or an end or one portion) of the second supporting member 330 and a second bending sidewall which is bent from the first bending sidewall to a region between the first bending sidewall and an outer surface of the vibration member 100. The second bending sidewall may contact an inner surface of the first bending sidewall, or may be spaced apart from an inner surface of the first bending sidewall to reduce the transfer of an external impact to the outer surface of the vibration member 100 in a lateral direction. Accordingly, the second bending sidewall may reduce that the outer surface of the vibration member 100 contacts the inner surface of the first bending sidewall or an external impact in a lateral direction is transferred to the outer surface of the vibration member 100.

According to another example embodiment of the present disclosure, the middle frame 400 may be omitted. Instead of the middle frame 400, a panel connection member or an adhesive may be provided. According to another example embodiment of the present disclosure, instead of the middle frame 400, a partition may be provided.

Because a sound characteristic and/or a sound pressure level characteristic of a low-pitched sound band are/is reduced in a case where the vibration apparatus 130 is configured as a film type vibration apparatus, the inventors have performed extensive research and experiments for improving a sound pressure level characteristic of the low-pitched sound band. Through the extensive research and experiments, the inventors have invented an apparatus including a new structure for enhancing the sound characteristic and/or the sound pressure level characteristic of the low-pitched sound band. This will be described below.

Figure 3A:
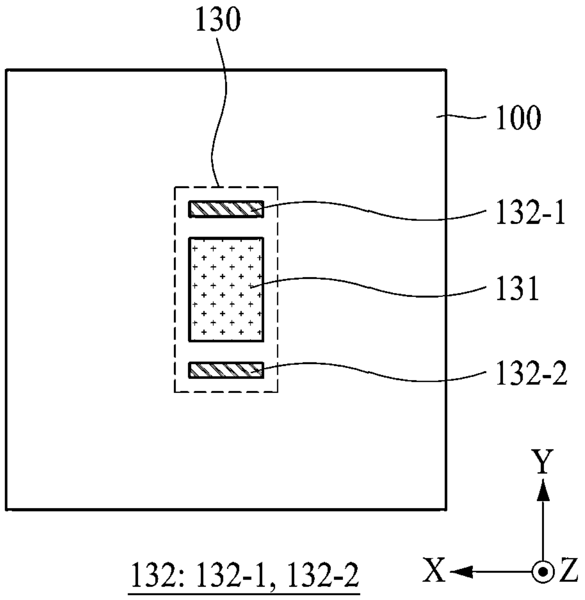
FIGS. 3A to 3C illustrate a vibration apparatus according to an example embodiment of the present disclosure.
Figure 3B:
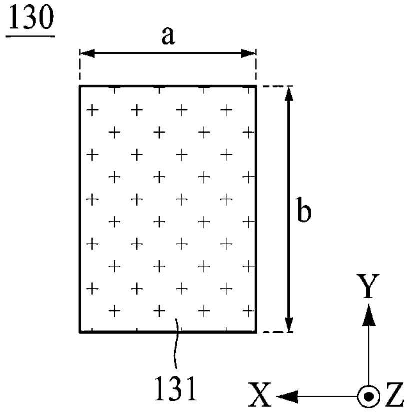
Figure 3C:
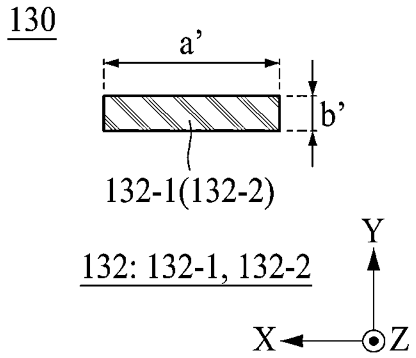

FIGS. 3A to 3C illustrate a vibration apparatus according to an example embodiment of the present disclosure.

Referring to FIGS. 3A to 3C, the vibration apparatus 130 according to an example embodiment of the present disclosure may include a first vibration portion 131 and a second vibration portion 132. For example, the first vibration portion 131 may be provided as (or may include) one or more first vibration portions. For example, the second vibration portion 132 may be provided as (or may include) a plurality of second vibration portions. In one or more examples, the second vibration portion 132 may include one or more second vibration portions. The plurality of second vibration portions may be different from the one or more first vibration portions. For example, one or more of a shape, size, material, material property, or sound output characteristic of the plurality of second vibration portions may be different from that or those of the one or more first vibration portions.

According to an example embodiment of the present disclosure, the first vibration portion 131 may include a material having a polycrystalline structure, and the second vibration portion 132 may include a material having a single crystalline structure. For example, the first vibration portion 131 may include polycrystalline ceramic, and the second vibration portion 132 may include single crystalline ceramic.

For example, the first vibration portion 131 may be a polycrystalline vibration portion, and the second vibration portion 132 may be a single crystalline vibration portion. For example, the first vibration portion 131 may include irregular particles where various crystal domains are provided. For example, the second vibration portion 132 may have a structure where particles having a single crystal domain having a certain structure are regularly arranged. Because the first vibration portion 131 is about two or three times less in vibration characteristic than the second vibration portion 132, there may be a problem where a sound pressure level characteristic of a low-pitched sound band is lowered, but the vibration apparatus 130 may be manufactured to have a large area, thereby implementing a large-sized vibration apparatus or sound apparatus. The second vibration portion 132 may be manufactured as a vibration device which is two or three times greater in vibration characteristic (for example, a piezoelectric deformation constant "$d_{33}$" is greater in a thickness direction Z; or for example, a piezoelectric deformation constant "$d_{33}$" is two or three times greater in a thickness direction Z) than the first vibration portion 131, and thus, may have a relatively high sound pressure level characteristic (or sound characteristic) in the low-pitched sound band. Accordingly, the inventors have performed extensive research and experiments for applying the second vibration portion 132 so as to improve a sound pressure level characteristic and/or a sound characteristic of the low-pitched sound band which is generated when a vibration apparatus is implemented with the first vibration portion 131. Through the extensive research and experiments, the inventors have invented a vibration apparatus including the first vibration portion 131 and the second vibration portion 132. This will be described below in further detail.

The vibration apparatus 130 according to an example embodiment of the present disclosure may alternately and repeatedly contract and expand based on a piezoelectric effect (or a piezoelectric characteristic) to vibrate. The vibration apparatus 130 according to an example embodiment of the present disclosure may alternately and repeatedly contract and expand based on an inverse piezoelectric effect or a piezoelectric effect to vibrate in the thickness direction Z, and thus, may vibrate the vibration member 100 or the display panel. For example, the vibration apparatus 130 may be a vibration film, a displacement generator, a displacement film, a sound generator, a vibration array, a vibration array portion, a vibration structure array portion, or a vibration array structure, but embodiments of the present disclosure are not limited thereto.

Each of the first vibration portion 131 and the second vibration portion 132 may include a piezoelectric material, a composite piezoelectric material, or an electro active material, which includes a piezoelectric effect. Each of the first vibration portion 131 and the second vibration portion 132 may be referred to as a term such as a piezoelectric vibration portion, a piezoelectric vibration layer, a displacement portion, a piezoelectric displacement portion, a piezoelectric displacement layer, a sound wave generating portion, a vibration layer, a piezoelectric material layer, a piezoelectric composite layer, an electro active layer, a piezoelectric material portion, an electro active portion, a piezoelectric structure, a piezoelectric composite layer, a piezoelectric composite, or a piezoelectric ceramic composite, but the terms are not limited thereto.

For example, each of the first vibration portion 131 and the second vibration portion 132 may include a ceramic-based material for generating a relatively high vibration, and/or may include a piezoelectric ceramic having a perovskite-based crystalline structure. The perovskite crystalline structure may have a piezoelectric effect and/or an inverse piezoelectric effect, and may be a plate-shaped structure having an orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "O" may be anions. For example, the first vibration portion 131 and the second vibration portion 132 may include one or more of lead (II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

In a perovskite crystalline structure, a position of a center ion may be changed by an external stress or a magnetic field to vary polarization, and a piezoelectric effect may be generated based on the variation of the polarization. In a perovskite crystalline structure including $PbTiO_3$, a position of a Ti ion corresponding to a center ion may be changed to vary polarization, and thus, a piezoelectric effect may be generated. For example, in the perovskite crystalline structure, a cubic shape having a symmetric structure may be changed to a tetragonal shape, an orthorhombic shape, and a rhombohedral shape each having an unsymmetric structure by an external stress or a magnetic field, and thus, a piezoelectric effect may be generated. Polarization may be high at a morphotropic phase boundary (MPB) of a tetragonal structure and a rhombohedral structure, and polarization may be easily realigned, thereby obtaining a high piezoelectric characteristic.

According to an example embodiment of the present disclosure, an inorganic material portion included in each of the first vibration portion 131 and the second vibration portion 132 may include one or more materials among lead (Pb), zirconium (Zr), titanium (Ti), zinc (Zn), nickel (Ni), and niobium (Nb), but embodiments of the present disclosure are not limited thereto.

According to another example embodiment of the present disclosure, the inorganic material portion included in each of the first vibration portion 131 and the second vibration portion 132 may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. According to another example embodiment of the present disclosure, the inorganic material portion may include a lead magnesium niobate (PMN)-based material, a lead nickel niobate (PNN)-based material, a lead zirconate niobate (PZN)-based material, or a lead indium niobate (PIN)-based material, but embodiments of the present disclosure are not limited thereto. The PMN-based material may include Pb, Mg, and Nb, and for example, may include $Pb(Mg, Nb)O_3$. The PNN-based material may include Pb, Ni, and Nb, and for example, may include $Pb(Ni, Nb)O_3$. The PIN-based material may include Pb, In, and Nb, and for example, may include $Pb(In, Nb)O_3$. According to another example embodiment of the present disclosure, the inorganic material portion included in each of the first vibration portion 131 and the second vibration portion 132 may include one or more of calcium titanate ($CaTiO_3$), $BaTiO_3$, and $SrTiO_3$, each including no Pb, but embodiments of the present disclosure are not limited thereto.

According to another example embodiment of the present disclosure, the inorganic material portion included in each of the first vibration portion 131 and the second vibration portion 132 may have a piezoelectric deformation coefficient "$d_{33}$" of 1,000 pC/N or more in the thickness direction Z. By having a high piezoelectric deformation coefficient "$d_{33}$", it is possible to provide the vibrating apparatus that may be applied to a display panel or a vibration member (or a vibration object) having a large size or may have a sufficient vibration characteristic or piezoelectric characteristic. For example, in order to have a high piezoelectric deformation coefficient "$d_{33}$", the inorganic material portion may include a PZT-based material ($PbZrTiO_3$) as a main component and may include a softener dopant material doped into A site (Pb) and a relaxor ferroelectric material doped into B site (ZrTi).

The softener dopant material may enhance a piezoelectric characteristic and a dielectric characteristic of the inorganic material portion, and for example, may increase the piezoelectric deformation coefficient "$d_{33}$" of the inorganic material portion. When the softener dopant material includes a dyad element "+1", the piezoelectric characteristic and the dielectric characteristic of the inorganic material portion may be reduced. For example, when the softener dopant material includes potassium (K) and rubidium (Rb), the piezoelectric characteristic and the dielectric characteristic of the inorganic material portion may be reduced. The softener dopant material according to an example embodiment of the present disclosure may include a dyad element "+2" to a triad element "+3". Morphotropic phase boundary (MPB) may be implemented by adding the softener dopant material to the PZT-based material ($PbZrTiO_3$), and thus, a piezoelectric characteristic and a dielectric characteristic may be enhanced. For example, the softener dopant material may include one or more of strontium (Sr), barium (Ba), lanthanum (La), neodymium (Nd), calcium (Ca), yttrium (Y), erbium (Er), or ytterbium (Yb). For example, ions (for example, $Sr^{2+}$, $Ba^{2+}$, $La^{2+}$, $Nd^{3+}$, $Ca^{2+}$, $Y^{3+}$, $Er^{3+}$, and $Yb^{3+}$) of the softener dopant material doped into the PZT-based material ($PbZrTiO_3$) may substitute a portion of lead (Pb) in the PZT-based material ($PbZrTiO_3$), and a substitution rate thereof may be about 2 mol % to about 20 mol %. For example, when the substitution rate is smaller than 2 mol % or greater than 20 mol %, a perovskite crystal structure may be broken, and thus, an electromechanical coupling coefficient "kP" and the piezoelectric deformation coefficient "$d_{33}$" may decrease. When the softener dopant material is substituted, the MPB may be formed, and a piezoelectric characteristic and a dielectric characteristic may be high in the MPB, thereby implementing a vibration apparatus having a high piezoelectric characteristic and a high dielectric characteristic.

According to an example embodiment of the present disclosure, the relaxor ferroelectric material doped into the PZT-based material ($PbZrTiO_3$) may enhance an electric deformation characteristic of the inorganic material portion. The relaxor ferroelectric material according to an example embodiment of the present disclosure may include a PMN-based material, a PNN-based material, a PZN-based material, or a PIN-based material, but embodiments of the present disclosure are not limited thereto. The PMN-based material may include Pb, Mg, and Nb, and for example, may include $Pb(Mg, Nb)O_3$. The PNN-based material may include Pb, Ni, and Nb, and for example, may include $Pb(Ni, Nb)O_3$. The PZN-based material may include Pb, Zr, and Nb, and for example, may include $Pb(Zr, Nb)O_3$. The PIN-based material may include Pb, In, and Nb, and for example, may include $Pb(In, Nb)O_3$. For example, the relaxor ferroelectric material doped into the PZT-based material ($PbZrTiO_3$) may substitute a portion of each of zirconium (Zr) and titanium (Ti) in the PZT-based material ($PbZrTiO_3$), and a substitution rate thereof may be about 5 mol % to about 25 mol %. For example, when the substitution rate is smaller than 5 mol % or greater than 25 mol %, a perovskite crystal structure may be broken, and thus, the electromechanical coupling coefficient "kP" and the piezoelectric deformation coefficient "$d_{33}$" may decrease.

According to an example embodiment of the present disclosure, the inorganic material portion included in each of the first vibration portion 131 and the second vibration portion 132 may further include a donor material doped into B site (ZrTi) of the PZT-based material ($PbZrTiO_3$), in order to further enhance a piezoelectric coefficient. For example, the donor material doped into the B site (ZrTi) may include a tetrad element "+4" or a hexad element "+6". For example, the donor material doped into the B site (ZrTi) may include one or more of tellurium (Te), germanium (Ge), uranium (U), bismuth (Bi), niobium (Nb), tantalum (Ta), antimony (Sb), or tungsten (W).

According to an example embodiment of the present disclosure, comparing with the first vibration portion 131, the second vibration portion 132 may have a larger electromechanical coupling coefficient "kP" and a higher piezoelectric deformation coefficient "$d_{33}$". A vibration direction of the second vibration portion 132 may be changed based on a crystal direction. For example, when a crystal direction of the second vibration portion 132 is a (001) crystal direction, this may be a vibration mode of a high piezoelectric deformation coefficient "$d_{33}$", and the vibration member 100 may vibrate in a thickness direction (or a vertical direction) (a Z-axis vibration or a vertical vibration), thereby inducing an increase in a sound pressure level of a high-pitched sound band. For example, when a crystal direction of the second vibration portion 132 is a (011) crystal direction, this may be a vibration mode of a high piezoelectric deformation coefficient "$d_{32}$", and the vibration member 100 may vibrate in a lateral direction (an X-axis vibration, a lateral vibration, or a horizontal vibration), thereby inducing an increase in a sound pressure level of a low-pitched sound band.

According to an example embodiment of the present disclosure, the first vibration portion 131 which vibrates in the thickness direction (the Z-axis vibration) and the second vibration portion 132 which vibrates in a lateral direction (an XY-axis vibration) may be provided, and thus, a sound of the low-pitched sound band may be improved. Further, the second vibration portion 132 having the (011) crystal direction may be provided, and thus, an area, occupied by the second vibration portion 132, of the vibration apparatus 130 may be reduced, thereby improving a sound of the low-pitched sound band and decreasing the manufacturing cost of the vibration apparatus 130 based on the second vibration portion 132.

Referring to FIG. 3A, the vibration apparatus 130 according to an example embodiment of the present disclosure may include a second vibration portion 132 adjacent to the first vibration portion 131. The second vibration portion 132 may include a 2-1*st* vibration portion 132-1 and a 2-2*nd* vibration portion 132-2. The first vibration portion 131 may be disposed at a center of the vibration member 100. The second vibration portion 132 may be disposed above and below the first vibration portion 131. The second vibration portion 132 may be disposed above and below the first vibration portion 131 with respect to the first vibration portion 131. For example, the 2-1*st* vibration portion 132-1 may be disposed above the first vibration portion 131. For example, the 2-2*nd* vibration portion 132-2 may be disposed below the first vibration portion 131. For example, the 2-1*st* vibration portion 132-1 may be a second vibration portion, and the 2-2*nd* vibration portion 132-2 may be a third vibration portion. It is understood that the foregoing provides examples and does not limit the scope of the present disclosure. As used herein, references to first features being at a periphery of second features may be used to indicate that the first features are adjacent to the second features, e.g., disposed laterally adjacent in a direction parallel to a front surface of the vibration member/display panel described herein. The 2-1*st* vibration portion 132-1 may be disposed adjacent to a first side of the first vibration portion 131, and the 2-2*nd* vibration portion 132-2 may be disposed adjacent to a second side of the first vibration portion 131. The first side may be opposite to the second side.

A thickness of each of the first vibration portion 131 and the second vibration portion 132 may be 0.1 mm to 0.3 mm, but embodiments of the present disclosure are not limited thereto. As a thickness of each of the first vibration portion 131 and the second vibration portion 132 decreases progressively, a voltage (or a net electrical field) applied per thickness may increase, and thus, a vibration characteristic of each of the first vibration portion 131 and the second vibration portion 132 may be further enhanced. For example, in a case where a thickness of the first vibration portion 131 is 0.1 mm, a thickness of the second vibration portion 132 is 0.2 mm, and 10 V (volt) is applied, magnitudes of electrical fields applied per thickness may respectively be 100 V/mm and 50 V/mm. Accordingly, a magnitude of an electrical field of each of the first and second vibration portions 131 and 132 having a thickness of 0.1 mm may increase by about twice or more, and a sound pressure level may be enhanced by about 6 dB (decibel), thereby further enhancing a vibration characteristic.

The second vibration portion 132 may be disposed above and below the first vibration portion 131 with respect to the first vibration portions 131, and thus, a lateral vibration based on the second vibration portion 132 may be induced. The second vibration portion 132 may include the (011) crystal direction, and thus, when the second vibration portion 132 is configured to be long in a $d_{32}$ direction (or a widthwise direction), a displacement may increase based on a high aspect ratio vibration. For example, the second vibration portion 132 may be configured in a tetragonal shape (for example, a bar shape), but embodiments of the present disclosure are not limited thereto. An aspect ratio may be a ratio ($d_{32}/d_{33}$) of a widthwise direction ($d_{32}$ direction) to a thickness direction ($d_{33}$ direction). The second vibration portion 132 may repeatedly contract and expand based on an external voltage, and when an XY-axis length expands, a Z-axis length may contract, namely, a vibration may be performed in opposite directions. Therefore, when the second vibration portion 132 is a vibration portion having a high aspect ratio (for example, a widthwise direction/thickness direction), an X-axis length and/or a Y-axis length may expand (or contract) by an aspect ratio with respect to contraction (or expansion) of a Z-axis length, and thus, a vibration characteristic of the second vibration portion 132 may be further enhanced. For example, when a widthwise direction/thickness direction is 5, a vibration characteristic of the second vibration portion 132 may be further enhanced by about five times.

Referring to FIG. 3C, a ratio "a'/b'" of a widthwise length "a'" to a lengthwise length "b'" of the second vibration portion 132 (for example, the 2-1*st* vibration portion 132-1 and the 2-2*nd* vibration portion 132-2) may be adjusted to 5 or more, but embodiments of the present disclosure are not limited thereto. Therefore, the second vibration portion 132 may have a high vibration displacement, and thus, a vibration characteristic of vibrating the vibration member 100 may increase, thereby outputting a high sound pressure level in the low-pitched sound band. For example, the widthwise length of the second vibration portion 132 may be 5 cm to 10 cm, but embodiments of the present disclosure are not limited thereto.

Referring to FIG. 3B, the first vibration portion 131 may have a tetragonal shape, but embodiments of the present disclosure are not limited thereto. As another example, the first vibration portion 131 may be configured in a square shape, a rectangular shape, or a rhombus shape. A lengthwise length "b" of the first vibration portion 131 may be adjusted to be longer than a widthwise length "a" thereof. For example, the first vibration portion 131 may vibrate a thickness direction ($d_{33}$ direction), and thus, as an area (or an XY area) increases, a vibration characteristic may be enhanced. As an area of the first vibration portion 131 increases, a vibration characteristic may be enhanced, and thus, a sound pressure level characteristic may be further enhanced.

According to an example embodiment of the present disclosure, the second vibration portion 132 may be disposed above and below the first vibration portion 131 with respect to the first vibration portion 131, and thus, may complement a sound characteristic and/or a sound pressure level characteristic of the low pitched sound band, thereby providing the vibration apparatus 130 having a sound characteristic and/or a sound pressure level characteristic of a full-range pitched sound band including the low pitched sound band. Further, the first vibration portion 131 may be disposed at a center of the vibration member 100 with respect to the second vibration portion 132, thereby providing the vibration apparatus 130 for further enhancing a sound of the high-pitched sound band.

Figure 3D:
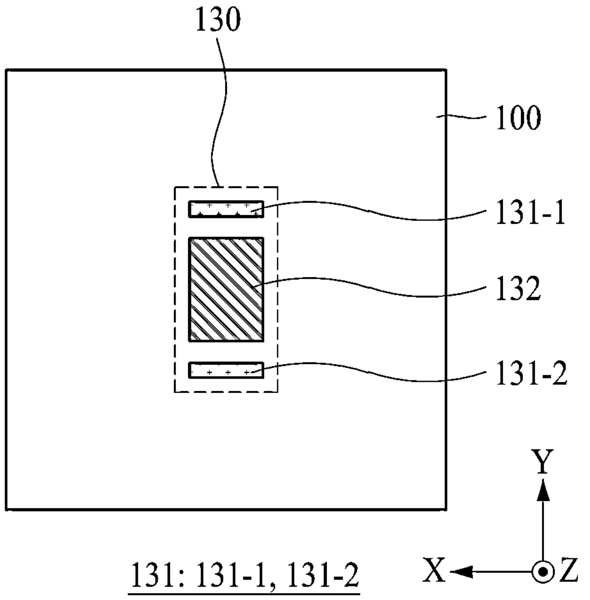
FIGS. 3D to 3F illustrate a vibration apparatus according to another example embodiment of the present disclosure.
Figure 3E:
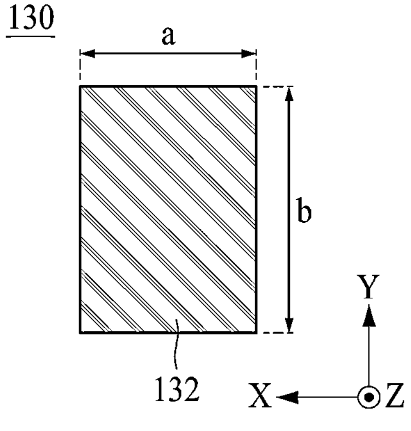
Figure 3F:
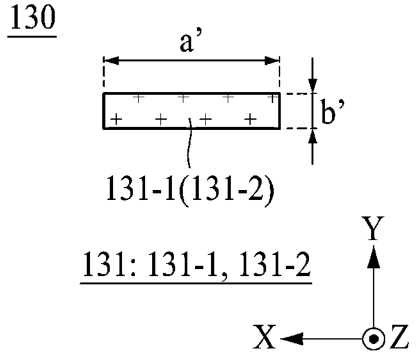

FIGS. 3D to 3F illustrate a vibration apparatus according to another example embodiment of the present disclosure.

Referring to FIGS. 3D to 3F, the vibration apparatus 130 according to another example embodiment of the present disclosure may include a first vibration portion 131 and a second vibration portion 132. For example, the first vibration portion 131 may be provided as (or may include) a plurality of first vibration portions. For example, the second vibration portion 132 may be provided as (or may include) one or more second vibration portions. In one or more examples, the first vibration portion 131 may include one or more first vibration portions. The plurality of first vibration portions may be different from the one or more second vibration portions. For example, one or more of a shape, size, material, material property, or sound output characteristic of the plurality of second vibration portions may be different from that or those of the one or more first vibration portions.

Referring to FIG. 3D, the second vibration portion 132 may be disposed at a center of the vibration member 100. For example, the first vibration portion 131 may be disposed above and below the second vibration portion 132. The first vibration portion 131 may be disposed above and below the second vibration portion 132 with respect to the second vibration portion 132. For example, the first vibration portion 131 may include a 1-1$^{st}$ vibration portion 131-1 and a 1-2$^{nd}$ vibration portion 131-2. A thickness of each of the second vibration portion 132 and the first vibration portion 131 may be 0.1 mm to 0.3 mm, but embodiments of the present disclosure are not limited thereto.

Referring to FIG. 3E, the second vibration portion 132 may have a tetragonal shape, but embodiments of the present disclosure are not limited thereto. As another example, the second vibration portion 132 may be configured in a square shape or a rhombus shape. As shown in FIG. 3E, a lengthwise length “b” of the second vibration portion 132 may be longer than a widthwise length “a” of the second vibration portion 132. In another example, a lengthwise length “b” of the second vibration portion 132 may be the same as a widthwise length “a” of the second vibration portion 132.

Referring to FIG. 3F, a ratio “a'/b'” of a widthwise length “a'” to a lengthwise length “b'” of the first vibration portion 131 (for example, the 1-1$^{st}$ vibration portion 131-1 and the 1-2$^{nd}$ vibration portion 131-2) may be adjusted to 5 or more, but embodiments of the present disclosure are not limited thereto. In one or more aspects, the vibration portion 131-1 (or 131-2) shown in FIG. 3F may represent the vibration portion 131-1 (or 131-2) of FIG. 3D.

According to an example embodiment of the present disclosure, the first vibration portion 131 may be disposed above and below the second vibration portion 132 with respect to the second vibration portion 132, and thus, may complement a sound characteristic and/or a sound pressure level characteristic of the low pitched sound band, thereby providing the vibration apparatus 130 having a sound characteristic and/or a sound pressure level characteristic of the full-range pitched sound band including the low pitched sound band.

Figure 4A:
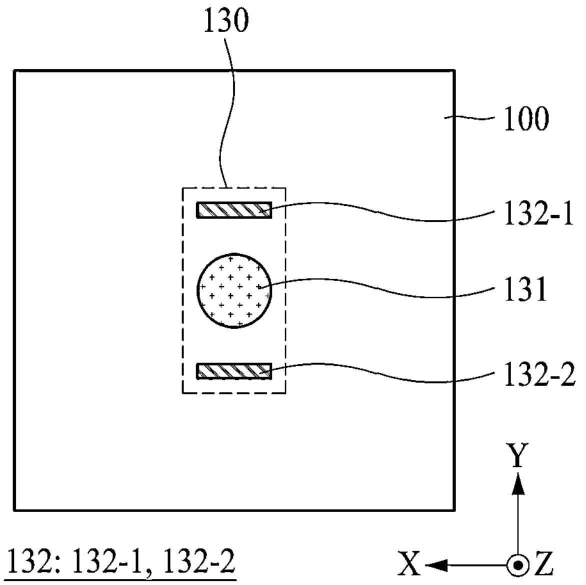
FIGS. 4A to 4C illustrate a vibration apparatus according to another example embodiment of the present disclosure.
Figure 4B:
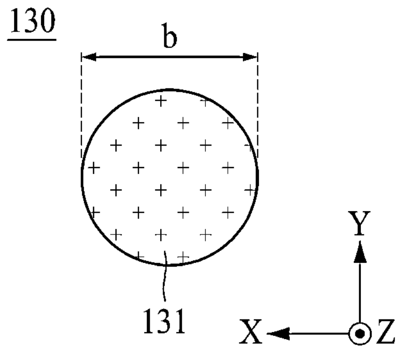
Figure 4C:
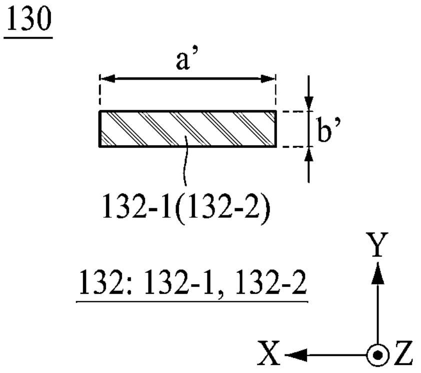

FIGS. 4A to 4C illustrate a vibration apparatus according to another example embodiment of the present disclosure.

Referring to FIGS. 4A to 4C, the vibration apparatus 130 according to another example embodiment of the present disclosure may include a first vibration portion 131 and a second vibration portion 132. For example, the first vibration portion 131 may be provided as (or may include) one or more first vibration portions. For example, the second vibration portion 132 may be provided as (or may include) a plurality of second vibration portions. In one or more examples, the second vibration portion 132 may include one or more second vibration portions. Unless stated otherwise, the first vibration portion 131 and the second vibration portion 132 may be the same or substantially the same as the first vibration portion 131 and the second vibration portion 132 described above with reference to FIGS. 1 to 3C, and thus, repeated descriptions thereof may be omitted or may be briefly given below.

Referring to FIG. 4A, the first vibration portion 131 may be disposed at a center of the vibration member 100. For example, the second vibration portion 132 may be disposed above and below the first vibration portion 131. The second vibration portion 132 may be disposed above and below the first vibration portion 131 with respect to the first vibration portion 131. For example, the second vibration portion 132 may include a 2-1$^{st}$ vibration portion 132-1 and a 2-2$^{nd}$ vibration portion 132-2. A thickness of each of the first vibration portion 131 and the second vibration portion 132 may be 0.1 mm to 0.3 mm, but embodiments of the present disclosure are not limited thereto.

The 2-1$^{st}$ vibration portion 132-1 may be a second vibration portion, and the 2-2$^{nd}$ vibration portion 132-2 may be a third vibration portion, but the foregoing provides examples and does not limit the scope of the present disclosure. As used herein, references to an n-m$^{th}$ vibration portion or an n-m$^{th}$ vibration portion may be used to refer to an m$^{th}$ portion or sub-portion or part or instance of an n$^{th}$ vibration portion. In one or more aspects, n may be a natural number. In one or more aspects, n may be a natural number that is 2 or greater. In one or more aspects, m may be a natural number.

Referring to FIG. 4B, the first vibration portion 131 may be configured in a circular shape and a diameter “b” of the first vibration portion 131 may be 5 cm to 12 cm, but embodiments of the present disclosure are not limited thereto.

Referring to FIG. 4C, a ratio “a'/b'” of a widthwise length “a'” to a lengthwise length “b'” of the second vibration portion 132 (for example, the 2-1$^{st}$ vibration portion 132-1 and the 2-2$^{nd}$ vibration portion 132-2) may be adjusted to 5 or more, but embodiments of the present disclosure are not limited thereto. Therefore, the second vibration portion 132 may have a high vibration displacement, and thus, a vibration characteristic of vibrating the vibration member 100 may increase, thereby outputting a high sound pressure level in the low-pitched sound band.

According to an example embodiment of the present disclosure, the second vibration portion 132 may be disposed above and below the first vibration portion 131 with respect to the first vibration portion 131, and thus, may complement a sound characteristic and/or a sound pressure level characteristic of the low pitched sound band, thereby providing the vibration apparatus 130 having a sound characteristic and/or a sound pressure level characteristic of the full-range pitched sound band including the low pitched sound band. The first vibration portion 131 may be disposed at a center of the vibration member 100 with respect to the second vibration portion 132, thereby providing the vibration apparatus 130 for further enhancing a sound of the high-pitched sound band.

Figure 5A:
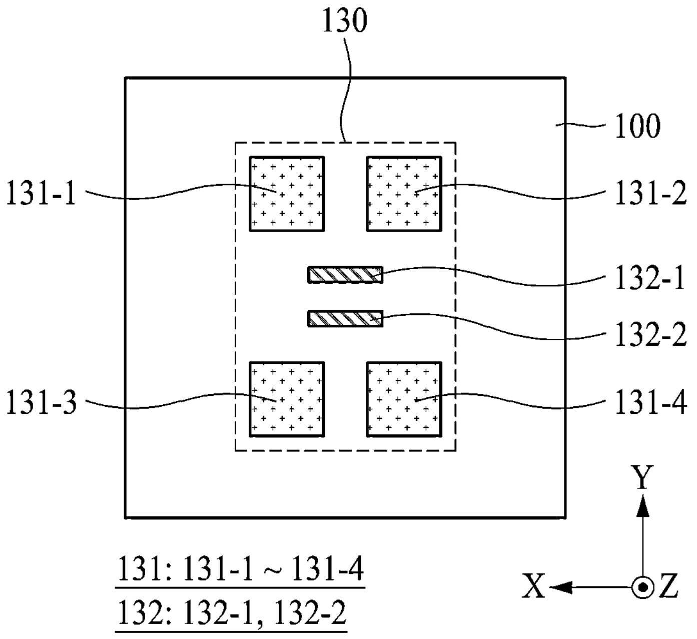
FIGS. 5A to 5C illustrate a vibration apparatus according to another example embodiment of the present disclosure.
Figure 5B:
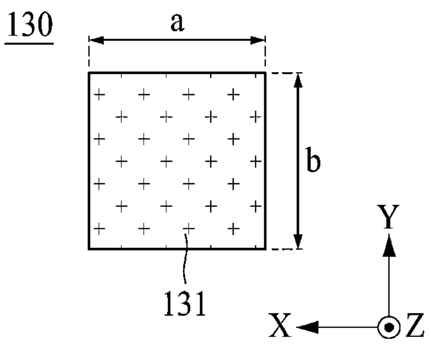
Figure 5C:
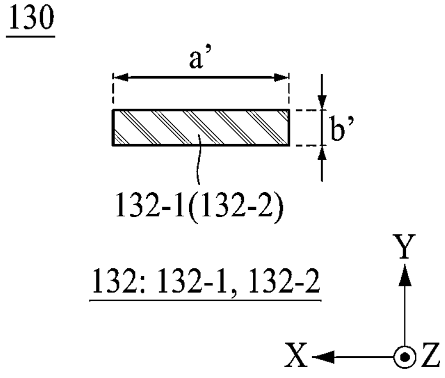

FIGS. 5A to 5C illustrate a vibration apparatus according to another example embodiment of the present disclosure.

Referring to FIGS. 5A to 5C, the vibration apparatus 130 according to another example embodiment of the present disclosure may include a first vibration portion 131 and a second vibration portion 132. For example, the first vibration portion 131 may be provided as (or may include) one or more first vibration portions. For example, the second vibration portion 132 may include a plurality of second vibration portions. In one or more examples, the second vibration portion 132 may include one or more second vibration portions. Unless stated otherwise, the first vibration portion 131 and the second vibration portion 132 may be the same or substantially the same as the first vibration portion 131 and the second vibration portion 132 described above with reference to FIGS. 1 to 3C, and thus, repeated descriptions thereof may be omitted or may be briefly given below.

Referring to FIG. 5A, the first vibration portion 131 may be provided as (or may include) one or more first vibration portions. The first vibration portion 131 may have a tetragonal shape. As another example, the first vibration portion 131 may be configured in a square shape, a rectangular shape, or a rhombus shape. For example, the first vibration portion 131 may include a 1-$1^{st}$ vibration portion 131-1, a 1-$2^{nd}$ vibration portion 131-2, a 1-$3^{rd}$ vibration portion 131-3, and a 1-$4^{th}$ vibration portion 131-4. The second vibration portion 132 may be provided as (or may include) a plurality of second vibration portions. For example, the second vibration portion 132 may include a 2-$1^{st}$ vibration portion 132-1 and a 2-$2^{nd}$ vibration portion 132-2. The second vibration portion 132 may be disposed at a center of the vibration member 100. For example, the 2-$1^{st}$ vibration portion 132-1 and the 2-$2^{nd}$ vibration portion 132-2 may be disposed at the center of the vibration member 100. The first vibration portion 131 may be disposed above and below the second vibration portion 132. For example, the first vibration portion 131 may be disposed above and below the second vibration portion 132 with respect to the second vibration portion 132. The 1-$1^{st}$ vibration portion 131-1 and the 1-$2^{nd}$ vibration portion 131-2 may be disposed above the second vibration portion 132. For example, the 1-$1^{st}$ vibration portion 131-1 and the 1-$2^{nd}$ vibration portion 131-2 may be disposed above the 2-$1^{st}$ vibration portion 132-1. The 1-$3^{rd}$ vibration portion 131-3 and the 1-$4^{th}$ vibration portion 131-4 may be disposed below the second vibration portion 132. For example, the 1-$3^{rd}$ vibration portion 131-3 and the 1-$4^{th}$ vibration portion 131-4 may be disposed below a 2-$2^{nd}$ vibration portion 132-2. A thickness of each of the first vibration portion 131 and the second vibration portion 132 may be 0.1 mm to 0.3 mm, but embodiments of the present disclosure are not limited thereto.

The 1-$1^{st}$ vibration portion 131-1 may be a first vibration portion, the 1-$2^{nd}$ vibration portion 131-2 may be a second vibration portion, the 1-$3^{rd}$ vibration portion 131-3 may be a third vibration portion, the 1-$4^{th}$ vibration portion 131-4 may be a fourth vibration portion, the 2-$1^{st}$ vibration portion 132-1 may be a fifth vibration portion, and the 2-$2^{nd}$ vibration portion 132-2 may be a sixth vibration portion. It is understood that the foregoing provides examples and does not limit the scope of the present disclosure.

Referring to FIG. 5B, the first vibration portion 131 may have a tetragonal shape, but embodiments of the present disclosure are not limited thereto. As another example, the first vibration portion 131 may be configured in a square shape or a rhombus shape. A lengthwise length "b" of the first vibration portion 131 may be the same as a widthwise length "a" of the first vibration portion 131. In one or more aspects, the first vibration portion 131 shown in FIG. 5B may represent any one of the vibration portions 131-1 through 131-4 of FIG. 5A.

Referring to FIG. 5C, a ratio "a'/b'" of a widthwise length "a'" to a lengthwise length "b'" of the second vibration portion 132 (for example, the 2-$1^{st}$ vibration portion 132-1 and the 2-$2^{nd}$ vibration portion 132-2) may be adjusted to 5 or more, but embodiments of the present disclosure are not limited thereto. Therefore, the second vibration portion 132 may have a high vibration displacement, and thus, a vibration characteristic of vibrating the vibration member 100 may increase, thereby outputting a high sound pressure level in the low-pitched sound band.

The vibration apparatus 130 according to an example embodiment of the present disclosure may apply an independent driving signal (or sound signal) to each of the 1-$1^{st}$ vibration portion 131-1, the 1-$2^{nd}$ vibration portion 131-2, the 1-$3^{rd}$ vibration portion 131-3, the 1-$4^{th}$ vibration portion 131-4, the 2-$1^{st}$ vibration portion 132-1 and the 2-$2^{nd}$ vibration portion 132-2 to individually drive each of the elements, and thus, driving of each vibration portion may be adjusted based on a desired sound (the high-pitched sound band or the low-pitched sound band). For example, in a case which implements a sound of the high-pitched sound band, by increasing a voltage applied to the first vibration portion 131 and decreasing a voltage applied to the second vibration portion 132, the vibration apparatus 130 may be implemented where the high-pitched sound band is emphasized more (or is enhanced) in the same vibration apparatus 130. As another example, in a case which implements a sound of the low-pitched sound band, by decreasing a voltage applied to the first vibration portion 131 and increasing a voltage applied to the second vibration portion 132, the vibration apparatus 130 may be implemented where the low-pitched sound band is emphasized more (or is enhanced) in the same vibration apparatus 130.

According to an example embodiment of the present disclosure, the first vibration portion 131 may be disposed above and below the second vibration portion 132 with respect to the second vibration portion 132, and thus, may complement a sound characteristic and/or a sound pressure level characteristic of the low pitched sound band, thereby providing the vibration apparatus 130 having a sound characteristic and/or a sound pressure level characteristic of the full-range pitched sound band including the low pitched sound band. In addition, an area of the first vibration portion 131 may be greater than that of the second vibration portion 132, thereby providing the vibration apparatus 130 for further enhancing a sound of the high-pitched sound band.

Figure 6A:
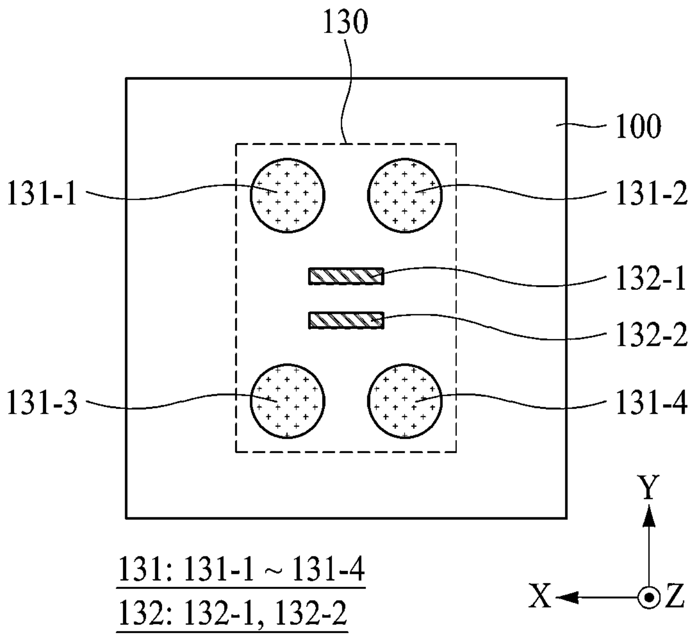
FIGS. 6A to 6C illustrate a vibration apparatus according to another example embodiment of the present disclosure.
Figure 6B:
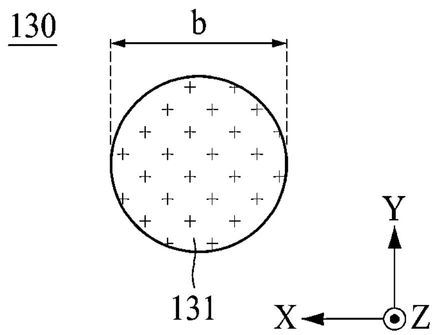
Figure 6C:
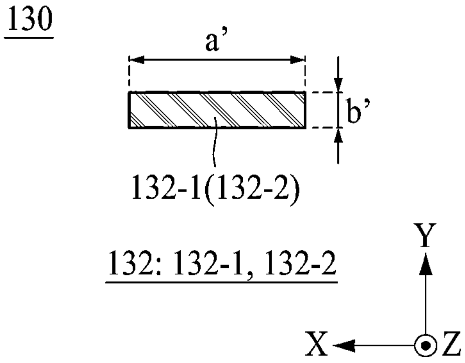

FIGS. 6A to 6C illustrate a vibration apparatus according to another example embodiment of the present disclosure.

Referring to FIGS. 6A to 6C, the vibration apparatus 130 according to another example embodiment of the present disclosure may include a first vibration portion 131 and a second vibration portion 132. Unless stated otherwise, the first vibration portion 131 and the second vibration portion 132 may be the same or substantially the same as the first vibration portion 131 and the second vibration portion 132 described above with reference to FIGS. 1 to 3C, and thus, repeated descriptions thereof may be omitted or may be briefly given below.

Referring to FIG. 6A, the first vibration portion 131 may be provided as (or may include) one or more first vibration portions. The first vibration portion 131 may be configured in a circular shape. For example, the first vibration portion 131 may include a 1-1$^{st}$ vibration portion 131-1, a 1-2$^{nd}$ vibration portion 131-2, a 1-3$^{rd}$ vibration portion 131-3, and a 1-4$^{th}$ vibration portion 131-4. The second vibration portion 132 may be provided as (or may include) a plurality of second vibration portions. For example, the second vibration portion 132 may include a 2-1$^{st}$ vibration portion 132-1 and a 2-2$^{nd}$ vibration portion 132-2. The second vibration portion 132 may be disposed at a center of the vibration member 100. For example, the 2-1$^{st}$ vibration portion 132-1 and the 2-2$^{nd}$ vibration portion 132-2 may be disposed at the center of the vibration member 100. The first vibration portion 131 may be disposed above and below the second vibration portion 132. For example, the first vibration portion 131 may be disposed above and below the second vibration portion 132 with respect to the second vibration portion 132. The 1-1$^{st}$ vibration portion 131-1 and the 1-2$^{nd}$ vibration portion 131-2 may be disposed above the second vibration portion 132. For example, the 1-1$^{st}$ vibration portion 131-1 and the 1-2$^{nd}$ vibration portion 131-2 may be disposed above the 2-1$^{st}$ vibration portion 132-1. The 1-3$^{nd}$ vibration portion 131-3 and the 1-4$^{th}$ vibration portion 131-4 may be disposed below the second vibration portion 132. For example, the 1-3$^{nd}$ vibration portion 131-3 and the 1-4$^{th}$ vibration portion 131-4 may be disposed below a 2-2$^{nd}$ vibration portion 132-2. A thickness of each of the first vibration portion 131 and the second vibration portion 132 may be 0.1 mm to 0.3 mm, but embodiments of the present disclosure are not limited thereto.

The 1-1$^{st}$ vibration portion 131-1 may be a first vibration portion, the 1-2$^{nd}$ vibration portion 131-2 may be a second vibration portion, the 1-3$^{rd}$ vibration portion 131-3 may be a third vibration portion, the 1-4$^{th}$ vibration portion 131-4 may be a fourth vibration portion, the 2-1$^{st}$ vibration portion 132-1 may be a fifth vibration portion, and the 2-2$^{nd}$ vibration portion 132-2 may be a sixth vibration portion. It is understood that the foregoing provides examples and does not limit the scope of the present disclosure.

The first vibration portion 131 may be configured in a circular shape and a diameter "b" of the first vibration portion 131 may be 5 cm to 12 cm, but embodiments of the present disclosure are not limited thereto.

Referring to FIG. 6C, a ratio "a'/b'" of a widthwise length "a'" to a lengthwise length "b'" of the second vibration portion 132 (for example, the 2-1$^{st}$ vibration portion 132-1 and the 2-2$^{nd}$ vibration portion 132-2) may be adjusted to 5 or more, but embodiments of the present disclosure are not limited thereto. Therefore, the second vibration portion 132 may have a high vibration displacement, and thus, a vibration characteristic of vibrating the vibration member 100 may increase, thereby outputting a high sound pressure level in the low-pitched sound band.

The vibration apparatus 130 according to an example embodiment of the present disclosure may individually drive each of the 1-1$^{st}$ vibration portion 131-1, the 1-2$^{nd}$ vibration portion 131-2, the 1-3$^{rd}$ vibration portion 131-3, the 1-4$^{th}$ vibration portion 131-4, the 2-1$^{st}$ vibration portion 132-1 and the 2-2$^{nd}$ vibration portion 132-2, and thus, driving of each vibration portion may be adjusted based on a desired sound (the high-pitched sound band or the low-pitched sound band). For example, in a case which implements a sound of the high-pitched sound band, by increasing a voltage applied to the first vibration portion 131 and decreasing a voltage applied to the second vibration portion 132, the vibration apparatus 130 may be implemented where the high-pitched sound band is emphasized more (or enhanced) in the same vibration apparatus 130. As another example, in a case which implements a sound of the low-pitched sound band, by decreasing a voltage applied to the first vibration portion 131 and increasing a voltage applied to the second vibration portion 132, the vibration apparatus 130 may be implemented where the low-pitched sound band is emphasized more (or enhanced) in the same vibration apparatus 130.

According to an example embodiment of the present disclosure, the first vibration portion 131 may be disposed above and below the second vibration portion 132 with respect to the second vibration portion 132, and thus, may complement a sound characteristic and/or a sound pressure level characteristic of the low pitched sound band, thereby providing the vibration apparatus 130 having a sound characteristic and/or a sound pressure level characteristic of the full-range pitched sound band including the low pitched sound band. In addition, an area of the first vibration portion 131 may be greater than that of the second vibration portion 132, thereby providing the vibration apparatus 130 for further enhancing a sound of the high-pitched sound band.

Figure 7:
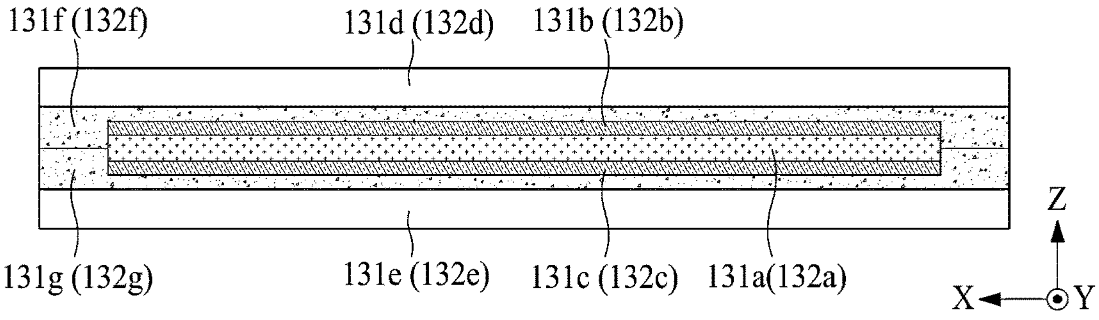
FIG. 7 illustrates a vibration apparatus according to an example embodiment of the present disclosure.

FIG. 7 illustrates a vibration apparatus according to an example embodiment of the present disclosure.

Referring to FIG. 7, the vibration apparatus 130 according to an example embodiment of the present disclosure may include a vibration layer, a first electrode portion, and a second electrode portion. A vibration layer 131*a* may be a vibration layer of each of a first vibration portion 131 and a second vibration portion 132. The first electrode portion and the second electrode portion may be a first electrode portion 131*b* and a second electrode portion 131*c* of the first vibration portion 131. The first electrode portion and the second electrode portion may be a first electrode portion 132*b* and a second electrode portion 132*c* of a second vibration portion 132. Hereinafter, a vibration layer 131*a*, a first electrode portion 131*b*, and a second electrode portion 131*c* of the first vibration portion 131 will be described for example. Unless stated otherwise, the descriptions of the vibration layer 131*a*, the first electrode portion 131*b*, and the second electrode portion 131*c* may be applicable to a vibration layer 132*a*, a first electrode portion 132*b*, and a second electrode portion 132*c* of the second vibration portion 132 in the same manner or substantially the same manner.

The first electrode portion 131*b* may be disposed at or on a first surface (or an upper surface) of the vibration layer 131*a*. For example, the first electrode portion 131*b* may be electrically connected to a first surface of the vibration layer 131*a*. For example, the first electrode portion 131*b* may be a common electrode or a single electrode (or may be in a form of common electrode) disposed at or on the whole (or entire) first surface of the vibration layer 131*a*. For example, the first electrode portion 131*b* may have substantially the same shape as that of the vibration layer 131*a*, but embodiments of the present disclosure are not limited thereto.

The first electrode portion 131*b* according to an example embodiment of the present disclosure may include a transparent conductive material, a semitransparent conductive material, or an opaque conductive material. For example, the transparent conductive material or the semitransparent conductive material may include one or more of indium tin oxide (ITO) or indium zinc oxide (IZO), but embodiments of the present disclosure are not limited thereto. The opaque conductive material may include one or more of aluminum (Al), copper (Cu), gold (Au), molybdenum (Mo), magnesium (Mg), or an alloy thereof, but embodiments of the present disclosure are not limited thereto.

The second electrode portion 131_c_ may be disposed at or on a surface, which is different from (or opposite to) the first surface, of the vibration layer 131_a_. For example, the second electrode portion 131_c_ may be disposed at a second surface (or a rear surface), which is different from (or opposite to) the first surface, of the vibration layer 131_a_. For example, the second electrode portion 131_c_ may be electrically connected to the second surface of the vibration layer 131_a_ of the first electrode portion 131. For example, the second electrode portion 131_c_ may be a common electrode or a single electrode (or may be in a form of common electrode) which is disposed at or on the whole (or entire) second surface of the vibration layer 131_a_. For example, the second electrode portion 131_c_ may be of the same form as that of the vibration layer 131_a_, but embodiments of the present disclosure are not limited thereto.

The second electrode portion 131_c_ according to an example embodiment of the present disclosure may include a transparent conductive material, a semitransparent conductive material, or an opaque conductive material. For example, the second electrode portion 131_c_ may include the same material as that of the first electrode portion 131_b_, but embodiments of the present disclosure are not limited thereto. In another embodiment of the present disclosure, the second electrode portion 131_c_ may include a material which is different from that of the first electrode portion 131_b_.

The vibration layer 131_a_ may be polarized (or poling) by a certain voltage applied to the first electrode portion 131_b_ and the second electrode portion 131_c_ in a certain temperature atmosphere or a temperature atmosphere which is changed from a high temperature to a room temperature, but embodiments of the present disclosure are not limited thereto. For example, the vibration layer 131_a_ may alternately and repeatedly contract or expand based on an inverse piezoelectric effect based on a sound signal (or a voice signal) applied from the outside to the first electrode portion 131_b_ and the second electrode portion 131_c_ to vibrate. For example, the vibration layer 131_a_ may vibrate the vibration member 100 as a vertical-direction vibration $d_{33}$ and a lateral-direction vibration $d_{32}$, based on the first electrode portion 131_b_ and the second electrode portion 131_c_. The vibration layer 131_a_ of the first electrode portion 131 may vibrate the vibration member 100 as the vertical-direction vibration $d_{33}$, based on the first electrode portion 131_b_ and the second electrode portion 131_c_. The vibration layer 132_a_ of the second electrode portion 132 may vibrate the vibration member 100 as the lateral-direction vibration $d_{32}$, based on the first electrode portion 131_b_ and the second electrode portion 131_c_. A displacement of a vibration member (or a vibration plate or a vibration object) may increase based on contraction and expansion of the vibration layer 130_a_ in a vertical direction and/or a lateral direction, and thus, a vibration characteristic may be further enhanced.

The vibration apparatus 130 according to an example embodiment of the present disclosure may further include a first cover member and a second cover member. The first cover member and the second cover member may be a first cover member 131_d_ and a second cover member 131_e_ of the first vibration portion 131. The first cover member and the second cover member may be a first cover member 132_d_ and a second cover member 132_e_ of the second vibration portion 132. Hereinafter, a first cover member 131_d_ and a second cover member 131_e_ of the first vibration portion 131 will be described for example. Unless stated otherwise, the descriptions of the first cover member 131_d_ and the second cover member 131_e_ may be applicable to a first cover member 132_d_ and a second cover member 132_e_ of the second vibration portion 132 in the same manner or substantially the same manner.

The first cover member 131_d_ may be disposed at the first surface of the vibration layer 131_a_. For example, the first cover member 131_d_ may be disposed at the first electrode portion 131_b_. For example, the first cover member 131_d_ may be configured to cover the first electrode portion 131_b_. Accordingly, the first cover member 131_d_ may protect the first electrode portion 131_b_.

The second cover member 131_e_ may be disposed at the second surface of the vibration layer 131_a_. For example, the second cover member 131_e_ may be disposed at the second electrode portion 131_c_. For example, the second cover member 131_e_ may be configured to cover the second electrode portion 131_c_. Accordingly, the second cover member 131_e_ may protect the second electrode portion 131_c_.

Each of the first cover member 131_d_ and the second cover member 131_e_ according to an example embodiment of the present disclosure may include one or more materials of plastic, fiber, and wood, but embodiments of the present disclosure are not limited thereto. For example, the first cover member 131_d_ and the second cover member 131_e_ may include the same material or different materials. For example, the first cover member 131_d_ and the second cover member 131_e_ may include one or more of a polyimide film, a polyethylene terephthalate film, or a polyethylene naphthalate film, but embodiments of the present disclosure are not limited thereto.

According to another example embodiment of the present disclosure, one or more of the first cover member 131_d_ and the second cover member 131_e_ may include an adhesive member. For example, one or more of the first cover member 131_d_ and the second cover member 131_e_ may include an adhesive member coupled or adhered to the vibration layer 131_a_ and a protection member (or a stripping member) which covers or protects the adhesive member. For example, the adhesive member may include an electrical insulation material which has adhesive properties and is capable of compression and decompression. For example, the first cover member 131_d_ may include an adhesive member coupled or adhered to the vibration layer 131_a_ and a protection member (or a stripping member) which covers or protects the adhesive member.

The first cover member 131_d_ according to an example embodiment of the present disclosure may be connected or coupled to the first electrode portion 131_b_ by a first adhesive layer 131_f_. For example, the first cover member 131_d_ may be connected or coupled to the first electrode portion 131_b_ through a film laminating process using the first adhesive layer 131_f_.

The second cover member 131_e_ according to an example embodiment of the present disclosure may be connected or coupled to the second electrode portion 131_c_ by a second adhesive layer 131_g_. For example, the second cover member 131_e_ may be connected or coupled to the second electrode portion 131_c_ through a film laminating process using the second adhesive layer 131_g_. Descriptions of the first adhesive layer 131_f_ and the second adhesive layer 131_g_ may be identically applied to a first adhesive layer 132_f_ and a second adhesive layer 132_g_ of the second vibration portion 132.

The first adhesive layer 131_f_ may be disposed between the first electrode portion 131_b_ and the first cover member 131_d_. The second adhesive layer 131_g_ may be disposed between the second electrode portion 131$c$ and the second cover member 131$e$. For example, the first adhesive layer 131$f$ and the second adhesive layer 131$g$ may be provided between the first cover member 131$d$ and the second cover member 131$e$ to surround the vibration layer 131$a$, the first electrode portion 131$b$, and the second electrode portion 131$c$. For example, the first adhesive layer 131$f$ and the second adhesive layer 131$g$ may be provided between the first cover member 131$d$ and the second cover member 131$e$ to fully surround the vibration layer 131$a$, the first electrode portion 131$b$, and the second electrode portion 131$c$. For example, the vibration layer 131$a$, the first electrode portion 131$b$, and the second electrode portion 131$c$ may be buried or embedded between the first adhesive layer 131$f$ and the second adhesive layer 131$g$.

Each of the first adhesive layer 131$f$ and the second adhesive layer 131$g$ according to an example embodiment of the present disclosure may include an electrical insulation material which has adhesive properties and is capable of compression and decompression. For example, each of the first adhesive layer 131$f$ and the second adhesive layer 131$g$ may include epoxy resin, acrylic resin, silicone resin, and urethane resin, but embodiments of the present disclosure are not limited thereto.

One of the first cover member 131$d$ and the second cover member 131$e$ may be adhered or coupled to a vibration member (or a vibration plate or a vibration object) by a connection member.

According to an example embodiment of the present disclosure, one of the first cover member 131$d$ and the second cover member 131$e$ may be adhered or coupled to a vibration member (or a vibration plate or a vibration object) by a connection member. For example, as described above with reference to FIGS. 1 and 2, one of the first cover member 131$d$ and the second cover member 131$e$ may be adhered or coupled to the vibration member 100 by the connection member 150.

A method of manufacturing the second vibration portion 132 according to an example embodiment of the present disclosure will be described below.

The second vibration portion 132 may be formed by a solid state crystal growth process, but embodiments of the present disclosure are not limited thereto. For example, the solid state crystal growth process may be a process of mixing powders such as ceramic, attaching a mixed powder on a single crystalline seed, and growing poly-crystal into single crystal through a sintering process. For example, the single crystalline seed may be $BaTixZr(1-x)O_3$, but embodiments of the present disclosure are not limited thereto. To describe such a process, powders such as ceramic may be mixed, milled, and fired. A firing temperature may be 800° C., but a temperature is not limited thereto. In addition, secondary raw materials may be mixed and milled. For example, the secondary raw material may be a lead (Pb) compensation raw material, but embodiments of the present disclosure are not limited thereto. Moreover, pellets may be manufactured and sintered. Furthermore, by a seed template (for example, poly-crystal), growth of a compound may be induced, and crystal growth and Pb compensation may be performed, thereby manufacturing the second vibration portion 132. Crystal growth and Pb compensation may be performed for 200 hours or more at a temperature of 900° C. or more, but embodiments of the present disclosure are not limited thereto.

According to another example embodiment of the present disclosure, the second vibration portion 132 may be formed by a Bridgman process. For example, the Bridgman process may be a process of melting all mixed powders including ceramic to a liquid state at a high temperature and growing single crystal from a small single crystal nucleus. To describe such a process, powders such as ceramic may be mixed, milled, and melted. A melting temperature may be 1,300° C. to 1,700° C., but embodiments of the present disclosure are not limited thereto. In addition, crystallization of a melted material may be induced while lowering a temperature, and thus, single crystal may be grown, thereby manufacturing the second vibration portion 132. A crystallization temperature may be 800° C. to 1,400° C., but embodiments of the present disclosure are not limited thereto.

Figure 8A:
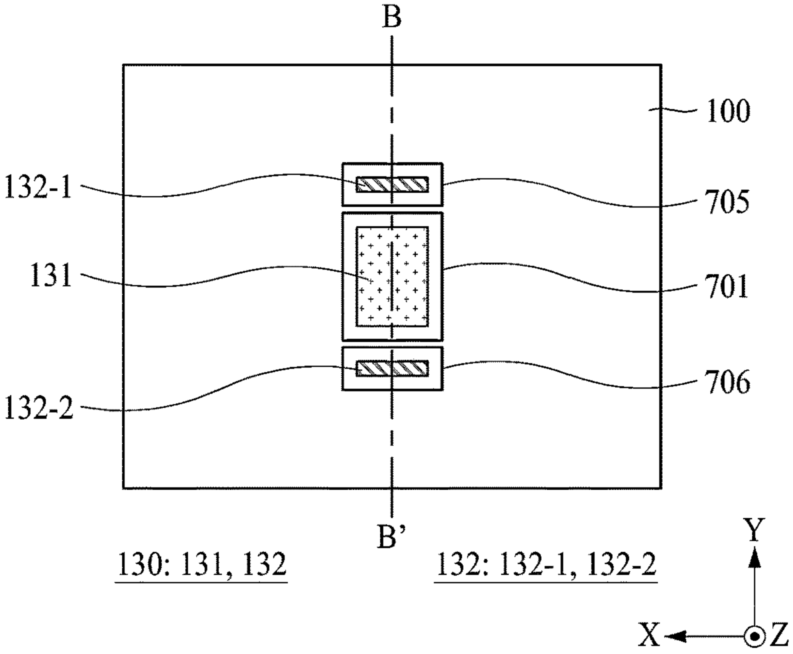
FIG. 8A illustrates a vibration apparatus according to another example embodiment of the present disclosure.
Figure 8B:
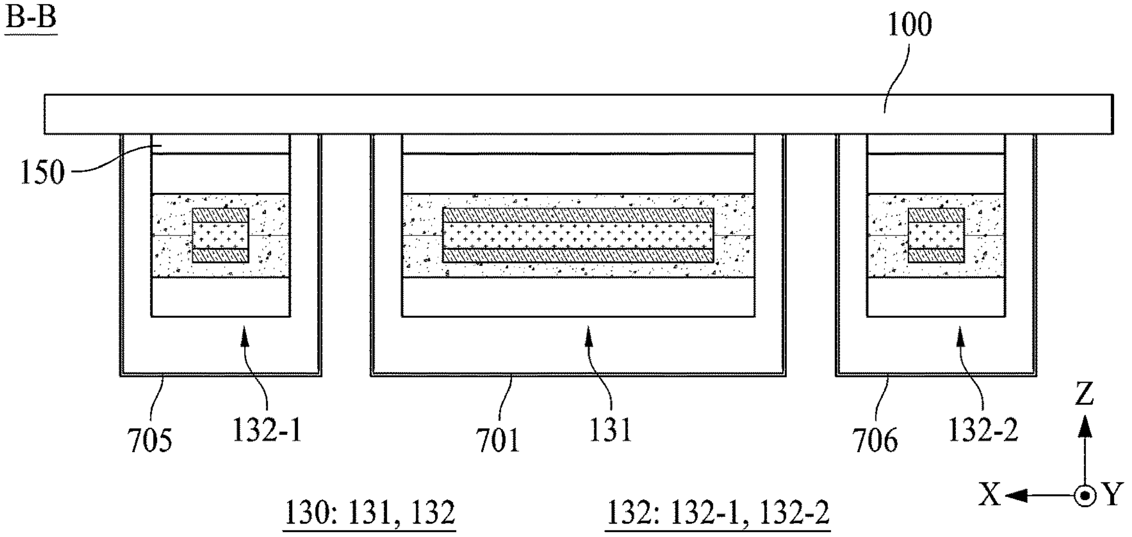
FIG. 8B is an example of a cross-sectional view taken along line B-B' of FIG. 8A.

FIG. 8A illustrates a vibration apparatus according to another example embodiment of the present disclosure. FIG. 8B is an example of a cross-sectional view taken along line B-B' of FIG. 8A.

Referring to FIGS. 8A and 8B, the vibration apparatus 130 according to another example embodiment of the present disclosure may include a first vibration portion 131 and a second vibration portion 132. The first vibration portion 131 and the second vibration portion 132 may be the same as the first vibration portion 131 and the second vibration portion 132 described above with reference to FIGS. 1 to 3C, and thus, repeated descriptions thereof may be omitted or may be briefly given below.

The vibration apparatus 130 according to another example embodiment of the present disclosure may further include a partition.

The partition according to an example embodiment of the present disclosure may include a first partition member 701, a second partition member 705, and a third partition member 706. The first partition member 701 (or a first enclosure) may surround the first vibration portion 131. The second partition member 705 and the third partition member 706 may surround each second vibration portion 132. For example, the second partition member 705 (or a second enclosure) may surround a 2-1$^{st}$ vibration portion 132-1. For example, the third partition member 706 (or a third enclosure) may surround a 2-2$^{nd}$ vibration portion 132-2. The first vibration portion 131 may be configured in a tetragonal shape.

The first to third partition members 701, 705, and 706 may each be (or may each include) an air gap or a space, where a sound is generated when the vibration member 100 is vibrated by the first vibration portion 131 and the second vibration portion 132. For example, the first to third partition members 701, 705, and 706 may block sound pressure level interference between the first vibration portion 131 and the second vibration portion 132 and may reinforce a sound pressure level characteristic of each of the first vibration portion 131 and the second vibration portion 132, thereby enhancing a sound pressure level characteristic. For example, the first partition member 701 may block sound pressure level interference between the first vibration portion 131 and the 2-1$^{st}$ vibration portion 132-1 and between the first vibration portion 131 and the 2-2$^{nd}$ vibration portion 132-2. For example, the second partition member 705 may block sound pressure level interference between the first vibration portion 131 and the 2-1$^{st}$ vibration portion 132-1. For example, the third partition member 706 may block sound pressure level interference between the first vibration portion 131 and the 2-2$^{nd}$ vibration portion 132-2. The first partition member 701 may limit (or define) a vibration region (or a vibration area) of the vibration member 100 by the first vibration portion 131. The second partition member 705 may limit (or define) a vibration region (or a vibration area) of the vibration member 100 by the second vibration portion 132 (for example, the 2-1$^{st}$ vibration portion 132-1). The third partition member 706 may limit (or define) a vibration region (or a vibration area) of the vibration member 100 by the second vibration portion 132 (for example, the 2-2$^{nd}$ vibration portion 132-2). The first to third partition members 701, 705, and 706 may each be referred to as a sound blocking member, a sound separation member, a space separation member, an enclosure, or a baffle, but embodiments of the present disclosure are not limited thereto.

For example, the first to third partition members 701, 705, and 706 may include a material having elasticity, which is capable of being compressed to a certain degree. For example, the first to third partition members 701, 705, and 706 may include one or more of polyurethane or polyolefin, but embodiments of the present disclosure are not limited thereto. In another embodiment of the present disclosure, the first to third partition members 701, 705, and 706 may include a single-sided tape, a single-sided foam tape, a double-sided tape, or a double-sided foam tape.

Referring to FIG. 8B, the first vibration portion 131 may be disposed at a center of the vibration member 100, and a plurality of second vibration portions 132-1 and 132-2 may be disposed at both sides of the first vibration portion 131. In the first vibration portion 131 and the plurality of second vibration portions 132-1 and 132-2, the vibration apparatus of FIGS. 3A to 3C is illustrated for example, but embodiments of the present disclosure are not limited thereto. For example, unless stated otherwise, the descriptions of the first vibration portion 131 and the plurality of second vibration portions 132-1 and 132-2 may be applicable to those of FIGS. 4A to 6C in the same manner or substantially the same manner.

Referring to FIG. 8B, each of the first vibration portion 131 and the plurality of second vibration portions 132-1 and 132-2 may include a vibration layer, a first electrode portion, and a second electrode portion described above with reference to FIG. 7. Furthermore, each of the first vibration portion 131 and the plurality of second vibration portions 132-1 and 132-2 may include a first cover member, a second cover member, a first adhesive layer, and a second adhesive layer described above with reference to FIG. 7. Repeated descriptions thereof may be omitted.

According to an example embodiment of the present disclosure, a partition member surrounding each of the first vibration portion 131 and the second vibration portion 132 may be provided, and thus, may block sound pressure level interference between the first vibration portion 131 and the second vibration portion 132 and may reinforce a sound pressure level characteristic of each of the first vibration portion 131 and the second vibration portion 132, thereby enhancing a sound pressure level.

Figure 9A:
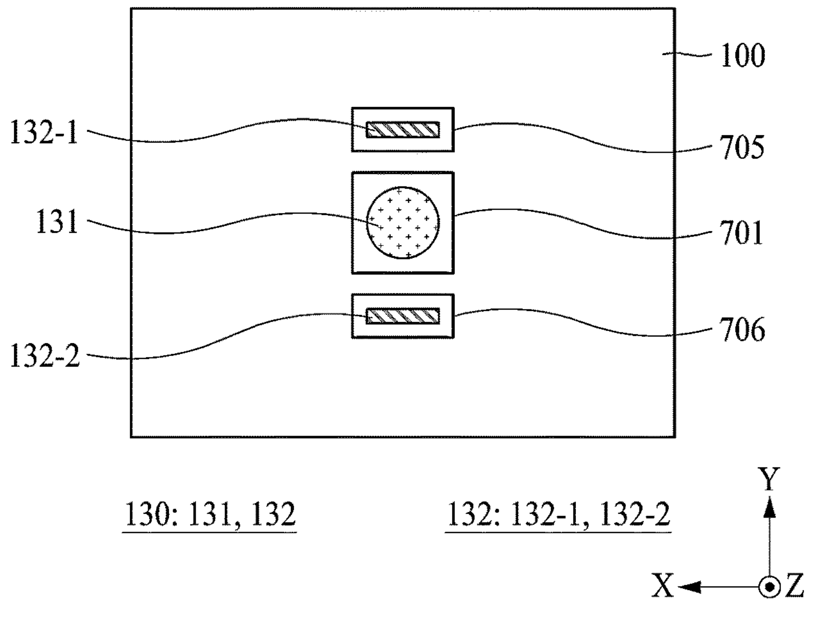
FIGS. 9A to 9C illustrate a vibration apparatus according to another example embodiment of the present disclosure.
Figure 9B:
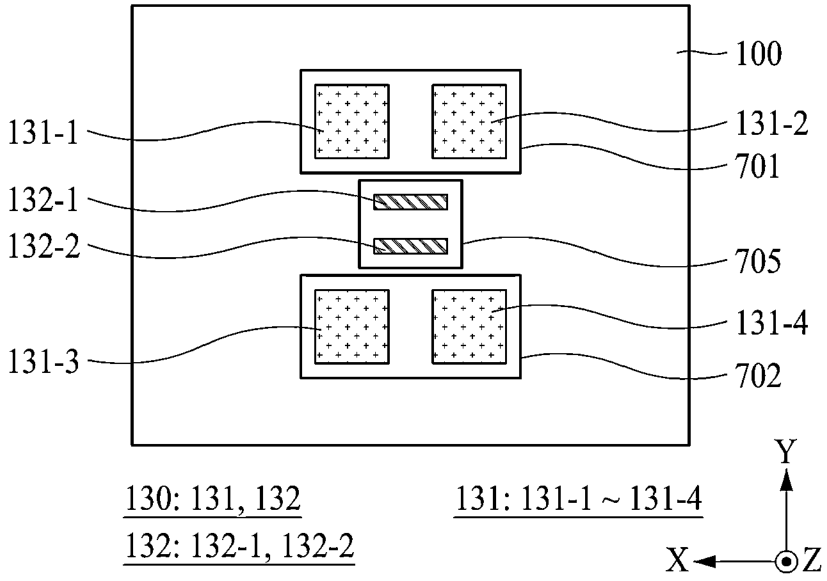
Figure 9C:
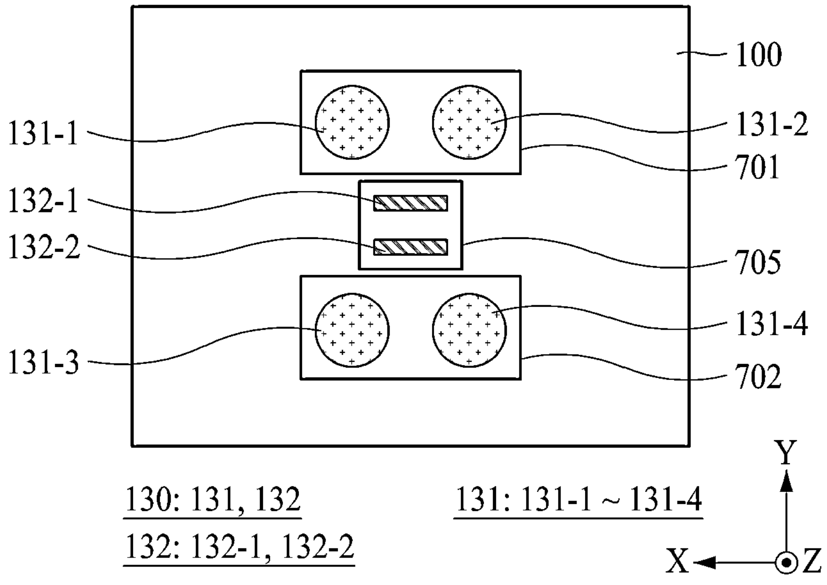

FIGS. 9A to 9C illustrate a vibration apparatus according to another example embodiment of the present disclosure.

Referring to FIGS. 9A to 9C, the vibration apparatus according to another example embodiment of the present disclosure may further include a partition. Unless stated otherwise, the descriptions of the partition (or partition member) described above with reference to FIGS. 8A and 8B may be applicable to that of FIGS. 9A to 9C in the same manner or substantially the same manner.

Referring to FIG. 9A, a first vibration portion 131 may be configured in a circular shape. For example, a second vibration portion 132 may include a 2-1$^{st}$ vibration portion 132-1 and a 2-2$^{nd}$ vibration portion 132-2. The second vibration portion may be configured with or as the 2-1$^{st}$ vibration portion 132-1 and the 2-2$^{nd}$ vibration portion 132-2. The first vibration portion 131 may be disposed at a center of a vibration member 100. The second vibration portion 132 may be disposed above and below the first vibration portion 131. The second vibration portion 132 may be disposed above and below the first vibration portion 131 with respect to the first vibration portion 131. For example, the 2-1$^{st}$ vibration portion 132-1 may be disposed above the first vibration portion 131. For example, the 2-2$^{nd}$ vibration portion 132-2 may be disposed below the first vibration portion 131.

The partition according to another example embodiment of the present disclosure may include a first partition member 701, a second partition member 705, and a third partition member 706. The first partition member 701 (or a first enclosure) may surround the first vibration portion 131. The second partition member 705 and the third partition member 706 (or a third enclosure) may surround the second vibration portion 132. For example, the second partition member 705 (or a second enclosure) may surround the 2-1$^{st}$ vibration portion 132-1. For example, the third partition member 706 (or the third enclosure) may surround the 2-2$^{nd}$ vibration portion 132-2.

For example, the first partition member 701 may block sound pressure level interference between the first vibration portion 131 and the 2-1$^{st}$ vibration portion 132-1 and between the first vibration portion 131 and the 2-2$^{nd}$ vibration portion 132-2. For example, the second partition member 705 may block sound pressure level interference between the first vibration portion 131 and the 2-1$^{st}$ vibration portion 132-1. For example, the third partition member 706 may block sound pressure level interference between the first vibration portion 131 and the 2-2$^{nd}$ vibration portion 132-2. The first partition member 701 may limit (or define) a vibration region (or a vibration area) of the vibration member 100 by the first vibration portion 131. The second partition member 705 may limit (or define) a vibration region (or a vibration area) of the vibration member 100 by the second vibration portion 132 (for example, the 2-1$^{st}$ vibration portion 132-1). The third partition member 706 may limit (or define) a vibration region (or a vibration area) of the vibration member 100 by the second vibration portion 132 (for example, the 2-2$^{nd}$ vibration portion 132-2).

Referring to FIG. 9B, the first vibration portion 131 may be configured in a tetragonal shape. As another example, the first vibration portion 131 may be configured in a square shape, a rectangular shape, or a rhombus shape. For example, the first vibration portion 131 may include a 1-1$^{st}$ vibration portion 131-1, a 1-2$^{nd}$ vibration portion 131-2, a 1-3$^{rd}$ vibration portion 131-3, and a 1-4$^{th}$ vibration portion 131-4. The second vibration portion 132 may be provided in plurality. For example, the second vibration portion 132 may include a 2-1$^{st}$ vibration portion 132-1 and a 2-2$^{nd}$ vibration portion 132-2. The second vibration portion 132 may be disposed at a center of the vibration member 100. For example, the 2-1$^{st}$ vibration portion 132-1 and the 2-2$^{nd}$ vibration portion 132-2 may be disposed at the center of the vibration member 100. The first vibration portion 131 may be disposed above and below the second vibration portion 132. For example, the first vibration portion 131 may be disposed above and below the second vibration portion 132 with respect to the second vibration portion 132. The 1-1$^{st}$ vibration portion 131-1 and the 1-2$^{nd}$ vibration portion 131-2 may be disposed above the second vibration portion 132. For example, the 1-1$^{st}$ vibration portion 131-1 and the 1-2$^{nd}$ vibration portion 131-2 may be disposed above the 2-1$^{st}$ vibration portion 132-1. The 1-3$^{rd}$ vibration portion 131-3 and the 1-4$^{th}$ vibration portion 131-4 may be disposed below the second vibration portion 132. For example, the 1-3$^{rd}$ vibration portion 131-3 and the 1-4$^{th}$ vibration portion 131-4 may be disposed below a 2-2$^{nd}$ vibration portion 132-2.

The partition according to another example embodiment of the present disclosure may include a first partition member 701, a second partition member 705, and a fourth partition member 702. The first partition member 701 (or a first enclosure) may surround the first vibration portion 131. For example, the first partition member 701 may surround the 1-1$^{st}$ vibration portion 131-1 and the 1-2$^{nd}$ vibration portion 131-2. The second partition member 705 (or a second enclosure) may surround the second vibration portion 132. For example, the second partition member 705 may surround the 2-1$^{st}$ vibration portion 132-1 and the 2-2$^{nd}$ vibration portion 132-2. The fourth partition member 702 (or a fourth enclosure) may surround the first vibration portion 131. For example, the fourth partition member 702 may surround the 1-3$^{rd}$ vibration portion 131-3 and the 1-4$^{th}$ vibration portion 131-4.

For example, the first partition member 701 may block sound pressure level interference between the 2-1$^{st}$ vibration portion 132-1 and the 2-2$^{nd}$ vibration portion 132-2 and the 1-1$^{st}$ vibration portion 131-1 and the 1-2$^{nd}$ vibration portion 131-2. For example, the second partition member 705 may block sound pressure level interference between the 2-1$^{st}$ and 2-2$^{nd}$ vibration portions 132-1 and 132-2 and the 1-1$^{st}$ and 1-2$^{nd}$ vibration portions 131-1 and 131-2 and between the 2-1$^{st}$ and 2-2$^{nd}$ vibration portions 132-1 and 132-2 and the 1-3$^{rd}$ and 1-4$^{th}$ vibration portions 131-3 and 131-4. For example, the fourth partition member 702 may block sound pressure level interference between the 2-1$^{st}$ and 2-2$^{nd}$ vibration portions 132-1 and 132-2 and the 1-3$^{rd}$ and 1-4$^{th}$ vibration portions 131-3 and 131-4. The first partition member 701 may limit (or define) a vibration region (or a vibration area) of the vibration member 100 by the first vibration portion 131 (for example, the 1-1$^{st}$ and 1-2$^{nd}$ vibration portions 131-1 and 131-2). The second partition member 705 may limit (or define) a vibration region (or a vibration area) of the vibration member 100 by the second vibration portion 132 (for example, the 2-1$^{st}$ and 2-2$^{nd}$ vibration portions 132-1 and 132-2). The fourth partition member 702 may limit (or define) a vibration region (or a vibration area) of the vibration member 100 by the first vibration portion 131 (for example, the 1-3$^{rd}$ and 1-4$^{th}$ vibration portions 131-3 and 131-4).

Referring to FIG. 9C, the first vibration portion 131 may be provided as (or may include) one or more first vibration portions. The first vibration portion 131 may be configured in a circular shape. For example, the first vibration portion 131 may include a 1-1$^{st}$ vibration portion 131-1, a 1-2$^{nd}$ vibration portion 131-2, a 1-3$^{rd}$ vibration portion 131-3, and a 1-4$^{th}$ vibration portion 131-4. The second vibration portion 132 may be provided as (or may include) a plurality of second vibration portions. For example, the second vibration portion 132 may include a 2-1$^{st}$ vibration portion 132-1 and a 2-2$^{nd}$ vibration portion 132-2. The second vibration portion 132 may be disposed at a center of the vibration member 100. For example, the 2-1$^{st}$ vibration portion 132-1 and the 2-2$^{nd}$ vibration portion 132-2 may be disposed at the center of the vibration member 100. The first vibration portion 131 may be disposed above and below the second vibration portion 132. For example, the first vibration portion 131 may be disposed above and below the second vibration portion 132 with respect to the second vibration portion 132. The 1-1$^{st}$ vibration portion 131-1 and the 1-2$^{nd}$ vibration portion 131-2 may be disposed above the first vibration portion 132. For example, the 1-1$^{st}$ vibration portion 131-1 and the 1-2$^{nd}$ vibration portion 131-2 may be disposed above the 2-1$^{st}$ vibration portion 132-1. The 1-3$^{nd}$ vibration portion 131-3 and the 1-4$^{th}$ vibration portion 131-4 may be disposed below the second vibration portion 132. For example, the 1-3$^{nd}$ vibration portion 131-3 and the 1-4$^{th}$ vibration portion 131-4 may be disposed below a 2-2$^{nd}$ vibration portion 132-2.

The partition according to another example embodiment of the present disclosure may include a first partition member 701, a second partition member 705, and a fourth partition member 702. The first partition member 701, the second partition member 705, and the fourth partition member 702 may be the same or substantially the same as the details described above with reference to FIG. 9B, and thus, repeated descriptions thereof may be omitted.

According to an example embodiment of the present disclosure, a partition member surrounding each of the first vibration portion 131 and the second vibration portion 132 may be provided, and thus, may block sound pressure level interference between the first vibration portion 131 and the second vibration portion 132 and may reinforce a sound pressure level characteristic of each of the first vibration portion 131 and the second vibration portion 132, thereby enhancing a sound pressure level.

Figure 10:
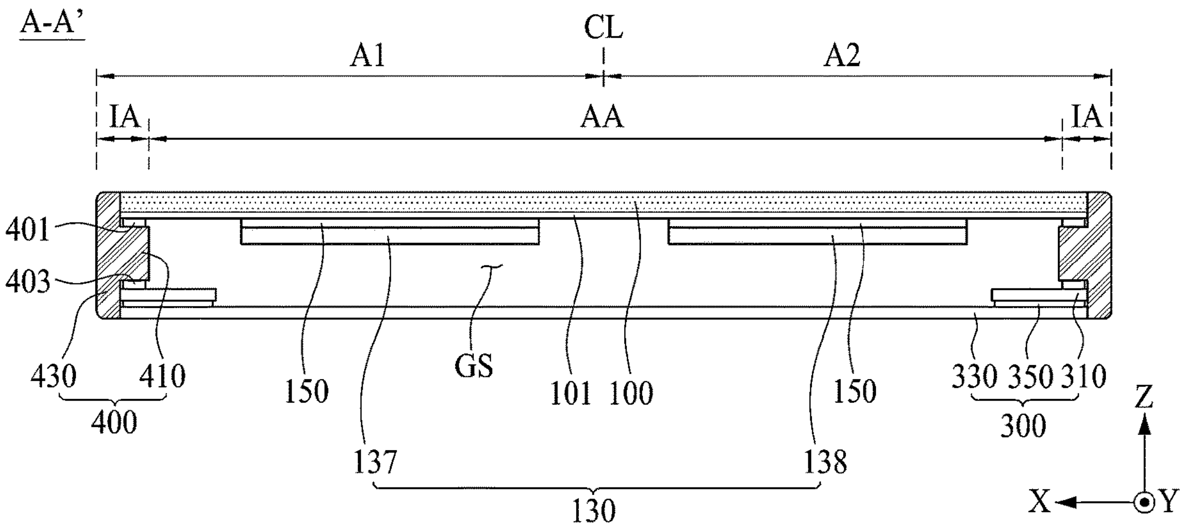
FIG. 10 is an example of another cross-sectional view taken along line A-A' of FIG. 1.
Figure 11:
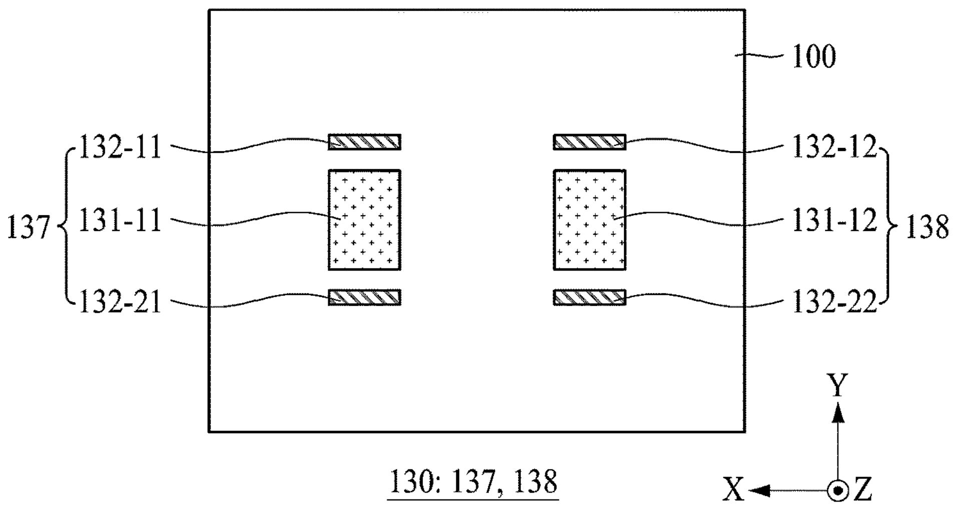
FIG. 11 illustrates a vibration apparatus according to another example embodiment of the present disclosure.

FIG. 10 illustrates an apparatus according to another example embodiment of the present disclosure. FIG. 10 is an example of another cross-sectional view taken along line A-A' of FIG. 1. FIG. 11 illustrates a vibration apparatus according to another example embodiment of the present disclosure.

Referring to FIGS. 10 and 11, in the apparatus according to another example embodiment of the present disclosure, a rear surface (or a backside surface) of a vibration member 100 or a display panel may include a first region (or a first rear region) A1 and a second region (or a second rear region) A2. For example, in the rear surface of the vibration member 100 or the display panel, the first region A1 may be a left rear region, and the second region A2 may be a right rear region. In connection with a first direction X, the first region A1 and the second region A2 may be horizontally symmetrical with respect to a center line CL of the vibration member 100 or the display panel, but embodiments of the present disclosure are not limited thereto. For example, when the vibration member 100 is a display panel, each of the first region A1 and the second region A2 may overlap a display area of the display panel.

The vibration apparatus 130 according to another example embodiment of the present disclosure may include a first vibration apparatus 137 and a second vibration apparatus 138, which are disposed at a rear surface of the vibration member 100 or the display panel. For example, the first vibration apparatus 137 may be a first vibration generating apparatus, a first displacement apparatus, a first sound apparatus, or a first sound generating apparatus, but the terms are not limited thereto. For example, the second vibration apparatus 138 may be a second vibration generating apparatus, a second displacement apparatus, a second sound apparatus, or a second sound generating apparatus, but the terms are not limited thereto.

The first vibration apparatus 137 may be disposed in or at the first region A1 of the vibration member 100 or the display panel. For example, the first vibration apparatus 137 may be disposed at a center portion of the first region A1 of the vibration member 100 or the display panel, with respect to the first direction X. As another example, the first vibration apparatus 137 may be disposed to be close to the center portion or an edge (or a periphery) of the first region A1 of the vibration member 100 or the display panel, with respect to the first direction X. The first vibration apparatus 137 according to an example embodiment of the present disclosure may vibrate the first region A1 of the vibration member 100 or the display panel, and thus, may generate a first vibration sound or a first haptic feedback in the first region A1 of the vibration member 100 or the display panel. For example, the first vibration apparatus 137 according to an example embodiment of the present disclosure may directly vibrate the first region A1 of the vibration member 100 or the display panel, and thus, may generate the first vibration sound or the first haptic feedback in the first region A1 of the vibration member 100 or the display panel. For example, the first vibration sound may be a left sound. A size of the first vibration apparatus 137 according to an example embodiment of the present disclosure may be half or less, or half or more, of a size of the first region A1 based on a characteristic of the first vibration sound or a sound characteristic desired by the apparatus. In another embodiment of the present disclosure, a size of the first vibration apparatus 137 may be a size corresponding to the first region A1 of the vibration member 100 or the display panel. For example, a size of the first vibration apparatus 137 may be a size which is less than or equal to that of the first region A1 of the vibration member 100 or the display panel.

The second vibration apparatus 138 may be disposed in or at the second region A2 of the vibration member 100 or the display panel. For example, the second vibration apparatus 138 may be disposed at a center portion of the second region A2 of the vibration member 100 or the display panel, with respect to the first direction X. For example, the second vibration apparatus 138 may be disposed to be close to the center portion or an edge (or a periphery) of the second region A2 of the vibration member 100 or the display panel, with respect to the first direction X. The second vibration apparatus 138 according to an example embodiment of the present disclosure may vibrate the second region A2 of the vibration member 100 or the display panel, and thus, may generate a second vibration sound or a second haptic feedback in the second region A2 of the vibration member 100 or the display panel. For example, the second vibration apparatus 138 according to an example embodiment of the present disclosure may directly vibrate the second region A2 of the vibration member 100 or the display panel, and thus, may generate the second vibration sound or the second haptic feedback in the second region A2 of the vibration member 100 or the display panel. For example, the second vibration sound may be a right sound. A size of the second vibration apparatus 138 according to an example embodiment of the present disclosure may be half or less, or half or more, of a size of the second region A2 based on a characteristic of the second vibration sound or a sound characteristic desired by the apparatus. In another embodiment of the present disclosure, a size of the second vibration apparatus 138 may be a size corresponding to the second region A2 of the vibration member 100 or the display panel. For example, a size of the second vibration apparatus 138 may be a size which is less than or equal to that of the second region A2 of the vibration member 100 or the display panel. Accordingly, the first and second vibration apparatuses 137 and 138 may have the same size or different sizes, based on a left and right sound characteristic of the apparatus and/or a sound characteristic of the apparatus. Furthermore, the first and second vibration apparatuses 137 and 138 may be disposed in or at a left and right symmetrical structure or a left and right asymmetrical structure with respect to the center line CL of the vibration member 100 or the display panel.

Each of the first and second vibration apparatuses 137 and 138 may include one or more of the vibration apparatuses 130 described above with reference to FIGS. 3A to 6C and 8A to 9C, and thus, repeated descriptions thereof may be omitted.

Referring to FIG. 11, the first vibration apparatus 137 may include one or more first vibration portions 131-11 and a plurality of second vibration portions 132-11 and 132-21. The second vibration apparatus 138 may include one or more first vibration portions 131-12 and a plurality of second vibration portions 132-12 and 132-22. In FIG. 11, an embodiment where each of the first and second vibration apparatuses 137 and 138 is configured as the vibration apparatus 130 of FIGS. 3A to 3C has been described for example, but embodiments of the present disclosure are not limited thereto. For example, each of the first and second vibration apparatuses 137 and 138 may include one of the vibration apparatuses described above with reference to FIGS. 4A to 4C, 5A to 5C, 6A to 6C, 8A, 8B, and 9A to 9C.

For example, each of the first and second vibration apparatuses 137 and 138 may include one or more of the vibration apparatuses 130 described above with reference to at least one of FIGS. 3A, 4A, 8A, and 9A. In such a configuration, each of the first and second vibration apparatuses 137 and 138 may implement a sound of an enhanced low-pitched sound band. For example, each of the first and second vibration apparatuses 137 and 138 may include one or more of the vibration apparatuses 130 described above with reference to at least one of FIGS. 5A, 6A, 9A, and 9C. In such a configuration, each of the first and second vibration apparatuses 137 and 138 may implement a sound of a high-pitched sound band which is further enhanced.

A connection member 150 according to an example embodiment of the present disclosure may be disposed between each of the first and second vibration apparatuses 137 and 138 and a rear surface of the vibration member 100 or the display panel. For example, each of the first and second vibration apparatuses 137 and 138 may be disposed at the rear surface of the vibration member 100 or the display panel by the connection member 150. The connection member 150 may be substantially the same as the connection member 150 described above with reference to FIG. 2, and thus, repeated descriptions thereof may be omitted.

Therefore, the apparatus according to another example embodiment of the present disclosure may output a sound, including a left sound and a right sound, in a forward direction of the vibration member 100 or the display panel through the first and second vibration apparatuses 137 and 138 to provide the sound to a user.

The vibration apparatus 130 according to an example embodiment of the present disclosure may further include a plate 101.

According to an example embodiment of the present disclosure, the plate 101 may be connected or coupled to a rear surface of the vibration member 100. For example, when the vibration member 100 is a light emitting display panel which is a display panel, the plate 101 may be disposed at a rear surface of an encapsulation portion of the light emitting display panel. The plate 101 may be disposed at the rear surface of the encapsulation portion and may be configured in a bonded structure. The plate 101 may dissipate heat occurring in the display panel. For example, the plate 101 may be referred to as a heat dissipation member, a heat dissipation plate, or a heat sink, but the terms are not limited thereto.

According to an example embodiment of the present disclosure, the plate 101 may reinforce a mass of the vibration apparatus 130 which is disposed or hung on the rear surface of the vibration member 100. Therefore, the plate 101 may decrease a resonance frequency of the vibration apparatus 130 based on an increase in mass of the vibration apparatus 130. Accordingly, the plate 101 may increase a sound characteristic of the low-pitched sound band and a sound pressure level characteristic of the low-pitched sound band generated based on a vibration of the vibration apparatus 130 and may enhance flatness of a sound characteristic. For example, the flatness of a sound characteristic may represent a deviation in magnitude between a highest sound pressure level and a lowest sound pressure level. For example, the plate 101 may be referred to as a weight member, a mass member, or a sound planarization member, but the terms are not limited thereto.

The plate 101 may have the same shape and size as those of the vibration member 100 or the display panel, or may have the same shape and size as those of the vibration apparatus 130. In another embodiment of the present disclosure, the plate 101 may have a size which is different from that of the vibration member 100 or the display panel. For example, the plate 101 may be less in size (or may be smaller) than the vibration member 100 or the display panel. In another embodiment of the present disclosure, the plate 101 may have a size which is different from that of the vibration apparatus. For example, the plate 101 may be greater or less in size than the vibration apparatus 130. The vibration apparatus 130 may have a size which is less than or equal to that of the vibration member 100 or the display panel.

The plate 101 according to an example embodiment of the present disclosure may include a metal material. For example, the plate 101 may include one or more materials of stainless steel, Al, Mg, a Mg alloy, a magnesium-lithium (Mg—Li) alloy, and an Al alloy, but embodiments of the present disclosure are not limited thereto.

According to an example embodiment of the present disclosure, a displacement amount (or a bending force) or a displacement in amplitude (or a vibration width) of the vibration member 100 or the display panel with the plate 101 disposed therein may decrease as a thickness of the plate 101 increases, based on the stiffness of the plate 101. Consequently, a sound pressure level characteristic and a low-pitched sound band characteristic of a sound generated based on a displacement (or vibration or driving) of the vibration member 100 or the display panel may be reduced.

The plate 101 according to an example embodiment of the present disclosure may be coupled or connected to the rear surface of the vibration member 100 or the display panel by a connection member (or a fifth connection member). The connection member may be disposed between the vibration member 100 and the plate 101.

The connection member according to an example embodiment of the present disclosure may include an adhesive layer which has a relatively strong adhesive force or attaching force with respect to each of the rear surface of the vibration member 100 or the display panel and the vibration apparatus 130. For example, the connection member may include a foam pad, a double-sided tape, or an adhesive. For example, an adhesive layer of the connection member may include epoxy, acryl, silicone, or urethane, but embodiments of the present disclosure are not limited thereto. For example, the adhesive layer of the connection member may be the same or substantially the same as the adhesive layer of the connection member 150, but embodiments of the present disclosure are not limited thereto. For example, the adhesive layer of the connection member may include an acryl-based material which has a relatively strong adhesive force and a relatively high hardness compared to a urethane-based material, so that a vibration of the vibration apparatus 130 is transferred effectively to the vibration member 100. In another embodiment of the present disclosure, the adhesive layer of the connection member may be configured to be different from the adhesive layer of the connection member 150.

The plate 101 according to an example embodiment of the present disclosure may be integrated into the vibration apparatus 130 or may be included in the vibration apparatus 130. For example, the plate 101 and the vibration apparatus 130 may be configured as one part (or apparatus) or one structure provided as one body (or one unitary body). Accordingly, when the plate 101 is disposed between the vibration apparatus 130 and the rear surface of the vibration member 100 or the display panel, an assembly process between the vibration apparatus 130 and the vibration member 100 or the display panel may be easily performed based on part integration (or unification) between the plate 101 and the vibration apparatus 130.

In another embodiment of the present disclosure, when the plate 101 and the vibration apparatus 130 are configured as one part (or apparatus) or one structure provided as one body, a non-display panel may be configured as a vibration plate. The plate 101 and the vibration apparatus 130 may be disposed in or at the non-display panel. The plate 101 and the vibration apparatus 130 may be coupled or connected to each other by the connection member 150. For example, the plate 101 may be (or may include) one or more of metal, wood, rubber, plastic, glass, cloth, fiber, paper, a mirror, leather, an interior material of a vehicle, a ceiling of a building, and an interior material of an aircraft, but embodiments of the present disclosure are not limited thereto. Therefore, the vibration apparatus 130 may vibrate the non-display panel to output a sound. In another embodiment of the present disclosure, when the plate 101 and the vibration apparatus 130 are configured as one part (or apparatus) or one structure provided as one body, the plate 101 may be configured as a vibration plate. For example, in a module (or a structure body) of the plate 101 and the vibration apparatus 130, the plate 101 may include a single nonmetal material or a composite nonmetal material including one or more of wood, rubber, plastic, glass, cloth, fiber, paper, a mirror, and leather, but embodiments of the present disclosure are not limited thereto.

The plate 101 according to another example embodiment of the present disclosure may include a plurality of opening portions. The plurality of opening portions may be configured to have a certain size and a certain interval. For example, the plurality of opening portions may be arranged in a first direction X and a second direction Y to have a certain size and a certain interval. Each of the plurality of opening portions may prevent a sound wave (or a sound pressure level) based on a vibration of the vibration apparatus 130 from being dispersed by the plate 101 and may allow the sound wave to concentrate on the vibration member 100, and thus, the loss of a vibration caused by the plate 101 may be minimized, thereby increasing a sound pressure level characteristic of a sound generated based on a vibration of the vibration member 100. For example, the plate 101 including the plurality of opening portions may have a mesh shape. For example, the plate 101 including the plurality of opening portions may have a mesh plate.

The apparatus according to an example embodiment of the present disclosure may include two or more vibration apparatuses 137 and 138, and thus, a sound including a left sound and a right sound may be provided to a user based on vibrations of the two or more vibration apparatuses 137 and 138.

Moreover, the apparatus according to an example embodiment of the present disclosure may further include the plate 101 disposed at the rear surface of the vibration apparatus 130, and thus, a resonance frequency of the vibration apparatus 130 may be reduced. Accordingly, a sound characteristic of the low-pitched sound band and a sound pressure level characteristic of the low-pitched sound band generated based on a vibration of the vibration member 100 or the display panel based on a vibration of the vibration apparatus 130 according to an example embodiment of the present disclosure may increase, and the flatness of a sound characteristic may be enhanced.

Moreover, in the apparatus according to an example embodiment of the present disclosure, each of the two or more vibration apparatuses 137 and 138 may be configured with or as a first vibration portion and a second vibration portion, and thus, an apparatus may be provided where a sound characteristic and/or a sound pressure level characteristic of the low-pitched sound band are/is further enhanced.

Figure 12:
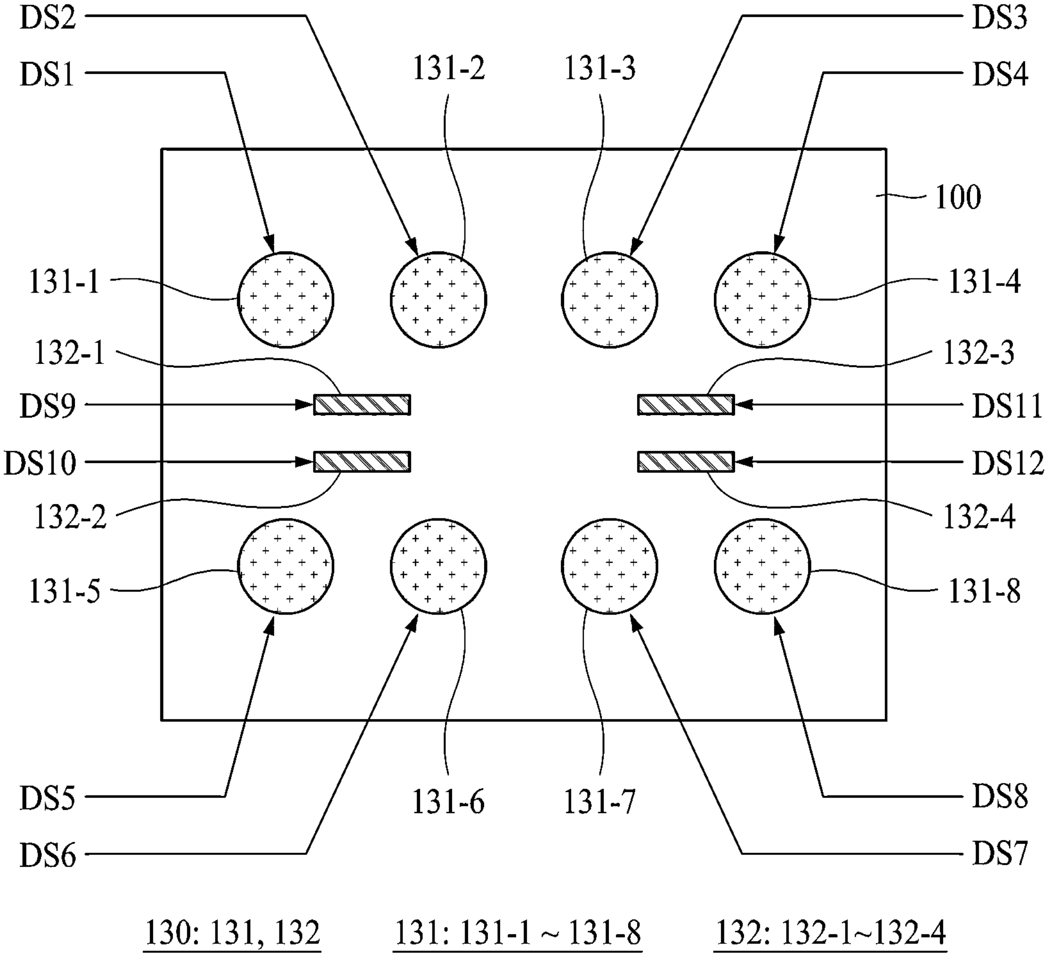
FIG. 12 illustrates an apparatus according to another example embodiment of the present disclosure.

FIG. 12 illustrates an apparatus according to another example embodiment of the present disclosure.

Referring to FIG. 12, in the apparatus according to another example embodiment of the present disclosure, a vibration apparatus 130 may include one or more first vibration portions 131 and a plurality of second vibration portions 132. For example, the one or more first vibration portions 131 may include a 1-1$^{st}$ vibration portion 131-1, a 1-2$^{nd}$ vibration portion 131-2, a 1-3$^{rd}$ vibration portion 131-3, a 1-4$^{th}$ vibration portion 131-4, a 1-5$^{th}$ vibration portion 131-5, a 1-6$^{th}$ vibration portion 131-6, a 1-7$^{th}$ vibration portion 131-7, and a 1-8$^{th}$ vibration portion 131-8, and the plurality of second vibration portions 132 may include a 2-1$^{st}$ vibration portion 132-1, a 2-2$^{nd}$ vibration portion 132-2, a 2-3$^{nd}$ vibration portion 132-3, and a 2-4$^{th}$ vibration portion 132-4.

Each of the 1-1$^{st}$ to 1-8$^{th}$ vibration portions 131-1 to 131-8 may be supplied with a driving signal (or a sound signal) to output a sound. In an embodiment of the present disclosure, an example of active sound driving will be described below. For example, in a screen of a television, an example where the left portion of the screen displays subtitles such as news, and the right portion of the screen displays an announcer explaining the news will be described.

For example, a first driving signal DS1 may be applied to the 1-1$^{st}$ vibration portion 131-1, and a second driving signal DS2 may be applied to the 1-2$^{nd}$ vibration portion 131-2. Because the left portion of the screen displays the subtitles such as news, driving may be performed to reduce a characteristic of the high-pitched sound band. For example, a ninth driving signal DS9 may be applied to the 2-1$^{st}$ vibration portion 132-1, and a tenth driving signal DS10 may be applied to the 2-2$^{nd}$ vibration portion 132-2. Because the left portion of the screen displays the subtitles such as news, driving may be performed to reduce a characteristic of the high-pitched sound band. A fifth driving signal DS5 may be applied to the 1-5$^{th}$ vibration portion 131-5, and a sixth driving signal DS6 may be applied to the 1-6$^{th}$ vibration portion 131-6. Because the left portion of the screen displays the subtitles such as news, driving may be performed to reduce a characteristic of the high-pitched sound band.

For example, a third driving signal DS3 may be applied to the 1-3$^{rd}$ vibration portion 131-3, and a fourth driving signal DS4 may be applied to the 1-4$^{th}$ vibration portion 131-4. Because the right portion of the screen displays the announcer explaining news, driving may be performed to increase a characteristic of the high-pitched sound band. An eleventh driving signal DS11 may be applied to the 2-3$^{rd}$ vibration portion 132-3, and a twelfth driving signal DS12 may be applied to the 2-4$^{th}$ vibration portion 132-4. Because the right portion of the screen displays the announcer explaining news, driving may be performed to increase a characteristic of the high-pitched sound band. A seventh driving signal DS7 may be applied to the 1-7$^{th}$ vibration portion 131-7, and an eighth driving signal DS8 may be applied to the 1-8$^{th}$ vibration portion 131-8. Because the right portion of the screen displays the announcer explaining news, driving may be performed to increase a characteristic of the high-pitched sound band.

According to an example embodiment of the present disclosure, by applying an individual or independent driving signal (or sound signal) to the first vibration portion and the second vibration portion, a driving signal based on a desired sound characteristic may be applied, and thus, an apparatus having a desired sound characteristic may be implemented.

Figure 13:
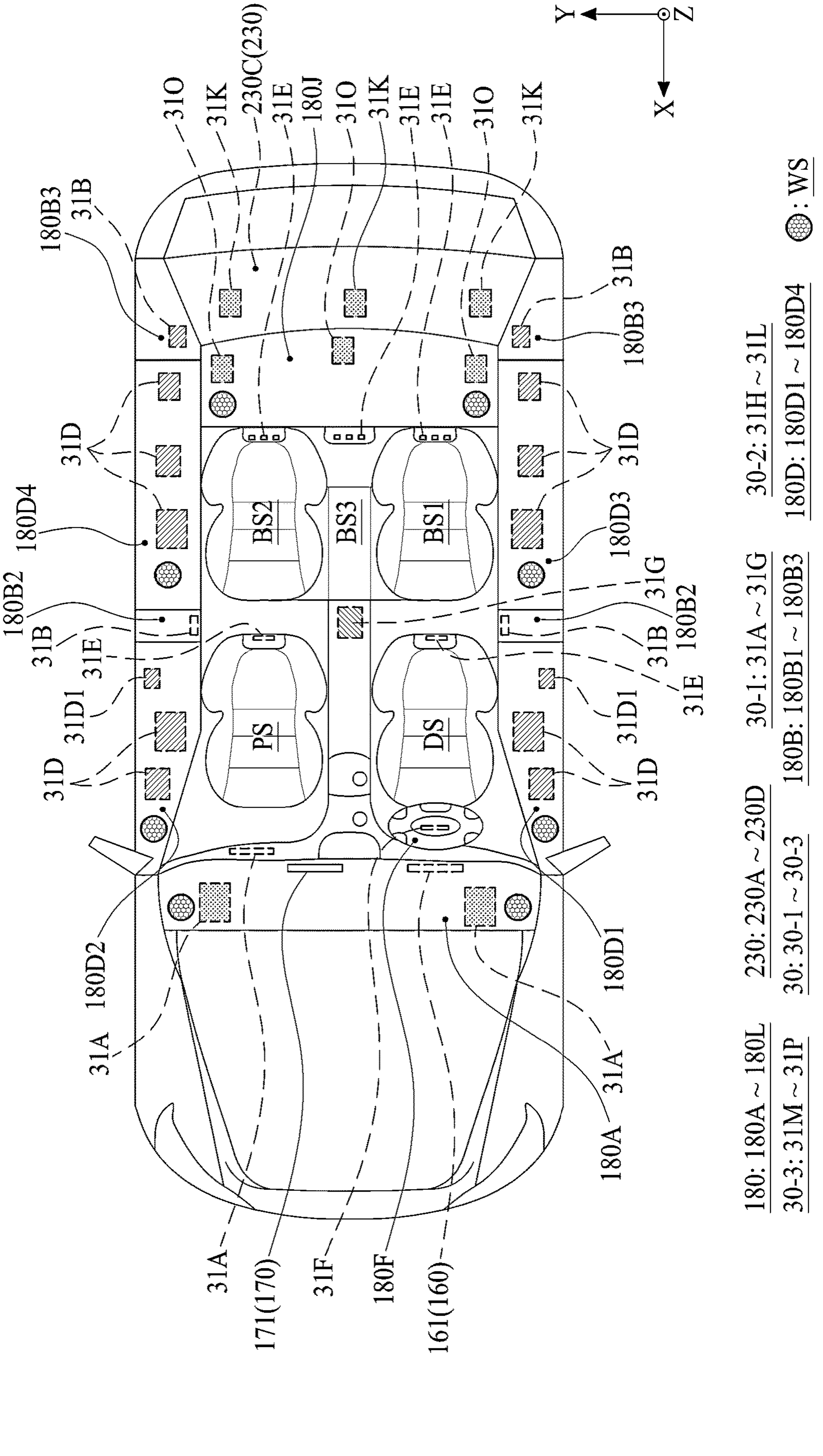
FIG. 13 illustrates a vehicular apparatus according to an example embodiment of the present disclosure.
Figure 14:
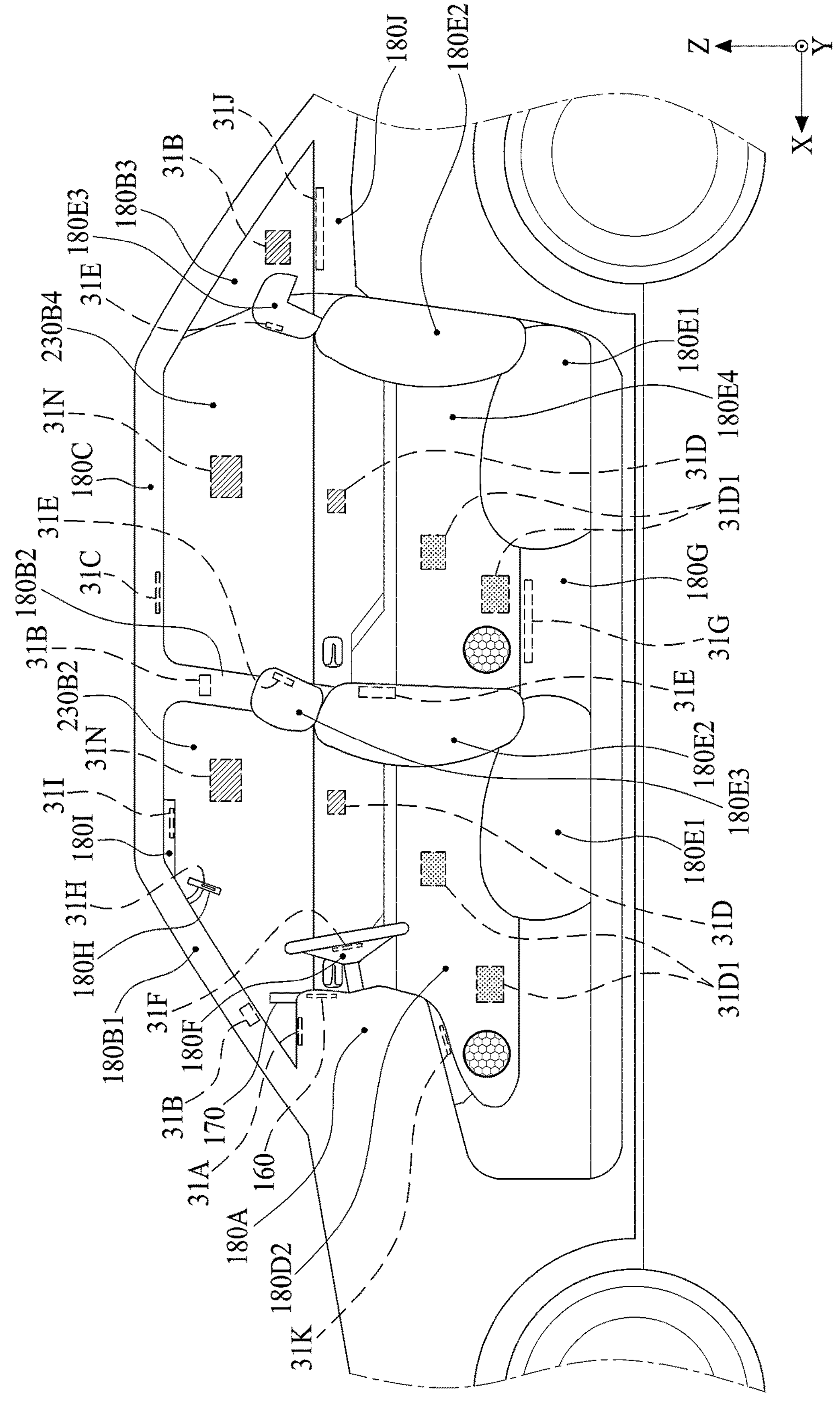
FIG. 14 illustrates a vehicular apparatus according to an example embodiment of the present disclosure.
Figure 15:
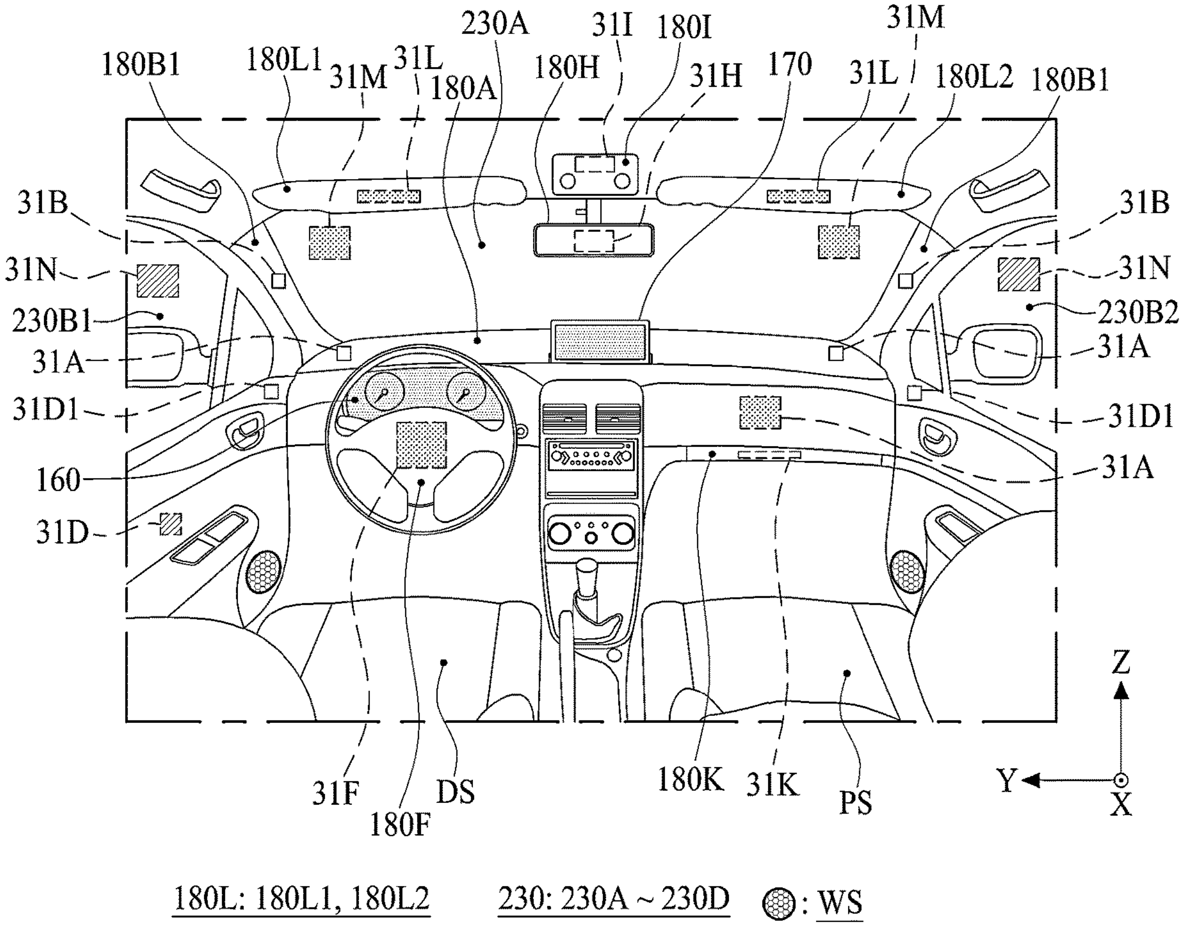
FIG. 15 illustrates a vibrator at a periphery of each of a driver seat and a front occupant seat of a vehicular apparatus according to an example embodiment of the present disclosure.
Figure 16:
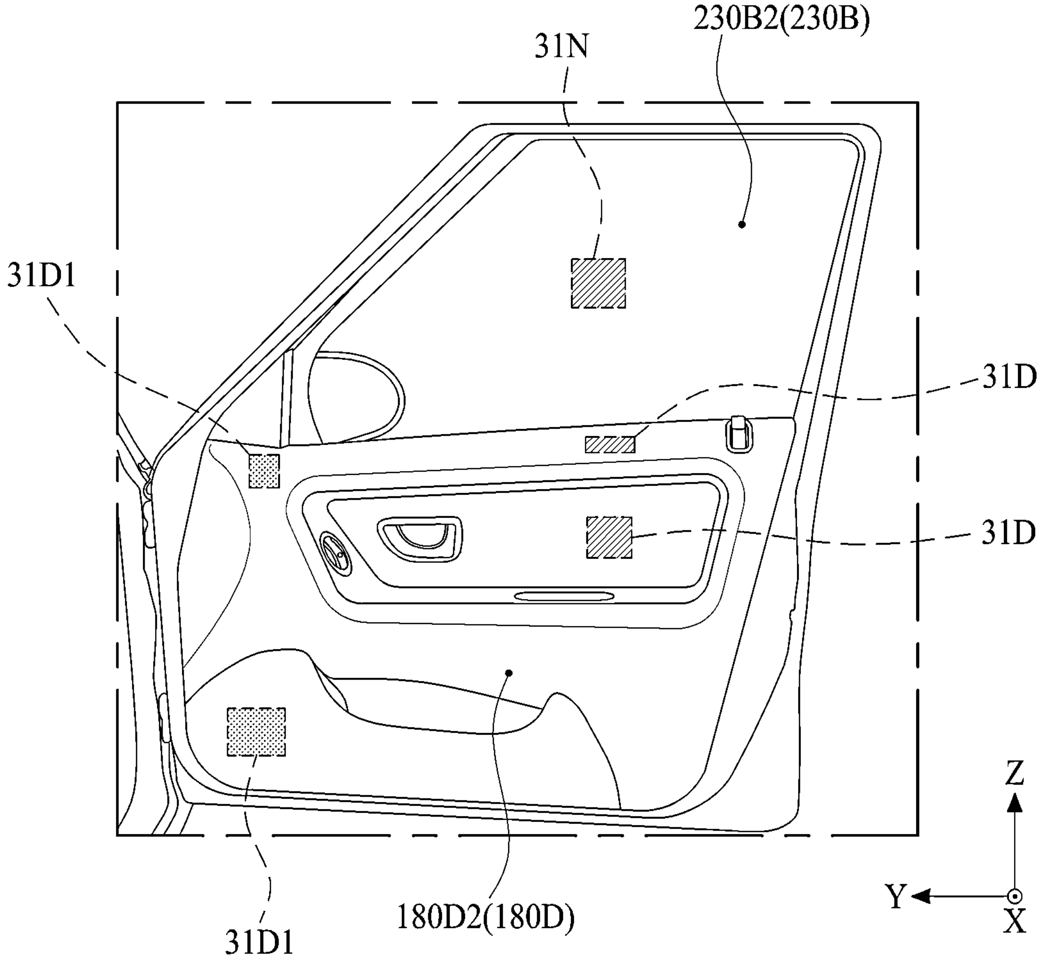
FIG. 16 illustrates a vibrator disposed in or at each of a door and a window of a vehicular apparatus according to an example embodiment of the present disclosure.
Figure 17:
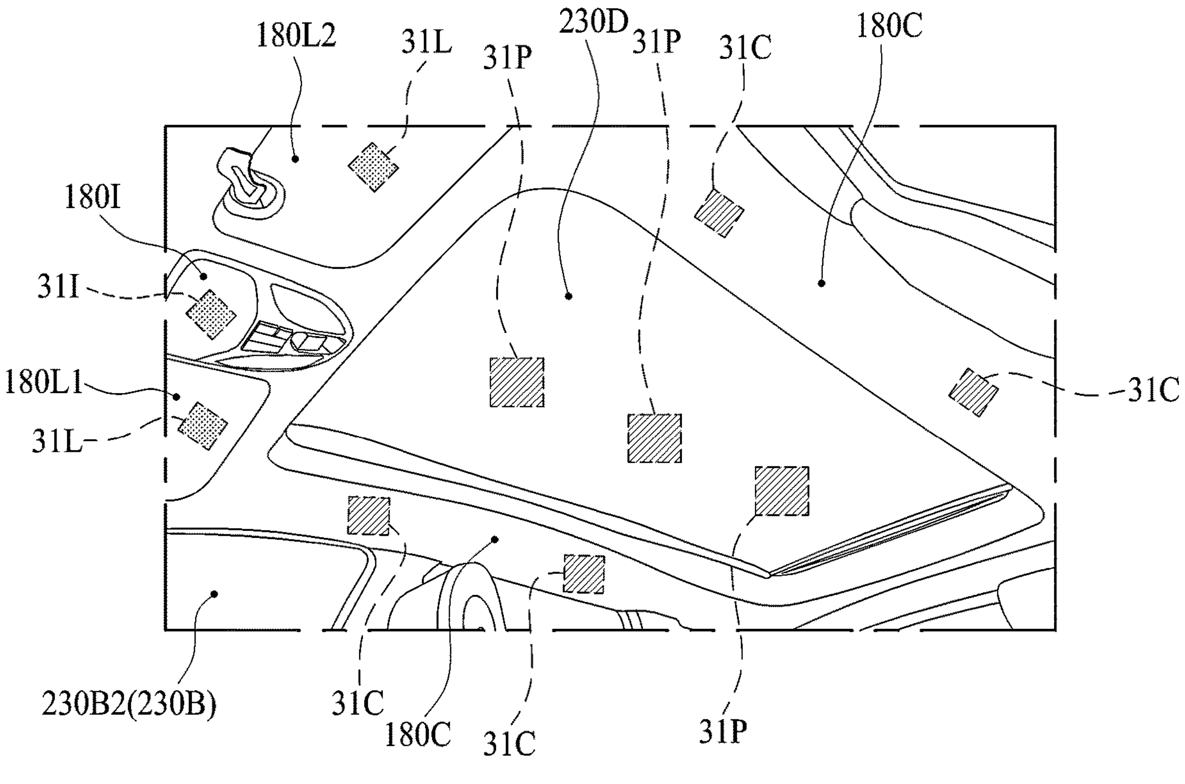
FIG. 17 illustrates a vibrator disposed in or at a roof panel of a vehicular apparatus according to an example embodiment of the present disclosure.
Figure 18:
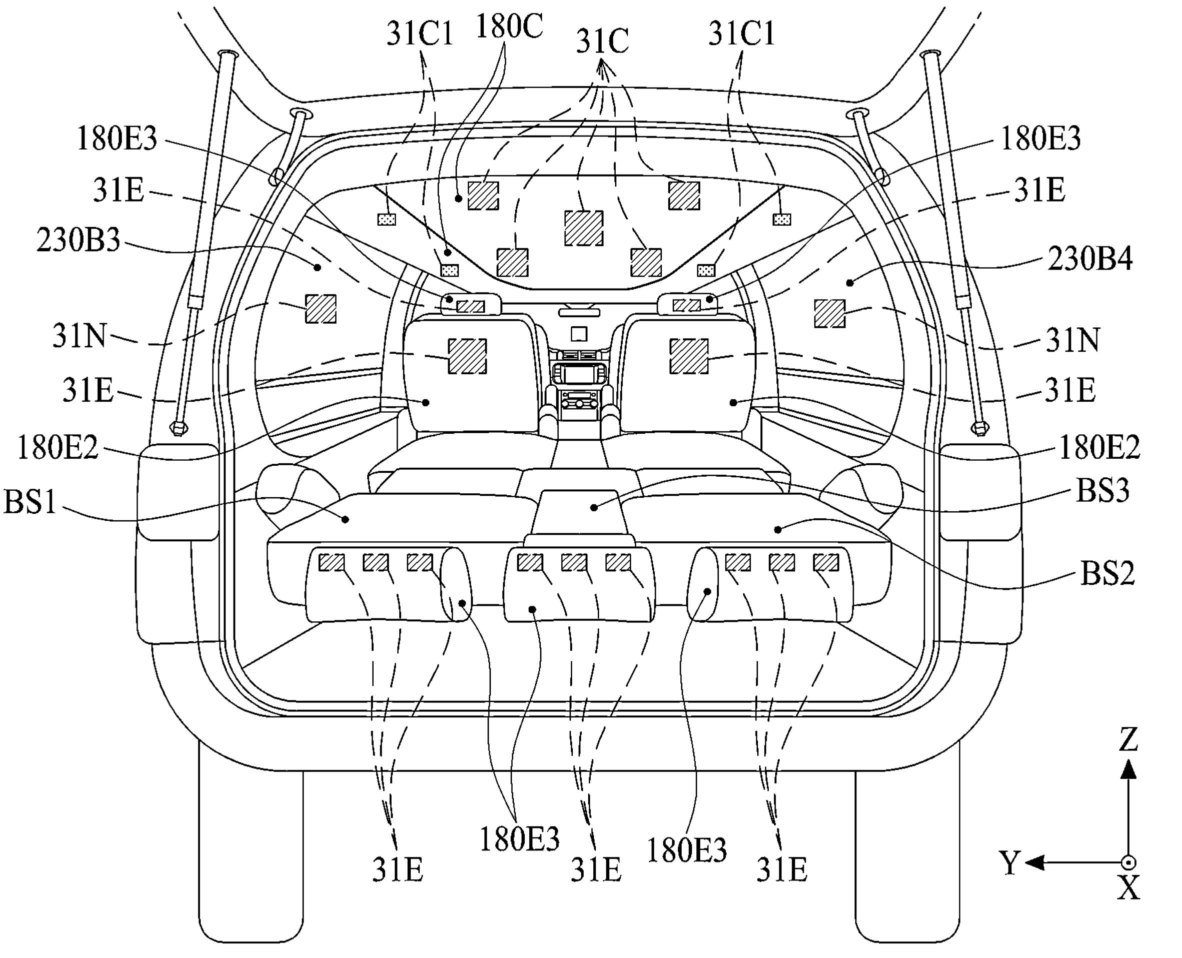
FIG. 18 illustrates a vibrator disposed in or at each of a roof panel, a window, and a seat of a vehicular apparatus according to an example embodiment of the present disclosure.

FIG. 13 illustrates a vehicular apparatus according to an example embodiment of the present disclosure. FIG. 14 illustrates a vehicular apparatus according to an example embodiment of the present disclosure. FIG. 15 illustrates a vibrator at a periphery of each of a driver seat and a front occupant seat of a vehicular apparatus according to an example embodiment of the present disclosure. FIG. 16 illustrates a vibrator disposed in or at each of a door and a window of a vehicular apparatus according to an example embodiment of the present disclosure. FIG. 17 illustrates a vibrator disposed at or in a roof panel of a vehicular apparatus according to an example embodiment of the present disclosure. FIG. 18 illustrates a vibrator disposed at or in each of a roof panel, a window, and a seat of a vehicular apparatus according to an example embodiment of the present disclosure.

Referring to FIGS. 13 to 18, a vehicular apparatus according to an example embodiment of the present disclosure may include a main structure, an exterior material, and an interior material 180.

The main structure (or a frame structure) may include a main frame, a sub-frame, a side frame, a door frame, an under-frame, and a seat frame, but embodiments of the present disclosure are not limited thereto.

The exterior material may be configured to cover the main structure. For example, the exterior material may be configured to cover an outer portion of the main structure. The exterior according to an example embodiment of the present disclosure may include one or more of a hood panel, a front fender panel, a dash panel, a pillar panel, a trunk panel, a roof panel, a floor panel, a door inner panel, and a door outer panel, but embodiments of the present disclosure are not limited thereto. The exterior according to an example embodiment of the present disclosure may include one or more of a flat portion and a curved portion. For example, the exterior material may have a surface structure corresponding to a surface structure of a corresponding main structure, or may have a surface structure which is different from the surface structure of the corresponding main structure.

The interior material 180 may include all parts configuring the inside of the vehicular apparatus, or may include all parts disposed in or at an indoor space of the vehicular apparatus. For example, the interior material 180 may be an interior member or an internal finishing member of the vehicular apparatus, but embodiments of the present disclosure are not limited thereto.

The interior material 180 according to an example embodiment of the present disclosure may be configured to cover one or more of the main structure and the exterior material in the indoor space of the vehicular apparatus and to be exposed at the indoor space of the vehicular apparatus. For example, the interior material 180 may include one or more of a dashboard (e.g., a vehicular dashboard), a pillar interior material (or a pillar trim), a floor interior material (or a floor carpet), a roof interior material (or a headliner), a door interior material (or a door trim), a handle interior material (or a steering cover), a seat interior material, a rear package interior material (or a back seat shelf), an overhead console (or an indoor lighting interior material), a rear view mirror, a glove box, a sun visor, and so on.

The interior material 180 according to an example embodiment of the present disclosure may include one or more materials of plastic, glass, fiber, leather, cloth, rubber, wood, a mirror, paper, and metal, but embodiments of the present disclosure are not limited thereto. For example, the paper may be cone paper for speakers. For example, the cone paper may be pulp or foam plastic, but embodiments of the present disclosure are not limited thereto.

The interior material 180 according to another example embodiment of the present disclosure may include a base member and a skin member. For example, the base member may be an injection material, a first interior material, an internal interior material, or a rear interior material, but embodiments of the present disclosure are not limited thereto. The skin member may be a second interior material, an external interior material, a front interior material, an outer skin member, a reinforcement member, or a decoration member, but embodiments of the present disclosure are not limited thereto.

The interior material 180 or the base member may include a plastic material. For example, the interior material 180 or the base member may be an injection material which is implemented by an injection process using thermoplastic resin or thermosetting resin, but embodiments of the present disclosure are not limited thereto. The interior material 180 or the base member may be configured to cover one or more of the main structure and the exterior material in the indoor space of the vehicular apparatus. For example, the interior material 180 or the base member may be configured to cover one or more surfaces (or an inner surface) of at least one of a main frame, a side frame, a door frame, and a handle frame, which are exposed at the indoor space of the vehicular apparatus.

The skin member may be disposed to cover the base member. The skin member may be configured to cover the base member in the indoor space of the vehicular apparatus and to be exposed at the indoor space. For example, the skin member may be disposed on or coupled to a front surface of the base member exposed at the indoor space of the vehicular apparatus. For example, the skin member may include one or more materials of plastic, glass, fiber, leather, cloth, rubber, a mirror, wood, paper, and metal.

The interior material 180 or the skin member may be a fiber material. For example, the interior material 180 or the skin member may include one or more of synthetic fiber, carbon fiber (or aramid fiber), and natural fiber. For example, the interior material 180 or the skin member may be a fabric sheet, a knitting sheet, or nonwoven fabric, but embodiments of the present disclosure are not limited thereto. For example, the interior material 180 or the skin member may be a fabric member, but embodiments of the present disclosure are not limited thereto. The synthetic fiber may be thermoplastic resin and may include polyolefin-based fiber which is an eco-friendly material where a harmful material is not relatively released. For example, the polyolefin-based fiber may include polythene fiber, polypropylene fiber, or polyethylene terephthalate fiber. The polyolefin-based fiber may be single-resin fiber or fiber having a core-shell structure. The natural fiber may be one of Jute fiber, Kenaf fiber, Abaca fiber, coconut fiber, and wood fiber, or mixed fiber of two or more thereof.

One or more vibration generating apparatuses 30, including one or more of first to third vibration generating apparatuses 30-1, 30-2, and 30-3, may be disposed between the main structure and the exterior material, between the main structure and the interior material 180, and/or in or at one or more of the exterior material and the interior material 180. In one or more examples, the one or more vibration generating apparatuses 30, including one or more of the first to third vibration generating apparatuses 30-1, 30-2, and 30-3, may be disposed at one or more of (a) the exterior material, (b) the interior material 180, (c) a region between the main structure and the exterior material, and (d) a region between the main structure and the interior material 180. For example, the one or more vibration generating apparatuses 30 may be disposed between the main structure and the exterior material, between the main structure and the interior material 180, and/or in or at one or more of the exterior material and the interior material 180 and may be configured to output a sound. For example, the one or more vibration generating apparatuses 30 may be disposed between the main structure and the exterior material, between the main structure and the interior material 180, and/or in or at one or more of the exterior material and the interior material 180 and may indirectly or directly vibrate a region between the main structure and the exterior material, a region between the main structure and the interior material 180, and/or one or more of the exterior material and the interior material 180 to output a sound. For example, the one or more vibration generating apparatuses 30 may be disposed between the exterior material and the interior material 180 and may indirectly or directly vibrate one or more of the exterior material and the interior material 180 to output a sound. For example, a vibration member of the one or more vibration generating apparatuses 30 may be one or more of the exterior material and the interior material 180. According to an example embodiment of the present disclosure, one or more of the exterior material and the interior material 180 may output a sound based on the one or more vibration generating apparatuses 30.

One or more of the exterior material and the interior material 180 of the vehicular apparatus may be a vibration plate, a sound vibration plate, or a sound generating plate for outputting a sound. For example, each of the exterior material and the interior material 180 for outputting a sound may have a size which is greater than that of the one or more vibration generating apparatuses 30, and thus, may perform a function of a vibration plate, a sound vibration plate, or a sound generating plate having a large area, thereby enhancing a sound characteristic and/or a sound pressure level characteristic of the low-pitched sound band generated by the one or more vibration generating apparatuses 30. For example, a frequency of a sound of the low-pitched sound band may be 500 Hz or less, but embodiments of the present disclosure are not limited thereto.

The one or more vibration generating apparatuses 30 according to an example embodiment of the present disclosure may output a sound between the exterior material and the interior material 180 of the vehicular apparatus. For example, the one or more vibration generating apparatuses

30 may be connected or coupled to one or more of the exterior material and the interior material 180 between the exterior material and the interior material 180 and may indirectly or directly vibrate one or more of the exterior material and the interior material 180 to output a sound.

The vehicular apparatus according to an example embodiment of the present disclosure may include a first vibration generating apparatus 30-1 which is configured to output a sound between the exterior material and the interior material 180. For example, the first vibration generating apparatus 30-1 may be disposed in or at one or more of regions between the exterior material, the interior material 180, and the exterior material and the interior material 180 and may output a sound.

The first vibration generating apparatus 30-1 may include one or more vibrators 31A to 31G disposed in or at one or more of a dashboard 180A, a pillar interior material 180B, a roof interior material 180C, a door interior material 180D, a seat interior material 180E, a handle interior material 180F, and a floor interior material 180G. In one or more examples, the first vibration generating apparatus 30-1, including one or more vibrators 31A to 31G, may vibrate one or more of the foregoing. For example, the first vibration generating apparatus 30-1 may include one or more of first to seventh vibrators 31A to 31G, and thus, may output sounds of one or more channels.

Referring to FIGS. 13 to 18, the first vibrator 31A according to an example embodiment of the present disclosure may be disposed between a dash panel and the dashboard 180A and may be configured to indirectly or directly vibrate the dashboard 180A to output a sound. For example, the first vibrator 31A may include a vibration apparatus 130 described above with reference to FIGS. 3A, 3D, 4A, 5A, 6A, 8A, 8B, and 9A to 9C, and thus, repeated descriptions thereof may be omitted. For example, in a vehicular apparatus, the first vibrator 31A may be configured with or as a vibration apparatus where a sound of a low-pitched sound band is further enhanced in a direction distancing from a position of an object, which has received a sound source or a sound, or a position of an ear of each of a driver and/or an occupant (or a passenger). For example, the first vibrator 31A may be configured with or as one or more of the vibration apparatuses described above with reference to FIGS. 3A, 3D, 4A, 5A, 6A, 8A, 8B, and 9A to 9C, for example, FIGS. 3D, 5A, 6A, 9B, and 9C. According to another embodiment, the first vibrator 31A may be configured with or as two or more vibration apparatuses. For example, the first vibrator 31A may be referred to as a dashboard speaker or a first speaker, but embodiments of the present disclosure are not limited thereto.

According to an example embodiment of the present disclosure, one or more of the dash panel and the dashboard 180A may include a first region corresponding to a driver seat DS, a second region corresponding to a front passenger seat PS, and a third region (or a middle region) between the first region and the second region. One or more of the dash panel and the dashboard 180A may include a fourth region which is inclined to face the front passenger seat PS. According to an example embodiment of the present disclosure, the first vibrator 31A may be disposed to vibrate one or more of the first to fourth regions of the dashboard 180A. For example, the first vibrator 31A may be disposed in or at each of the first and second regions of the dashboard 180A, or may be disposed in or at each of the first to fourth regions. For example, the first vibrator 31A may be disposed in or at each of the first and second regions of the dashboard 180A, or may be disposed in or at one or more of the first to fourth regions. For example, the first vibrator 31A may be configured to output a sound of 150 Hz to 20 kHz. For example, the first vibrator 31A configured to vibrate one or more of the first to fourth regions of the dashboard 180A may have the same sound output characteristic or different sound output characteristics. For example, the first vibrator 31A configured to vibrate each of the first to fourth regions of the dashboard 180A may have the same sound output characteristic or different sound output characteristics.

The second vibrator 31B according to an example embodiment of the present disclosure may be disposed between a pillar panel and the pillar interior material 180B and may be configured to indirectly or directly vibrate the pillar interior material 180B to output a sound. For example, the second vibrator 31B may include a vibration apparatus 130 described above with reference to FIGS. 3A, 3D, 4A, 5A, 6A, 8A, 8B, and 9A to 9C, and thus, repeated descriptions thereof may be omitted. For example, in the vehicular apparatus, the second vibrator 31B may be configured with or as a vibration apparatus where a sound of a high-pitched sound band is further enhanced toward a position of an object, which has received a sound source or a sound, or a position of an ear of each of a driver and/or an occupant (or a passenger). For example, the second vibrator 31B may be configured with or as a vibration apparatus where a sound of the high-pitched sound band is further enhanced. For example, the second vibrator 31B may be configured with or as one or more of the vibration apparatuses described above with reference to FIGS. 3A, 3D, 4A, 5A, 6A, 8A, 8B, and 9A to 9C, for example, FIGS. 3A, 4A, 8A, 8B, and 9A. For example, a vibration generating apparatus disposed at a position close to an ear of a passenger may be configured with or as a vibration apparatus where a first vibration portion is disposed at a center of a vibration member compared to a second vibration portion. For example, a vibration generating apparatus disposed at a position far away from an ear of a passenger may be configured with or as a vibration apparatus where a second vibration portion is disposed at a center of a vibration member compared to a first vibration portion. For example, a vibration generating apparatus disposed at a position close to an ear of a passenger may be configured with or as a vibration apparatus where an area of a first vibration portion is greater than an area of a second vibration portion. For example, a vibration generating apparatus disposed at a position far away from an ear of a passenger may be configured with or as a vibration apparatus where an area of a first vibration portion is less than an area of a second vibration portion. According to another example embodiment of the present disclosure, the second vibrator 31B may be configured with or as two or more vibration apparatuses. For example, the second vibrator 31B may be referred to as a pillar speaker, a tweeter speaker, or a second speaker, but embodiments of the present disclosure are not limited thereto.

According to an example embodiment of the present disclosure, the pillar panel may include a first pillar (or an A pillar) which is disposed at both sides of a front window, a second pillar (or a B pillar) which is disposed at both sides of a center of a vehicle body, and a third pillar (or a C pillar) which is disposed at both sides of a rear portion of the vehicle body. The pillar interior material 180B may include a first pillar interior material 180B1 which covers the first pillar, a second pillar interior material 180B2 which covers the second pillar, and a third pillar interior material 180B3 which covers the third pillar. According to an example embodiment of the present disclosure, the second vibrator 31B may be disposed in or at one or more of a region between the first pillar and the first pillar interior material 180B1, a region between the second pillar and the second pillar interior material 180B2, and a region between the third pillar and the third pillar interior material 180B3, and thus, may vibrate one or more of the first to third pillar interior materials 180B1 to 180B3. For example, the second vibrator 31B may include a vibration apparatus 130 described above with reference to FIGS. 3A, 3D, 4A, 5A, 6A, 8A, 8B, and 9A to 9C, and thus, repeated descriptions thereof may be omitted. For example, in a vehicular apparatus, the second vibrator 31B may be configured with or as a vibration apparatus where a sound of the high-pitched sound band is further enhanced toward a position of an object, which has received a sound source or a sound, or a position of an ear of each of a driver and/or an occupant (or a passenger). For example, the second vibrator 31B may be configured with or as one or more of the vibration apparatuses described above with reference to FIGS. 3A, 3D, 4A, 5A, 6A, 8A, 8B, and 9A to 9C, for example, FIGS. 3A, 4A, 8A, 8B, and 9A. According to another example embodiment of the present disclosure, the second vibrator 31B may be configured with or as two or more vibration apparatuses. For example, the second vibrator 31B may be configured to output a sound of 2 kHz to 20 kHz, but embodiments of the present disclosure are not limited thereto. For example, the second vibrator 31B configured to vibrate one or more of the first to third pillar interior materials 180B1 to 180B3 may have the same sound output characteristic or different sound output characteristics.

Referring to FIGS. 13, 17, and 18, the third vibrator 31C and a 3-$1^{st}$ vibrator 31C1 according to an example embodiment of the present disclosure may be disposed between a roof panel and the roof interior material 180C and may be configured to indirectly or directly vibrate the roof interior material 180C to output a sound. For example, the third vibrator 31C and the 3-$1^{st}$ vibrator 31C1 may include a vibration apparatus 130 described above with reference to FIGS. 3A, 3D, 4A, 5A, 6A, 8A, 8B, and 9A to 9C, and thus, repeated descriptions thereof may be omitted. For example, in the vehicular apparatus, the third vibrator 31C may be configured with or as a vibration apparatus where a sound of the high-pitched sound band is further enhanced toward a position of an object, which has received a sound source or a sound, or a position of an ear of each of a driver and/or an occupant (or a passenger). For example, the third vibrator 31C may be configured with or as a vibration apparatus where a sound of the high-pitched sound band is further enhanced. For example, the third vibrator 31C may be configured with or as one or more of the vibration apparatuses described above with reference to FIGS. 3A, 3D, 4A, 5A, 6A, 8A, 8B, and 9A to 9C, for example, FIGS. 3A, 4A, 8A, 8B, and 9A. According to another example embodiment of the present disclosure, the third vibrator 31C may be configured with or as two or more vibration apparatuses. For example, the third vibrator 31C may be configured as the same (or substantially the same) vibrator as the second vibrator 31B, but embodiments of the present disclosure are not limited thereto. For example, in a vehicular apparatus, the 3-$1^{st}$ vibrator 31C1 may be configured with or as a vibration apparatus where a sound of the low-pitched sound band is further enhanced in a direction distancing from a position of an object, which has received a sound source or a sound, or a position of an ear of each of a driver and/or an occupant (or a passenger). For example, the 3-$1^{st}$ vibrator 31C1 may be configured with or as a vibration apparatus where a sound of the low-pitched sound band is further enhanced. For example, the 3-$1^{st}$ vibrator 31C1 may be configured with or as one or more of the vibration apparatuses described above with reference to FIGS. 3A, 3D, 4A, 5A, 6A, 8A, 8B, and 9A to 9C, for example, FIGS. 3D, 5A, 6A, 9B, and 9C. According to another example embodiment of the present disclosure, the 3-$1^{st}$ vibrator 31C1 may be configured with or as two or more vibration apparatuses. For example, the 3-$1^{st}$ vibrator 31C1 may be configured as the same (or substantially the same) vibrator as the first vibrator 31A, but embodiments of the present disclosure are not limited thereto. For example, the third vibrator 31C and the 3-$1^{st}$ vibrator 31C1 may be referred to as a roof speaker or a third speaker, but embodiments of the present disclosure are not limited thereto.

According to an example embodiment of the present disclosure, one or more of the roof panel and the roof interior material 180C covering the roof panel may include first to seventh regions. For example, one or more of the roof panel and the roof interior material 180C covering the roof panel may include a first region corresponding to the driver seat DS, a second region corresponding to the front passenger seat PS, a third region corresponding to a region between the driver seat DS and the front passenger seat PS, a fourth region corresponding to a first rear passenger seat BS1 behind the driver seat DS, a fifth region corresponding to a second rear passenger seat BS2 behind the front passenger seat PS, a sixth region corresponding to a region between the first rear passenger seat BS1 and the second rear passenger seat BS2, and a seventh region between the third region and the sixth region. For example, the third vibrator 31C and the 3-$1^{st}$ vibrator 31C1 may be configured to vibrate one or more of the first to seventh regions of the roof interior material 180C. For example, the third vibrator 31C and the 3-$1^{st}$ vibrator 31C1 may be configured to output a sound of 150 Hz to 20 kHz. For example, the third vibrator 31C and the 3-$1^{st}$ vibrator 31C1 configured to vibrate one or more of the first to seventh regions of the roof interior material 180C may have the same sound output characteristic or different sound output characteristics. For example, the third vibrator 31C and the 3-$1^{st}$ vibrator 31C1 configured to vibrate each of the first to seventh regions of the roof interior material 180C may have the same sound output characteristic or different sound output characteristics. For example, one or more of the third vibrator 31C and the 3-$1^{st}$ vibrator 31C1 configured to vibrate one or more of the first to seventh regions of the roof interior material 180C may be configured to output a sound of 2 kHz to 20 kHz, and the other may be configured to output a sound of 150 Hz to 20 kHz. For example, one or more of the third vibrator 31C and the 3-$1^{st}$ vibrator 31C1 configured to vibrate each of the first to seventh regions of the roof interior material 180C may be configured to output a sound of 2 kHz to 20 kHz, and the other may be configured to output a sound of 150 Hz to 20 kHz.

Referring to FIGS. 13 to 16, the fourth vibrator 31D and a 4-$1^{st}$ vibrator 31D1 according to an example embodiment of the present disclosure may be disposed between a door frame and the door interior material 180D and may be configured to indirectly or directly vibrate the door interior material 180D to output a sound. For example, the fourth vibrator 31D and the 4-$1^{st}$ vibrator 31D1 may include a vibration apparatus 130 described above with reference to FIGS. 3A, 3D, 4A, 5A, 6A, 8A, 8B, and 9A to 9C, and thus, repeated descriptions thereof may be omitted. For example, in the vehicular apparatus, the fourth vibrator 31D may be configured with or as a vibration apparatus where a sound of the high-pitched sound band is further enhanced toward a position of an object, which has received a sound source or a sound, or a position of an ear of each of a driver and/or an occupant (or a passenger). For example, the fourth vibrator 31D may be configured with or as a vibration apparatus where a sound of the high-pitched sound band is further enhanced. For example, the fourth vibrator 31D may be configured with or as one or more of the vibration apparatuses described above with reference to FIGS. 3A, 3D, 4A, 5A, 6A, 8A, 8B, and 9A to 9C, for example, FIGS. 3A, 4A, 8A, 8B, and 9A. According to another example embodiment of the present disclosure, the fourth vibrator 31D may be configured with or as two or more vibration apparatuses. For example, the fourth vibrator 31D may be configured as the same (or substantially the same) vibrator as one or more of the second vibrator 31B and the third vibrator 31C, but embodiments of the present disclosure are not limited thereto. For example, in a vehicular apparatus, the 4-1$^{st}$ vibrator 31D1 may be configured with or as a vibration apparatus where a sound of the low-pitched sound band is further enhanced in a direction distancing from a position of an object, which has received a sound source or a sound, or a position of an ear of each of a driver and/or an occupant (or a passenger). For example, the 4-1$^{st}$ vibrator 31D1 may be configured with or as a vibration apparatus where a sound of the low-pitched sound band is further enhanced. For example, the 4-1$^{st}$ vibrator 31D1 may be configured with or as one or more of the vibration apparatuses described above with reference to FIGS. 3A, 3D, 4A, 5A, 6A, 8A, 8B, and 9A to 9C, for example, FIGS. 3D, 5A, 6A, 9B, and 9C. According to another example embodiment of the present disclosure, the 4-1$^{st}$ vibrator 31D1 may be configured with or as two or more vibration apparatuses. For example, the 4-1$^{st}$ vibrator 31D1 may be configured as the same (or substantially the same) vibrator as one or more of the first vibrator 31A and the 3-1$^{st}$ vibrator 31C1, but embodiments of the present disclosure are not limited thereto. For example, the fourth vibrator 31D and the 4-1$^{st}$ vibrator 31D1 may be referred to as a door speaker or a fourth speaker, but embodiments of the present disclosure are not limited thereto.

According to an example embodiment of the present disclosure, with respect to a height direction Z, one or more of the door frame and the door interior material 180D may include an upper region, a middle region, and a lower region. For example, the fourth vibrator 31D and the 4-1$^{st}$ vibrator 31D1 may be disposed in or at one or more of an upper region, a middle region, and a lower region between the door frame and the door interior material 180D, and thus, may vibrate one or more of the upper region, the middle region, and the lower region of the door interior material 180D.

According to an example embodiment of the present disclosure, the upper region of the door interior material 180D may include a curved portion having a relatively small curvature radius. The fourth vibrator 31D and the 4-1$^{st}$ vibrator 31D1 for vibrating the upper region of the door interior material 180D may be configured to be bent in a shape which matches a shape (or a surface shape) of a curved portion of the upper region of the door interior material 180D.

According to an example embodiment of the present disclosure, the door frame may include a first door frame (or a left front door frame), a second door frame (or a right front door frame), a third door frame (or a left rear door frame), and a fourth door frame (or a right rear door frame). According to an example embodiment of the present disclosure, the door interior material 180D may include a first door interior material (or a left front door interior material) 180D1 covering the first door frame, a second door interior material (or a right front door interior material) 180D2 covering the second door frame, a third door interior material (or a left rear door interior material) 180D3 covering the third door frame, and a fourth door interior material (or a right rear door interior material) 180D4 covering the fourth door frame. For example, the fourth vibrator 31D and the 4-1$^{st}$ vibrator 31D1 may be disposed in or at one or more of an upper region, a middle region, and a lower region between each of the first to fourth door frames and the first to fourth door interior materials 180D1 to 180D4, and thus, may vibrate one or more of the upper region, the middle region, and the lower region of each of the first to fourth door interior materials 180D1 to 180D4.

According to an example embodiment of the present disclosure, the fourth vibrator 31D and the 4-1$^{st}$ vibrator 31D1 configured to vibrate the upper region of each of the first to fourth door interior materials 180D1 to 180D4 may be configured to output a sound of 2 kHz to 20 kHz, or may be configured to output a sound of 150 Hz to 20 kHz. For example, the fourth vibrator 31D and the 4-1$^{st}$ vibrator 31D1 configured to vibrate the upper region of one or more of the first to fourth door interior materials 180D1 to 180D4 may be configured to output a sound of 2 kHz to 20 kHz, or may be configured to output a sound of 150 Hz to 20 kHz.

According to an example embodiment of the present disclosure, the fourth vibrator 31D and the 4-1$^{st}$ vibrator 31D1 configured to vibrate the middle region or/and the lower region of one or more of the first to fourth door interior materials 180D1 to 180D4 may be configured to output a sound of 150 Hz to 20 kHz. The fourth vibrator 31D and the 4-1$^{st}$ vibrator 31D1 configured to vibrate the middle region or/and the lower region of each of the first to fourth door interior materials 180D1 to 180D4 may be configured to output a sound of 150 Hz to 20 kHz. For example, the fourth vibrator 31D and the 4-1$^{st}$ vibrator 31D1 configured to vibrate the middle region or/and the lower region of one or more of the first to fourth door interior materials 180D1 to 180D4 may be one or more of a woofer, a mid-woofer, and a sub-woofer. For example, the fourth vibrator 31D and the 4-1$^{st}$ vibrator 31D1 configured to vibrate the middle region or/and the lower region of each of the first to fourth door interior materials 180D1 to 180D4 may be one or more of a woofer, a mid-woofer, and a sub-woofer.

Sounds output from each of the fourth vibrator 31D and the 4-1$^{st}$ vibrator 31D1 disposed in or at the first door interior material 180D1 and the fourth vibrator 31D and the 4-1$^{st}$ vibrator 31D1 disposed in or at the second door interior material 180D2 may be combined and output. For example, sounds output from one or more of the fourth vibrator 31D and the 4-1$^{st}$ vibrator 31D1 disposed in or at the first door interior material 180D1 and the fourth vibrator 31D and the 4-1$^{st}$ vibrator 31D1 disposed in or at the second door interior material 180D2 may be combined and output. Furthermore, sounds output from the fourth vibrator 31D and the 4-1$^{st}$ vibrator 31D1 disposed in or at the third door interior material 180D3 and sounds output from the fourth vibrator 31D and the 4-1$^{st}$ vibrator 31D1 disposed in or at the fourth door interior material 180D4 may be combined and output.

According to an example embodiment of the present disclosure, the upper region of each of the first to fourth door interior materials 180D1 to 180D4 may include a first upper region adjacent to the dashboard 180A, a second upper region adjacent to back seats BS1 to BS3, and a third upper region between the first upper region and the second upper region. For example, the fourth vibrator 31D and the 4-1$^{st}$ vibrator 31D1 may be disposed in or at one or more of the first to third upper regions of each of the first to fourth door interior materials 180D1 to 180D4. For example, the fourth vibrator 31D and the 4-1$^{st}$ vibrator 31D1 may be disposed in or at the first upper region of each of the first and second door interior materials 180D1 and 180D2, and the fourth vibrator 31D and the 4-1$^{st}$ vibrator 31D1 may be disposed in or at one or more of the second and third upper regions of each of the first and second door interior materials 180D1 and 180D2. For example, the fourth vibrator 31D and the 4-1$^{st}$ vibrator 31D1 may be disposed in or at one or more of the first to third upper regions of one or more of the first to fourth door interior materials 180D1 to 180D4. For example, the fourth vibrator 31D and the 4-1$^{st}$ vibrator 31D1 configured to vibrate the first upper region of one or more of the first and second door interior materials 180D1 and 180D2 may be configured to output a sound of 2 kHz to 20 kHz, and the fourth vibrator 31D and the 4-1$^{st}$ vibrator 31D1 configured to vibrate one or more of the second and third upper regions of each of the first and second door interior materials 180D1 and 180D2 may be configured to output a sound of 2 kHz to 20 kHz or may be configured to output a sound of 150 Hz to 20 kHz. For example, the fourth vibrator 31D and the 4-1$^{st}$ vibrator 31D1 configured to vibrate one or more of the second and third upper regions of one or more of the first and second door interior materials 180D1 and 180D2 may be configured to output a sound of 2 kHz to 20 kHz, or may be configured to output a sound of 150 Hz to 20 kHz.

Referring to FIGS. 13, 15, and 18, the fifth vibrator 31E according to an example embodiment of the present disclosure may be disposed between a seat frame and the seat interior material 180E and may be configured to indirectly or directly vibrate the seat interior material 180E to output a sound. For example, the fifth vibrator 31E may include a vibration apparatus 130 described above with reference to FIGS. 3A, 3D, 4A, 5A, 6A, 8A, 8B, and 9A to 9C, and thus, repeated descriptions thereof may be omitted. For example, in the vehicular apparatus, the fifth vibrator 31E may be configured with or as a vibration apparatus where a sound of the low-pitched sound band is further enhanced in a direction distancing from a position of an object, which has received a sound source or a sound, or a position of an ear of each of a driver and/or an occupant (or a passenger). For example, the fifth vibrator 31E may be configured with or as a vibration apparatus where a sound of the low-pitched sound band is further enhanced. For example, the fifth vibrator 31E may be configured with or as one or more of the vibration apparatuses described above with reference to FIGS. 3A, 3D, 4A, 5A, 6A, 8A, 8B, and 9A to 9C, for example, FIGS. 3D, 5A, 6A, 9B, and 9C. According to another example embodiment of the present disclosure, the fifth vibrator 31E may be configured with or as two or more vibration apparatuses. For example, the fifth vibrator 31E may be configured as the same (or substantially the same) vibrator as one or more of the first vibrator 31A, the 3-1$^{st}$ vibrator 31C1, and the 4-1$^{st}$ vibrator 31D1, but embodiments of the present disclosure are not limited thereto. For example, the fifth vibrator 31E may be referred to as a seat speaker, a headrest speaker, or a fifth speaker, but embodiments of the present disclosure are not limited thereto.

According to an example embodiment of the present disclosure, the seat frame may include a first seat frame (or a driver seat frame), a second seat frame (or a front passenger seat frame), a third seat frame (or a first passenger seat frame), a fourth seat frame (or a second passenger seat frame), and a fifth seat frame (or a third passenger seat frame). According to an example embodiment of the present disclosure, the seat interior material 180E may include a first seat interior material surrounding the first seat frame, a second seat interior material surrounding the second seat frame, a third seat interior material surrounding the third seat frame, a fourth seat interior material surrounding the fourth seat frame, and a fifth seat interior material surrounding the fifth seat frame.

According to an example embodiment of the present disclosure, one or more of the first to fifth seat frames may include a seat floor frame, a seat rear frame, and a headrest frame. The seat interior material 180E may include a seat floor interior material 180E1 surrounding the seat floor frame, a seat rear interior material 180E2 surrounding the seat rear frame, and a headrest interior material 180E3 surrounding the headrest frame. One or more of the seat floor interior material 180E1, the seat rear interior material 180E2, and the headrest interior material 180E3 may include a seat internal interior material and a seat external interior material. The seat internal interior material may include a foam layer. The seat external interior material may include a skin layer including fiber or leather. The seat external interior material may further include a base layer including a plastic material, which supports the skin layer.

According to an example embodiment of the present disclosure, the fifth vibrator 31E may be disposed in or at one or more of a region between the seat rear frame and the seat rear interior material 180E2 and a region between the headrest frame and the headrest interior material 1180E3, and thus, may vibrate one or more of the seat external interior material of the seat rear interior material 180E2 and a seat external interior material of the headrest interior material 180E3.

According to an example embodiment of the present disclosure, the fifth vibrator 31E disposed in or at one or more of the driver seat DS and the front passenger seat PS may be disposed in or at one or more of a region between the seat rear frame and the seat rear interior material 180E2 and a region between the headrest frame and the headrest interior material 180E3.

According to an example embodiment of the present disclosure, the fifth vibrator 31E disposed in or at one or more of the first to third passenger seats BS1 to BS3 may be disposed between the headrest frame and the headrest interior material 180E3. For example, one or more of the first to third passenger seats BS1 to BS3 may include one or more fifth vibrators 31E disposed between the headrest frame and the headrest interior material 180E3.

According to an example embodiment of the present disclosure, the fifth vibrator 31E vibrating the seat rear interior material 180E2 of one or more of the driver seat DS and the front passenger seat PS may be configured to output a sound of 150 Hz to 20 kHz.

According to an example embodiment of the present disclosure, the fifth vibrator 31E vibrating the headrest interior material 180E3 of one or more of the driver seat DS, the front passenger seat PS, and the first to third passenger seats BS1 to BS3 may be configured to output a sound of 2 kHz to 20 kHz, or may be configured to output a sound of 150 Hz to 20 kHz.

Referring to FIGS. 13 to 16, the sixth vibrator 31F according to an example embodiment of the present disclosure may be disposed between a handle frame and the handle interior material 180F and may be configured to indirectly or directly vibrate the handle interior material 180F to output a sound. For example, the sixth vibrator 31F may include a vibration apparatus 130 described above with reference to FIGS. 3A, 3D, 4A, 5A, 6A, 8A, 8B, and 9A to 9C, and thus, repeated descriptions thereof may be omitted. For example, in the vehicular apparatus, the sixth vibrator 31F may be configured with or as a vibration apparatus where a sound of the low-pitched sound band is further enhanced in a direction distancing from a position of an object, which has received a sound source or a sound, or a position of an ear of each of a driver and/or an occupant (or a passenger). For example, the sixth vibrator 31F may be configured with or as a vibration apparatus where a sound of the low-pitched sound band is further enhanced. For example, the sixth vibrator 31F may be configured with or as one or more of the vibration apparatuses described above with reference to FIGS. 3A, 3D, 4A, 5A, 6A, 8A, 8B, and 9A to 9C, for example, FIGS. 3D, 5A, 6A, 9B, and 9C. According to another example embodiment of the present disclosure, the sixth vibrator 31F may be configured with or as two or more vibration apparatuses. For example, the sixth vibrator 31F may be configured as the same (or substantially the same) vibrator as one or more of the first vibrator 31A and the fifth vibrator 31E, but embodiments of the present disclosure are not limited thereto. For example, the sixth vibrator 31F may be referred to as a handle speaker, a steering speaker, or a sixth speaker, but embodiments of the present disclosure are not limited thereto.

According to an example embodiment of the present disclosure, the sixth vibrator 31F may indirectly or directly vibrate the handle interior material 180F to provide a sound to a driver. A sound output by the sixth vibrator 31F may be a sound which is the same as or different from a sound output by each of the first to fifth vibrators 31A to 31E. For example, a sound output by the sixth vibrator 31F may be a sound which is the same as or different from a sound output by one or more of the first to fifth vibrators 31A to 31E. In an embodiment of the present disclosure, the sixth vibrator 31F may output a sound provided to only the driver. In an embodiment of the present disclosure, a sound output by the sixth vibrator 31F and a sound output by each of the first to fifth vibrators 31A to 31E may be combined and output. For example, a sound output by the sixth vibrator 31F and a sound output by one or more of the first to fifth vibrators 31A to 31E may be combined and output.

Referring to FIGS. 13 and 14, the seventh vibrator 31G may be disposed between a floor panel and the floor interior material 180G and may be configured to indirectly or directly vibrate the floor interior material 180G to output a sound. The seventh vibrator 31G may be disposed between the floor panel and the floor interior material 180G disposed between front seats DS and PS and a third rear passenger seat BS3. For example, the seventh vibrator 31G may include a vibration apparatus 130 described above with reference to FIGS. 3A, 3D, 4A, 5A, 6A, 8A, 8B, and 9A to 9C, for example, FIGS. 3D, 5A, 6A, 9B, and 9C, and thus, repeated descriptions thereof may be omitted. For example, in the vehicular apparatus, the seventh vibrator 31G may be configured with or as a vibration apparatus where a sound of the low-pitched sound band is further enhanced in a direction distancing from a position of an object, which has received a sound source or a sound, or a position of an ear of each of a driver and/or an occupant (or a passenger). For example, the seventh vibrator 31G may be configured with or as a vibration apparatus where a sound of the low-pitched sound band is further enhanced. For example, because the second vibration portion 132 is disposed at a center compared to the first vibration portion 131, the seventh vibrator 31G may be a vibration apparatus where a sound of the low-pitched sound band is further enhanced. According to another example embodiment of the present disclosure, the seventh vibrator 31G may be configured with or as two or more vibration apparatuses. For example, the seventh vibrator 31G may be configured as the same (or substantially the same) vibrator as one or more of the first vibrator 31A, the fifth vibrator 31E, and the sixth vibrator 31F, but embodiments of the present disclosure are not limited thereto. For example, the seventh vibrator 31G may be configured to output a sound of 150 Hz to 20 kHz. For example, the seventh vibrator 31G may be referred to as a floor speaker, a bottom speaker, an under-speaker, or a seventh speaker, but embodiments of the present disclosure are not limited thereto.

Referring to FIGS. 13 to 17, the vehicular apparatus according to an example embodiment of the present disclosure may further include a second vibration generating apparatus 30-2 which is disposed in or at the interior material 180 exposed at the indoor space. For example, the vehicular apparatus according to an example embodiment of the present disclosure may include the second vibration generating apparatus 30-2 instead of the first vibration generating apparatus 30-1, or may include all of the first vibration generating apparatus 30-1 and the second vibration generating apparatus 30-2.

According to an example embodiment of the present disclosure, the interior material 180 may further include a rear view mirror 180H, an overhead console 180I, a rear package interior material 180J, a glove box 180K, and a sun visor 180L.

The second vibration generating apparatus 30-2 according to an example embodiment of the present disclosure may include one or more vibration apparatuses 31H to 31L disposed in or at one or more of the rear view mirror 180H, the overhead console 180I, the rear package interior material 180J, the glove box 180K, and the sun visor 180L. In one or more examples, the second vibration generating apparatus 30-2, including one or more vibration apparatuses 31H to 31L, may vibrate one or more of the foregoing. For example, the second vibration generating apparatus 30-2 may include one or more of eighth to twelfth vibrators 31H to 31L, and thus, may output sounds of one or more channels.

Referring to FIGS. 13 to 17, the eighth vibrator 31H may be disposed in or at the rear view mirror 180H and may be configured to indirectly or directly vibrate the rear view mirror 180H to output a sound. The eighth vibrator 31H may be disposed between a mirror housing connected to the main structure and the rear view mirror 180H supported by the mirror housing. For example, the eighth vibrator 31H may include a vibration apparatus 130 described above with reference to FIGS. 3A, 3D, 4A, 5A, 6A, 8A, 8B, and 9A to 9C, and thus, repeated descriptions thereof may be omitted. For example, in the vehicular apparatus, the eighth vibrator 31H may be configured with or as a vibration apparatus where a sound of the low-pitched sound band is further enhanced in a direction distancing from a position of an object, which has received a sound source or a sound, or a position of an ear of each of a driver and/or an occupant (or a passenger). For example, the eighth vibrator 31H may be configured with or as a vibration apparatus where a sound of the low-pitched sound band is further enhanced. For example, the eighth vibrator 31H may be configured with or as one or more of the vibration apparatuses 130 described above with reference to FIGS. 3A, 3D, 4A, 5A, 6A, 8A, 8B, and 9A to 9C, for example, 3D, 5A, 6A, 9B, and 9C. According to another example embodiment of the present disclosure, the eighth vibrator 31H may be configured with or as two or more vibration apparatuses. For example, the eighth vibrator 31H may be configured as the same (or substantially the same) vibrator as one or more of the first vibrator 31A, the fifth vibrator 31E, the sixth vibrator 31F, and the seventh vibrator 31G, but embodiments of the present disclosure are not limited thereto. For example, the eighth vibrator 31H may be configured to output a sound of 150 Hz to 20 kHz. For example, the eighth vibrator 31H may be referred to as a mirror speaker or an eighth speaker, but embodiments of the present disclosure are not limited thereto.

Referring to FIGS. 14, 15, and 17, the ninth vibrator 31I may be disposed in or at the overhead console 180I and may be configured to indirectly or directly vibrate a console cover of the overhead console 180I to output a sound. According to an example embodiment of the present disclosure, the overhead console 180I may include a console box buried in the roof panel, a lighting mechanism disposed in or at the console box, and a console cover covering the lighting mechanism and the console box.

The ninth vibrator 31I may be disposed between the console box and the console cover of the overhead console 180I and may vibrate the console cover. For example, the ninth vibrator 31I may be disposed between the console box and the console cover of the overhead console 180I and may directly vibrate the console cover. For example, the ninth vibrator 31I may include a vibration apparatus 130 described above with reference to FIGS. 3A, 3D, 4A, 5A, 6A, 8A, 8B, and 9A to 9C, and thus, repeated descriptions thereof may be omitted. For example, in the vehicular apparatus, the ninth vibrator 31I may be configured with or as a vibration apparatus where a sound of the low-pitched sound band is further enhanced in a direction distancing from a position of an object, which has received a sound source or a sound, or a position of an ear of each of a driver and/or an occupant (or a passenger). For example, the ninth vibrator 31I may be configured with or as a vibration apparatus where a sound of the low-pitched sound band is further enhanced. For example, the ninth vibrator 31I may be configured with or as one or more of the vibration apparatuses 130 described above with reference to FIGS. 3A, 3D, 4A, 5A, 6A, 8A, 8B, and 9A to 9C, for example, FIGS. 3D, 5A, 6A, 9B, and 9C. According to another example embodiment of the present disclosure, the ninth vibrator 31I may be configured with or as two or more vibration apparatuses. For example, the ninth vibrator 31I may be configured as the same (or substantially the same) vibrator as one or more of the first vibrator 31A, the fifth vibrator 31E, the sixth vibrator 31F, the seventh vibrator 31G, and the eighth vibrator 31H, but embodiments of the present disclosure are not limited thereto. For example, the ninth vibrator 31I may be configured to output a sound of 150 Hz to 20 kHz. For example, the ninth vibrator 31I may be referred to as a console speaker, a lighting speaker, or a ninth speaker, but embodiments of the present disclosure are not limited thereto.

The vehicular apparatus according to an example embodiment of the present disclosure may further include a center lighting box which is disposed in or at a center region of the roof interior material 180C, a center lighting mechanism which is disposed in or at the center lighting box, and a center lighting cover which covers the center lighting mechanism. In this case, the ninth vibrator 31I may additionally vibrate the center lighting cover which is additionally provided between the center lighting cover and the center lighting box of the center lighting mechanism.

Referring to FIGS. 13 and 14, the tenth vibrator 31J may be disposed in or at the rear package interior material 180J and may be configured to indirectly or directly vibrate the rear package interior material 180J to output a sound. The rear package interior material 180J may be disposed behind the first to third passengers BS1 to BS3. For example, a portion of the rear package interior material 180J may be disposed under a rear window 230C.

The tenth vibrator 31J may be disposed at a rear surface of the rear package interior material 180J and may vibrate the rear package interior material 180J. For example, the tenth vibrator 31J may include a vibration apparatus 130 described above with reference to FIGS. 3A, 3D, 4A, 5A, 6A, 8A, 8B, and 9A to 9C, and thus, repeated descriptions thereof may be omitted. For example, in the vehicular apparatus, the tenth vibrator 31J may be configured with or as a vibration apparatus where a sound of the high-pitched sound band is further enhanced toward a position of an object, which has received a sound source or a sound, or a position of an ear of each of a driver and/or an occupant (or a passenger). For example, the tenth vibrator 31J may be configured with or as a vibration apparatus where a sound of the high-pitched sound band is further enhanced. For example, the tenth vibrator 31J may be configured with or as one or more of the vibration apparatuses described above with reference to FIGS. 3A, 3D, 4A, 5A, 6A, 8A, 8B, and 9A to 9C, for example, FIGS. 3A, 4A, 8A, 8B, and 9A. According to another example embodiment of the present disclosure, the tenth vibrator 31J may be configured with or as two or more vibration apparatuses. For example, the tenth vibrator 31J may be configured as the same (or substantially the same) vibrator as one or more of the second vibrator 31B, the third vibrator 31C, and the fourth vibrator 31D, but embodiments of the present disclosure are not limited thereto. For example, the tenth vibrator 31J may be referred to as a rear speaker or a tenth speaker, but embodiments of the present disclosure are not limited thereto.

According to an example embodiment of the present disclosure, the rear package interior material 180J may include a first region corresponding to the first rear passenger seat BS1, a second region corresponding to the second rear passenger seat BS2, and a third region corresponding to the third rear passenger seat BS3. According to an example embodiment of the present disclosure, the tenth vibrator 31J may be disposed to vibrate one or more of the first to third regions of the rear package interior material 180J. For example, the tenth vibrator 31J may be disposed in or at each of the first and second regions of the rear package interior material 180J, or may be disposed in or at each of the first to third regions. For example, the tenth vibrator 31J may be disposed in or at one or more of the first and second regions of the rear package interior material 180J, or may be disposed in or at one or more of the first to third regions. For example, the tenth vibrator 31J may be configured to output a sound of 150 Hz to 20 kHz. For example, the tenth vibrator 31J configured to vibrate one or more of the first to third regions of the rear package interior material 180J may have the same sound output characteristic or different sound output characteristics. For example, the tenth vibrator 31J configured to vibrate one or more of the first to third regions of the rear package interior material 180J may have the same sound output characteristic or different sound output characteristics.

Referring to FIGS. 13 to 15, the eleventh vibrator 31K may be disposed in or at the glove box 180K and may be configured to indirectly or directly vibrate the glove box 180K to output a sound. The glove box 180K may be disposed in or at the dashboard 180A corresponding to a forward region with respect to the front passenger seat PS.

The eleventh vibrator 31K may be disposed at an inner surface of the glove box 180K and may vibrate the glove box 180K. For example, the eleventh vibrator 31K may include a vibration apparatus 130 described above with reference to FIGS. 3A, 3D, 4A, 5A, 6A, 8A, 8B, and 9A to 9C, and thus, repeated descriptions thereof may be omitted. For example, in the vehicular apparatus, the eleventh vibrator 31K may be configured with or as a vibration apparatus where a sound of the low-pitched sound band is further enhanced in a direction distancing from a position of an object, which has received a sound source or a sound, or a position of an ear of each of a driver and/or an occupant (or a passenger). For example, the eleventh vibrator 31K may be configured with or as a vibration apparatus where a sound of the low-pitched sound band is further enhanced. For example, the eleventh vibrator 31K may be configured with or as one or more of the vibration apparatuses described above with reference to FIGS. 3A, 3D, 4A, 5A, 6A, 8A, 8B, and 9A to 9C, for example, FIGS. 3D, 5A, 6A, 9B, and 9C. According to another example embodiment of the present disclosure, the eleventh vibrator 31K may be configured with or as two or more vibration apparatuses. For example, the eleventh vibrator 31K may be configured as the same (or substantially the same) vibrator as one or more of the first vibrator 31A, the fifth vibrator 31E, the sixth vibrator 31F, the seventh vibrator 31G, the eighth vibrator 31H, and the ninth vibrator 31I, but embodiments of the present disclosure are not limited thereto. For example, the eleventh vibrator 31K may be configured to output a sound of 150 Hz to 20 kHz, or may be one or more of a woofer, a mid-woofer, and a sub-woofer. For example, the eleventh vibrator 31K may be referred to as a glove box speaker or an eleventh speaker, but embodiments of the present disclosure are not limited thereto.

Referring to FIG. 15, the twelfth vibrator 31L may be disposed in or at the sun visor 180L and may be configured to indirectly or directly vibrate the sun visor 180L to output a sound. The sun visor 180L may a first sun visor 180L1 corresponding to the driver seat DS and a second sun visor 180L2 corresponding to the front passenger seat PS.

The twelfth vibrator 31L may be disposed in or at one or more of the first sun visor 180L1 and the second sun visor 180L2 and may indirectly or directly vibrate one or more of the first sun visor 180L1 and the second sun visor 180L2. For example, the twelfth vibrator 31L may include a vibration apparatus 130 described above with reference to FIGS. 3A, 3D, 4A, 5A, 6A, 8A, 8B, and 9A to 9C, and thus, repeated descriptions thereof may be omitted. For example, in the vehicular apparatus, the twelfth vibrator 31L may be configured with or as a vibration apparatus where a sound of the low-pitched sound band is further enhanced in a direction distancing from a position of an object, which has received a sound source or a sound, or a position of an ear of each of a driver and/or an occupant (or a passenger). For example, the twelfth vibrator 31L may be configured with or as a vibration apparatus where a sound of the low-pitched sound band is further enhanced. For example, the twelfth vibrator 31L may be configured with or as one or more of the vibration apparatuses described above with reference to FIGS. 3A, 3D, 4A, 5A, 6A, 8A, 8D, and 9A to 9C, for example, FIGS. 3D, 5A, 6A, 9B, and 9C. According to another example embodiment of the present disclosure, the twelfth vibrator 31L may be configured with or as two or more vibration apparatuses. For example, the twelfth vibrator 31L may be configured as the same (or substantially the same) vibrator as one or more of the first vibrator 31A, the fifth vibrator 31E, the sixth vibrator 31F, the seventh vibrator 31G, the eighth vibrator 31H, the ninth vibrator 31I, and the eleventh vibrator 31K, but embodiments of the present disclosure are not limited thereto. For example, the twelfth vibrator 31L may be configured to output a sound of 150 Hz to 20 kHz. For example, the twelfth vibrator 31L may be referred to as a sun visor speaker or a twelfth speaker, but embodiments of the present disclosure are not limited thereto.

According to an example embodiment of the present disclosure, one or more of the first sun visor 180L1 and the second sun visor 180L2 may further include a sun visor mirror. In this case, the twelfth vibrator 31L may be configured to indirectly or directly vibrate the sun visor mirror of one or more of the first sun visor 180L1 and the second sun visor 180L2. The twelfth vibrator 31L vibrating the sun visor mirror may include a vibration apparatus 130 described above with reference to FIGS. 3D, 5A, 6A, 9B, and 9C, and thus, repeated descriptions thereof may be omitted.

Referring to FIGS. 13 to 14, the vehicular apparatus according to an example embodiment of the present disclosure may further include a third vibration generating apparatus 30-3 which is disposed in or at a window 230. For example, the vehicular apparatus according to an example embodiment of the present disclosure may include the third vibration generating apparatus 30-3 instead of the first vibration generating apparatus 30-1 and the second vibration generating apparatus 30-2, or may include all of the first to third vibration generating apparatuses 30-1 to 30-3.

The third vibration generating apparatus 30-3 may include one or more vibrators 31M to 31P disposed in or at the window 230. For example, the third vibration generating apparatus 30-3 may include one or more of thirteenth to sixteenth vibrators 31M to 31P, and thus, may output sounds of one or more channels. For example, the third vibration generating apparatus 30-3 may be referred to as a window speaker, a transparent sound generating apparatus, or a transparent speaker, but embodiments of the present disclosure are not limited thereto.

One or more of the thirteenth to sixteenth vibrators 31M to 31P according to an example embodiment of the present disclosure may be configured to indirectly or directly vibrate the window 230 to output a sound. For example, one or more of the thirteenth to sixteenth vibrators 31M to 31P may include one or more of the vibration apparatuses 130 described above with reference to FIGS. 3A, 3D, 4A, 5A, 6A, 8A, 8B, and 9A to 9C and may be configured to be transparent, semitransparent, or opaque.

According to an example embodiment of the present disclosure, the window 230 may include a front window 230A, a side window 230B, and a rear window 230C. According to an example embodiment of the present disclosure, the window 230 may further include a roof window 230D. For example, when the vehicular apparatus includes the roof window 230D, a portion of a region of each of the roof frame and the roof interior material 180C may be replaced with the roof window 230D. For example, when the vehicular apparatus includes the roof window 230D, the third vibrator 31C may be configured to indirectly or directly vibrate an edge portion (or a periphery portion) of the roof interior material 180C surrounding the roof window 230D to output a sound.

Referring to FIGS. 13 to 15, the thirteenth vibrator 31M may be disposed in or at the front window 230A and may be configured to output a sound based on a vibration thereof or to indirectly or directly vibrate the front window 230A to output a sound. For example, the thirteenth vibrator 31M may include a vibration apparatus 130 described above with reference to FIGS. 3A, 3D, 4A, 5A, 6A, 8A, 8B, and 9A to 9C, and thus, repeated descriptions thereof may be omitted. For example, in the vehicular apparatus, the thirteenth vibrator 31M may be configured with or as a vibration apparatus where a sound of the low-pitched sound band is further enhanced in a direction distancing from a position of an object, which has received a sound source or a sound, or a position of an ear of each of a driver and/or an occupant (or a passenger). For example, the thirteenth vibrator 31M may be configured with or as a vibration apparatus where a sound of the low-pitched sound band is further enhanced. For example, the thirteenth vibrator 31M may be configured with or as one or more of the vibration apparatuses described above with reference to FIGS. 3A, 3D, 4A, 5A, 6A, 8A, 8B, and 9A to 9C, for example, FIGS. 3D, 5A, 6A, 9B, and 9C. According to another example embodiment of the present disclosure, the thirteenth vibrator 31M may be configured with or as two or more vibration apparatuses. For example, the thirteenth vibrator 31M may be configured as the same (or substantially the same) vibrator as one or more of the first vibrator 31A, the fifth vibrator 31E, the sixth vibrator 31F, the seventh vibrator 31G, the eighth vibrator 31H, the ninth vibrator 31I, and the eleventh vibrator 31K, but embodiments of the present disclosure are not limited thereto. For example, the thirteenth vibrator 31M may be configured to be transparent, semitransparent, or opaque.

According to an example embodiment of the present disclosure, the front window 230A may include a first region corresponding to the driver seat DS, a second region corresponding to the front passenger seat PS, and a third region (or a middle region) between the first region and the second region. For example, the thirteenth vibrator 31M may be disposed in or at each of the first and second regions of the front window 230A, or may be disposed in or at each of the first to third regions. For example, the thirteenth vibrator 31M may be disposed in or at one or more of the first and second regions of the front window 230A, or may be disposed in or at one or more of the first to third regions. For example, the thirteenth vibrator 31M disposed in or at each of the first to third regions of the front window 230A may have the same sound output characteristic or different sound output characteristics. For example, the thirteenth vibrator 31M disposed in or at one or more of the first to third regions of the front window 230A may have the same sound output characteristic or different sound output characteristics. For example, the thirteenth vibrator 31M may be configured to output a sound of 150 Hz to 20 kHz. For example, the thirteenth vibrator 31M may be referred to as a front window speaker or a thirteenth speaker, but embodiments of the present disclosure are not limited thereto.

Referring to FIGS. 14 to 16 and 18, the fourteenth vibrator 31N according to an example embodiment of the present disclosure may be disposed in or at the side window 230B and may be configured to output a sound based on a vibration thereof or to indirectly or directly vibrate the side window 230B to output a sound.

According to an example embodiment of the present disclosure, the side window 230B may include a first side window (or a left front window) 230B1, a second side window (or a right front window) 230B2, a third side window (or a left rear window) 230B3, and a fourth side window (or a right rear window) 230B4.

According to an example embodiment of the present disclosure, the fourteenth vibrator 31N may be disposed in or at one or more of the first to fourth side windows 230B1 to 230B4. For example, one or more of the first to fourth side windows 230B1 to 230B4 may include one or more fourteenth vibrators 31N.

According to an example embodiment of the present disclosure, the fourteenth vibrator 31N may be disposed in or at one or more of the first to fourth side windows 230B1 to 230B4 and may be configured to output a sound based on a vibration thereof or to indirectly or directly vibrate the first to fourth side windows 230B1 to 230B4 to output a sound. For example, the fourteenth vibrator 31N may include a vibration apparatus 130 described above with reference to FIGS. 3A, 3D, 4A, 5A, 6A, 8A, 8B, and 9A to 9C, and thus, repeated descriptions thereof may be omitted. For example, in the vehicular apparatus, the fourteenth vibrator 31N may be configured with or as a vibration apparatus where a sound of the high-pitched sound band is further enhanced toward a position of an object, which has received a sound source or a sound, or a position of an ear of each of a driver and/or an occupant (or a passenger). For example, the fourteenth vibrator 31N may be configured with or as a vibration apparatus where a sound of the high-pitched sound band is further enhanced. For example, the fourteenth vibrator 31N may be configured with or as one or more of the vibration apparatuses described above with reference to FIGS. 3A, 3D, 4A, 5A, 6A, 8A, 8B, and 9A to 9C, for example, FIGS. 3A, 4A, 8A, 8B, and 9A. According to another example embodiment of the present disclosure, the fourteenth vibrator 31N may be configured with or as two or more vibration apparatuses. For example, the fourteenth vibrator 31N may be configured as the same (or substantially the same) vibrator as one or more of the second vibrator 31B, the third vibrator 31C, the fourth vibrator 31D, and the tenth vibrator 31J, but embodiments of the present disclosure are not limited thereto. For example, the fourteenth vibrator 31N may be configured to be transparent, semitransparent, or opaque. For example, the fourteenth vibrator 31N may be configured to output a sound of 150 Hz to 20 kHz. For example, the fourteenth vibrator 31N disposed in or at one or more of the first to fourth side windows 230B1 to 230B4 may have the same sound output characteristic or different sound output characteristics. For example, the fourteenth vibrator 31N may be configured to output a sound of 150 Hz to 20 kHz. For example, the fourteenth vibrator 31N may be referred to as a side window speaker or a fourteenth speaker, but embodiments of the present disclosure are not limited thereto.

Referring to FIG. 13, the fifteenth vibrator 31O may be disposed in or at the rear window 230C and may be configured to output a sound based on a vibration thereof or to indirectly or directly vibrate the rear window 230C to output a sound.

According to an example embodiment of the present disclosure, the rear window 230C may include a first region corresponding to a rearward direction of the first rear passenger seat BS1, a second region corresponding to a rearward direction of the second rear passenger seat BS2, and a third region corresponding to a rearward direction of the third rear passenger seat BS3. According to an example embodiment of the present disclosure, the fifteenth vibrator 31O may be disposed in or at each of the first to third regions of the rear window 230C. For example, the fifteenth vibrator 31O may be disposed in or at one or more of the first to third regions of the rear window 230C. For example, the fifteenth vibrator 31O may be disposed in or at each of the first and second regions of the rear window 230C, or may be disposed in or at each of the first to third regions of the rear window 230C. For example, the fifteenth vibrator 31O may be disposed in or at one or more of the first and second regions of the rear window 230C, or may be disposed in or at one or more of the first to third regions of the rear window 230C. For example, the fifteenth vibrator 31O may include a vibration apparatus 130 described above with reference to FIGS. 3A, 3D, 4A, 5A, 6A, 8A, 8B, and 9A to 9C, and thus, repeated descriptions thereof may be omitted. For example, in the vehicular apparatus, the fifteenth vibrator 31O may be configured with or as a vibration apparatus where a sound of the low-pitched sound band is further enhanced in a direction distancing from a position of an object, which has received a sound source or a sound, or a position of an ear of each of a driver and/or an occupant (or a passenger). For example, the fifteenth vibrator 31O may be configured with or as a vibration apparatus where a sound of the low-pitched sound band is further enhanced. For example, the fifteenth vibrator 31O may be configured with or as one or more of the vibration apparatuses described above with reference to FIGS. 3A, 3D, 4A, 5A, 6A, 8A, 8B, and 9A to 9C, for example, FIGS. 3D, 5A, 6A, 9B, and 9C. According to another example embodiment of the present disclosure, the fifteenth vibrator 31O may be configured with or as two or more vibration apparatuses. For example, the fifteenth vibrator 31O may be configured as the same (or substantially the same) vibrator as one or more of the first vibrator 31A, the fifth vibrator 31E, the sixth vibrator 31F, the seventh vibrator 31G, the eighth vibrator 31H, the ninth vibrator 31I, the eleventh vibrator 31K, and the thirteenth vibrator 31M, but embodiments of the present disclosure are not limited thereto. For example, the fifteenth vibrator 31O may be configured to be transparent, semitransparent, or opaque. For example, the fifteenth vibrator 31O may be configured to output a sound of 150 Hz to 20 kHz. For example, the fifteenth vibrator 31O disposed in or at each of the first to third regions of the rear window 230C may have the same sound output characteristic or different sound output characteristics. For example, the fifteenth vibrator 31O disposed in or at one or more of the first to third regions of the rear window 230C may have the same sound output characteristic or different sound output characteristics. For example, the fifteenth vibrator 31O disposed in or at one or more of the first and second regions of the rear window 230C may be configured to output a sound of 150 Hz to 20 kHz, or may be one or more of a woofer, a mid-woofer, and a sub-woofer. For example, the fifteenth vibrator 31O may be referred to as a rear window speaker or a fifteenth speaker, but embodiments of the present disclosure are not limited thereto.

Referring to FIG. 18, the sixteenth vibrator 31P according to an example embodiment of the present disclosure may be disposed in or at the roof window 230D and may be configured to output a sound based on a vibration thereof or to indirectly or directly vibrate the roof window 230D to output a sound.

The roof window 240D according to an example embodiment of the present disclosure may be disposed on front seats DS and PS. For example, the sixteenth vibrator 31P may be disposed in or at a center region of the roof window 230D. For example, the sixteenth vibrator 31P may include a vibration apparatus 130 described above with reference to FIGS. 3A, 3D, 4A, 8A, 8B, and 9A to 9C, and thus, repeated descriptions thereof may be omitted. For example, in the vehicular apparatus, the sixteenth vibrator 31P may be configured with or as a vibration apparatus where a sound of the high-pitched sound band is further enhanced toward a position of an object, which has received a sound source or a sound, or a position of an ear of each of a driver and/or an occupant (or a passenger). For example, the sixteenth vibrator 31P may be configured with or as a vibration apparatus where a sound of the high-pitched sound band is further enhanced. For example, the sixteenth vibrator 31P may be configured with or as one or more of the vibration apparatuses described above with reference to FIGS. 3A, 3D, 4A, 5A, 6A, 8A, 8B, and 9A to 9C, for example, FIGS. 3A, 4A, 8A, 8B, and 9A. According to another example embodiment of the present disclosure, the sixteenth vibrator 31P may be configured with or as two or more vibration apparatuses. For example, the sixteenth vibrator 31P may be configured as the same (or substantially the same) vibrator as one or more of the second vibrator 31B, the third vibrator 31C, the fourth vibrator 31D, the tenth vibrator 31J, and the fourteenth vibrator 31N, but embodiments of the present disclosure are not limited thereto. For example, the sixteenth vibrator 31P may be configured to be transparent, semitransparent, or opaque. For example, the sixteenth vibrator 31P may be configured to output a sound of 150 Hz to 20 kHz. For example, the sixteenth vibrator 31P may be referred to as a roof window speaker or a sixteenth speaker, but embodiments of the present disclosure are not limited thereto.

According to another example embodiment of the present disclosure, the roof window 230D may be disposed on the front seats DS and PS, or may be disposed on the rear seats BS1 to BS3. For example, the roof window 230D may include a first region corresponding to the front seats DS and PS and a second region corresponding to the rear seats BS1 to BS3. Furthermore, the roof window 230D may include a third region between the first region and the second region. For example, the sixteenth vibrator 31P may be disposed in or at one or more of the first and second regions of the roof window 230D, or may be disposed in or at one or more of the first to third regions of the roof window 230D. For example, the sixteenth vibrator 31P may be configured to output a sound of 150 Hz to 20 kHz. For example, the sixteenth vibrator 31P disposed in or at one or more of the first to third regions of the roof window 230D may have the same sound output characteristic or different sound output characteristics.

Referring to FIGS. 13 to 15, the vehicular apparatus according to an example embodiment of the present disclosure may further include a woofer speaker WS which is provided in one or more of the dashboard 180A, the door frame, and the rear package interior material 180J.

The woofer speaker WS according to an example embodiment of the present disclosure may be one or more of a woofer, a mid-woofer, and a sub-woofer. For example, the woofer speaker WS may be referred to as a term such as a speaker or the like which outputs a sound of 60 Hz to 150 Hz, but embodiments of the present disclosure are not limited thereto. Accordingly, the woofer speaker WS may output a sound of 60 Hz to 150 Hz, thereby enhancing a low-pitched sound band characteristic of a sound which is output to an indoor space.

According to an example embodiment of the present disclosure, the woofer speaker WS may be disposed in or at one or more of the first and second regions of the dashboard 180A. According to an example embodiment of the present disclosure, the woofer speaker WS may be disposed in or at each of the first to fourth door frames of the door interior material 180D and may be exposed at a lower region of each of the first to fourth door interior materials 180D1 to 180D4 of the door interior material 180D. For example, the woofer speaker WS may be disposed in or at one or more of the first to fourth door frames of the door interior material 180D and may be exposed at the lower region of one or more of the first to fourth door interior materials 180D1 to 180D4 of the door interior material 180D. According to an example embodiment of the present disclosure, the woofer speaker WS may be disposed in or at one or more of the first and second regions of the rear package interior material 180J. For example, the fourth vibrator 31D disposed in or at the lower region of each of the first to fourth door interior materials 180D1 to 180D4 may be replaced with the woofer speaker WS. For example, the fourth vibrator 31D disposed in or at the lower region of one or more of the first to fourth door interior materials 180D1 to 180D4 may be replaced with the woofer speaker WS.

Referring to FIGS. 13 to 15, the vehicular apparatus according to an example embodiment of the present disclosure may further include a dashboard device 160 and an infotainment device 170.

The dashboard device 160 according to an example embodiment of the present disclosure may be disposed in or at the first region of the dashboard 180A to face the driver seat DS. The dashboard device 160 may include a display (or a first display) 161 which is disposed in or at the first region of the dashboard 180A to face the driver seat DS.

The first display 161 may include one of the apparatuses described above with reference to FIGS. 1, 2, and 10, and thus, the dashboard device 160 may output a sound, generated based on a vibration of the vibration member (or the display panel) 100 based on vibrations of one or more vibration generating apparatuses 30 included in the first display 161, toward the driver seat DS. For example, the vibration generating apparatus 30 disposed in or at the first display 161 of the dashboard device 160 may be configured to output a sound of 150 Hz to 20 kHz.

The infotainment device 170 may be disposed in or at the third region of the dashboard 180A.

The infotainment device 170 according to an example embodiment of the present disclosure may be fixed to the third region of the dashboard 180A in an upright state.

According to another example embodiment of the present disclosure, the infotainment device 170 may be installed to be raised and lowered in the third region of the dashboard 180A. For example, the infotainment device 170 may be accommodated or received into the dashboard 180A based on the turn-off of the vehicular apparatus or manipulation of a passenger and may protrude to the dashboard 180A based on the turn-on of the vehicular apparatus or manipulation of the passenger.

The infotainment device 170 according to an example embodiment of the present disclosure may include a display (or a second display) 171 disposed in or at the third region of the dashboard 180A and a display elevation unit.

The second display 171 may include one of the apparatuses described above with reference to FIGS. 1, 2, and 10, and thus, repeated descriptions thereof may be omitted. For example, the infotainment device 170 may output a sound, generated based on a vibration of the vibration member (or the display panel) 100 based on vibrations of one or more vibration generating apparatuses 30 included in the second display 171, toward the driver seat DS. For example, the one or more vibration generating apparatuses 30 disposed in or at the second display 171 of the infotainment device 170 may be configured to output a sound of 150 Hz to 20 kHz.

The display elevation unit may be disposed in or at the third region of the dashboard 180A and may support the second display 171 so as to be raised and lowered. For example, the display elevation unit may raise the second display 171 based on the turn-on of the vehicular apparatus or manipulation of the passenger, and thus, the second display 171 may protrude to the dashboard 180A. Furthermore, the display elevation unit may lower the second display 171 based on the turn-off of the vehicular apparatus or manipulation of the passenger, and thus, the second display 171 may be accommodated or received into the dashboard 180A.

The vehicular apparatus according to an example embodiment of the present disclosure may output a sound to one or more of an indoor space and an outdoor space through one or more of a first vibration generating apparatus 30-1 disposed between the main structure and the interior material 180, a second vibration generating apparatus 30-2 disposed in or at the interior material 180 exposed at the indoor space, and a third vibration generating apparatus 30-3 disposed in or at the window 230, and thus, may output a sound by one or more of the exterior material and the interior material 180 as a sound vibration plate, thereby outputting sounds of one or more channels and/or a multi-channel surround stereo sound. Furthermore, the vehicular apparatus according to an example embodiment of the present disclosure may output a sound by using, as a sound vibration plate, a display panel of one or more of the displays 161 and 171 of one or more of the dashboard device 160 and the infotainment device 170 and may output a multi-channel sound and/or a multi-channel surround stereo sound, which are/is more realistic, through each of the first to third vibration generating apparatuses 30-1 to 30-3, the dashboard device 160, and the infotainment device 170.

Figure 19:
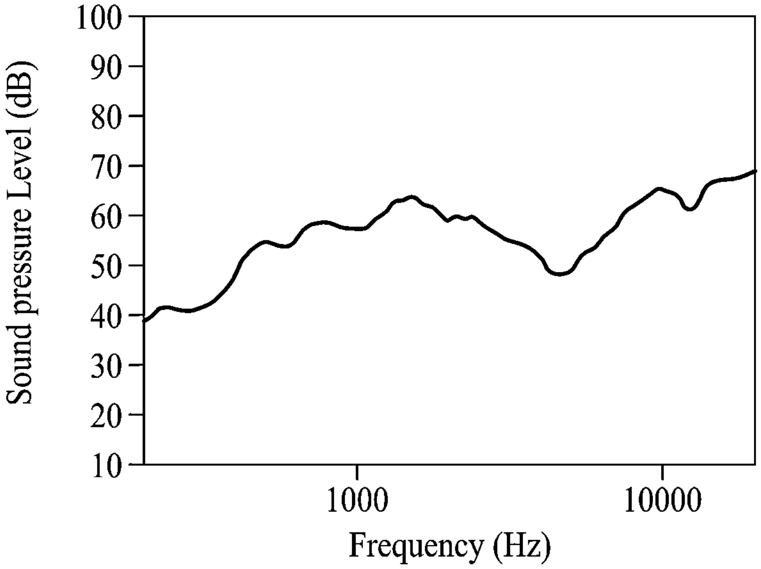
FIG. 19 illustrates a sound output characteristic of an apparatus according to an example embodiment of the present disclosure.

FIG. 19 illustrates a sound output characteristic of an apparatus according to an example embodiment of the present disclosure.

A sound output characteristic may be measured by a sound measurement apparatus. The sound measurement apparatus may include a sound card which transmits or receives a sound to or from a control personal computer (PC), an amplifier which amplifies a signal generated from the sound card and transfers the amplified signal to a vibration apparatus, and a microphone which collects a sound generated through the vibration apparatus in a display panel. For example, the microphone may be disposed at a center of the vibration apparatus, and a distance between the display panel and the microphone may be 30 cm. A sound may be measured under a condition where the microphone is vertical to the vibration apparatus. The sound collected through the microphone may be input to the control PC through the sound card, and a control program may check the input sound to analyze the sounds of the vibration apparatus. For example, a frequency response characteristic of a frequency range of 20 Hz to 20 kHz may be measured by using a pulse program. Measurement may be performed by applying ⅓ octave smoothing in a sine sweep within a range of 0.15 kHz to 20 kHz.

In FIG. 19, the abscissa axis represents a frequency in hertz (Hz), and the ordinate axis represents a sound pressure level (SPL) in decibel (dB). FIG. 19 is a sound output characteristic of a single crystal.

Referring to FIG. 19, it may be seen that a sound pressure level in a frequency of 0.2 kHz to 1 kHz is about 53.2 dB and a sound pressure level in a frequency of 1 kHz to 10 kHz is about 57.6 dB. Furthermore, it may be seen that a sound pressure level in a frequency of 10 kHz to 20 kHz is about 65.4 dB, and a sound pressure level in a frequency of 0.2 kHz to 20 kHz is about 54.9 dB.

Figure 20:
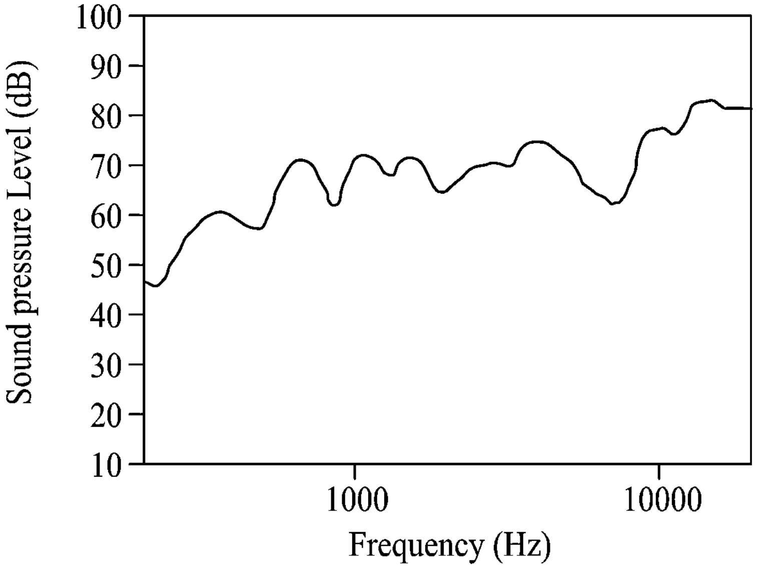
FIG. 20 illustrates a sound output characteristic of an apparatus according to an example embodiment of the present disclosure.

FIG. 20 illustrates a sound output characteristic of an apparatus according to another example embodiment of the present disclosure.

A method of measuring a sound output characteristic may be the same or substantially the same as the description provided above with reference to FIG. 19, and thus, its repetitive description may be omitted.

FIG. 20 is a sound output characteristic of a poly crystal. Referring to FIG. 20, it may be seen that a sound pressure level in a frequency of 0.2 kHz to 1 kHz is about 63.3 dB, and a sound pressure level in a frequency of 1 kHz to 10 kHz is about 69.5 dB. Furthermore, it may be seen that a sound pressure level in a frequency of 10 kHz to 20 kHz is about 80.3 dB, and a sound pressure level in a frequency of 0.2 kHz to 20 kHz is about 67.5 dB. Comparing with FIG. 19 corresponding to a single crystal, it may be seen that a sound pressure level characteristic increases (or is higher).

Figure 21:
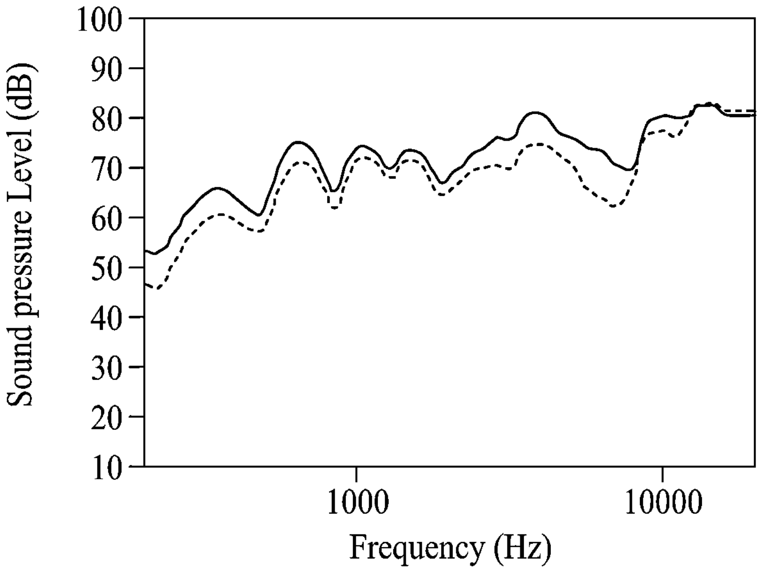
FIG. 21 illustrates a sound output characteristic of an apparatus according to an example embodiment of the present disclosure.

FIG. 21 illustrates a sound output characteristic of an apparatus according to another example embodiment of the present disclosure.

A method of measuring a sound output characteristic may be the same or substantially the same as the description provided above with reference to FIG. 19, and thus, its repetitive description may be omitted.

In FIG. 21, a solid line represents a sound output characteristic of the vibration apparatus of FIGS. 3A to 3C, and a dotted line represents a sound output characteristic of a poly crystal.

Referring to FIG. 21, in the solid line, it may be seen that a sound pressure level in a frequency of 0.2 kHz to 1 kHz is about 67.5 dB, and a sound pressure level in a frequency of 1 kHz to 10 kHz is about 73.9 dB. Further, it may be seen that a sound pressure level in a frequency of 10 kHz to 20 kHz is about 80.7 dB, and a sound pressure level in a frequency of 0.2 kHz to 20 kHz is about 74.2 dB. In the dotted line, as described above with reference to FIG. 20, it may be seen that a sound pressure level in a frequency of 0.2 kHz to 1 kHz is about 63.3 dB, and a sound pressure level in a frequency of 1 kHz to 10 kHz is about 69.5 dB. Furthermore, it may be seen that a sound pressure level in a frequency of 10 kHz to 20 kHz is about 80.3 dB, and a sound pressure level in a frequency of 0.2 kHz to 20 kHz is about 67.5 dB. Accordingly, comparing with a poly crystal, when a single crystal and a poly crystal according to an example embodiment of the present disclosure are provided, it may be seen that an average sound pressure level increases by about 7 dB or more. In addition, it may be seen that a sound pressure level of each of a low-pitched sound band and a middle-pitched sound band increases without the loss of a sound pressure level in a frequency of 8 kHz or more which is a high-pitched sound band. The low-pitched sound band may be 500 Hz or less, and the middle-pitched sound band is 500 Hz to 8 kHz, but embodiments of the present disclosure are not limited thereto.

Figure 22:
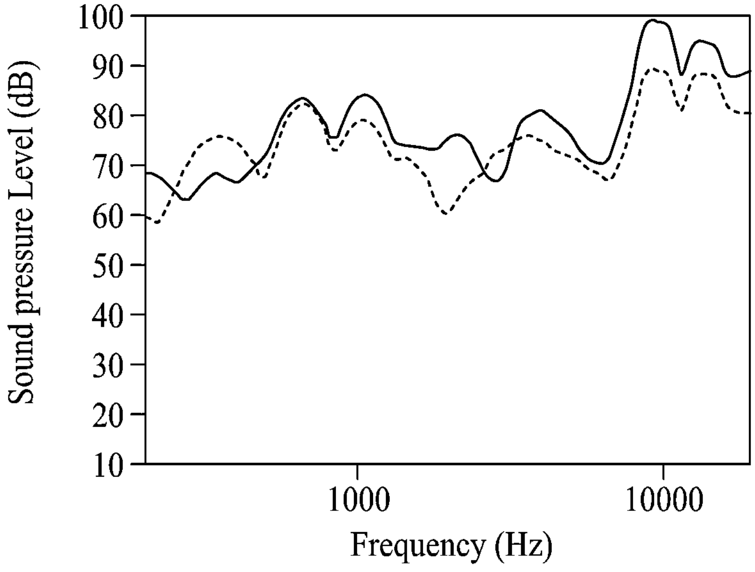
FIG. 22 illustrates a sound output characteristic of an apparatus according to an example embodiment of the present disclosure.

FIG. 22 illustrates a sound output characteristic of another apparatus according to an example embodiment of the present disclosure.

A method of measuring a sound output characteristic may be the same or substantially the same as the description provided above with reference to FIG. 19, and thus, its repetitive description may be omitted.

FIG. 22 shows a sound output characteristic with respect to a size of a poly crystal, a solid line represents that a widthwise length of a poly crystal is 12 cm and a lengthwise length of the poly crystal is 12 cm, and a dotted line represents that a widthwise length of a poly crystal is 6 cm and a lengthwise length of the poly crystal is 6 cm.

Referring to FIG. 22, in the solid line, it may be seen that a sound pressure level in a frequency of 0.2 kHz to 1 kHz is about 75.2 dB, and a sound pressure level in a frequency of 1 kHz to 10 kHz is about 77.5 dB. Further, it may be seen that a sound pressure level in a frequency of 10 kHz to 20 kHz is about 84.6 dB, and a sound pressure level in a frequency of 0.2 kHz to 20 kHz is about 77.9 dB. In the dotted line, as described above with reference to FIG. 20, it may be seen that a sound pressure level in a frequency of 0.2 kHz to 1 kHz is about 72.6 dB, and a sound pressure level in a frequency of 1 kHz to 10 kHz is about 72.3 dB. Furthermore, it may be seen that a sound pressure level in a frequency of 10 kHz to 20 kHz is about 92.1 dB, and a sound pressure level in a frequency of 0.2 kHz to 20 kHz is about 72.4 dB. Accordingly, it may be seen that an average sound pressure level increases by about 6 dB or more as a size (or an area) of the first vibration portion 131 including a poly crystal increases. According to an example embodiment of the present disclosure, because the first vibration portion 131 vibrates in a vertical direction ($d_{33}$ direction), a vibration characteristic may be enhanced as an area increases. A vibration characteristic may be enhanced as an area of the first vibration portion 131 increases, and thus, it may be seen that a sound pressure level characteristic is further enhanced.

Figure 23:
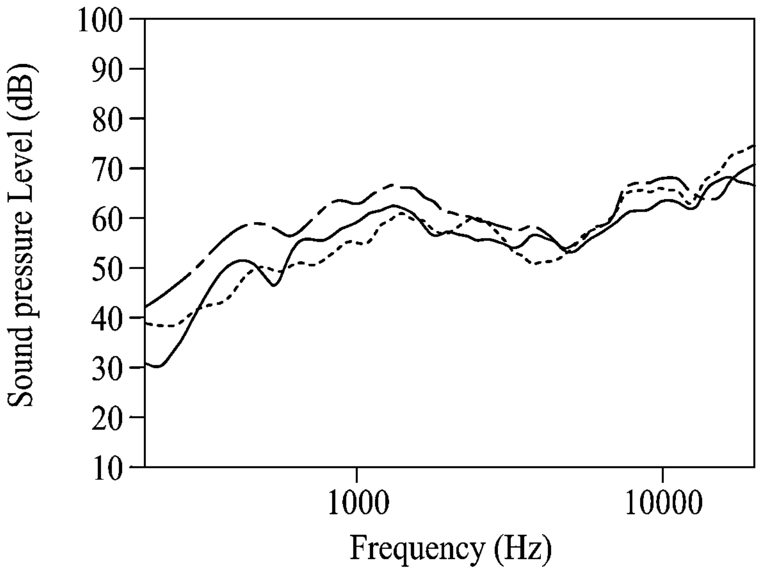
FIG. 23 illustrates a sound output characteristic of an apparatus according to an example embodiment of the present disclosure.

FIG. 23 illustrates a sound output characteristic of an apparatus according to another example embodiment of the present disclosure.

A method of measuring a sound output characteristic may be the same or substantially the same as the description provided above with reference to FIG. 19, and thus, its repetitive description may be omitted.

FIG. 23 shows a sound output characteristic with respect to an interval between single crystals. For example, FIG. 23 shows a sound output characteristic with respect to an interval between the second vibration portions 132-1 and 132-2 in FIGS. 5A and 6A. In FIG. 23, a dotted line represents that an interval between single crystals is 0 cm, a one-dot-dashed line represents that an interval between single crystals is 4 cm, and a solid line represents that an interval between single crystals is 8 cm. In the dotted line, it may be seen that a sound pressure level in a frequency of 0.2 kHz to 1 kHz is about 46.8 dB, and a sound pressure level in a frequency of 1 kHz to 10 kHz is about 58.0 dB. Further, it may be seen that a sound pressure level in a frequency of 10 kHz to 20 kHz is about 68.5 dB, and a sound pressure level in a frequency of 0.2 kHz to 20 kHz is about 55.6 dB. In addition, in the one-dot-dashed line, it may be seen that a sound pressure level in a frequency of 0.2 kHz to 1 kHz is about 55.3 dB, and a sound pressure level in a frequency of 1 kHz to 10 kHz is about 61.3 dB. Furthermore, it may be seen that a sound pressure level in a frequency of 10 kHz to 20 kHz is about 66.7 dB, and a sound pressure level in a frequency of 0.2 kHz to 20 kHz is about 60.0 dB. Moreover, in the solid line, it may be seen that a sound pressure level in a frequency of 0.2 kHz to 1 kHz is about 47.5 dB, and a sound pressure level in a frequency of 1 kHz to 10 kHz is about 57.9 dB. Further, it may be seen that a sound pressure level in a frequency of 10 kHz to 20 kHz is about 65.3 dB, and a sound pressure level in a frequency of 0.2 kHz to 20 kHz is about 55.4 dB.

A single crystal having a (011) crystal direction according to an example embodiment of the present disclosure may vibrate in a $d_{32}$ vibration mode (or an XY-axis vibration), and thus, an aspect ratio may affect a vibration characteristic. The single crystal having the (011) crystal direction may have a $d_{33}$ vibration mode (or a Z-axis vibration), and thus, when an apparatus is configured so that vibration interference by an aspect ratio and a single crystal phase is small, the $d_{32}$ vibration mode (or the XY-axis vibration) may be an effective vibration mode, thereby enhancing a sound pressure level of the low-pitched sound band.

When an interval between single crystals having the (011) crystal direction is 0 cm, the apparatus may be driven based on one single crystal, and thus, an aspect ratio may be reduced. Accordingly, the $d_{33}$ vibration mode (or the Z-axis vibration) may be effective, and thus, it may be seen that a sound pressure level of the high-pitched sound band (for example, 10 kHz to 20 kHz) is enhanced, but a sound pressure level of the low-pitched sound band (for example, 0.2 kHz to 1 kHz) is reduced.

When an interval between single crystals having the (011) crystal direction is 4 cm, the $d_{32}$ vibration mode (or the XY-axis vibration) may be reinforced without interfering in a $d_{33}$ vibration mode (or a Z-axis vibration) of each single crystal, and thus, it may be seen that a sound pressure level of the low-pitched sound band (for example, 0.2 kHz to 1 kHz) increases and a sound pressure level of the middle-pitched sound band (for example, 1 kHz to 10 kHz) increases.

When an interval between single crystals having the (011) crystal direction is 8 cm, an effect of reinforcing a $d_{32}$ vibration mode (or an XY-axis vibration) of each single crystal may be reduced, and thus, it may be seen that a sound pressure level of the low-pitched sound band and the high-pitched sound band is reduced.

A vibration apparatus according to one or more example embodiments of the present disclosure may be applied to a vibration apparatus provided in an apparatus. The apparatus according to one or more example embodiments of the present disclosure may be applied to mobile devices, video phones, smart watches, watch phones, wearable devices, foldable devices, rollable devices, bendable devices, flexible devices, curved devices, portable multimedia players (PMPs), personal digital assistants (PDAs), electronic organizers, desktop personal computers (PCs), laptop PCs, netbook computers, workstations, navigation devices, automotive navigation devices, automotive display apparatuses, televisions (TVs), wall paper display apparatuses, signage devices, game machines, notebook computers, monitors, cameras, camcorders, home appliances, and so on. Furthermore, the vibration apparatus according to one or more example embodiments of the present disclosure may be applied to organic light emitting lighting devices or inorganic light emitting lighting devices. In a case where the vibration apparatus according to one or more example embodiments of the present disclosure is applied to a lighting device, the lighting device may act as lighting and a speaker. Furthermore, in a case where the vibration apparatus according to one or more example embodiments of the present disclosure is applied to a mobile device, the vibration apparatus may be one or more of a speaker, a receiver, or a haptic device, but embodiments of the present disclosure are not limited thereto.

Apparatuses and features according to one or more example embodiments of the present disclosure are described below.

An apparatus according to one or more example embodiments of the present disclosure includes a vibration member, and a vibration apparatus provided at a rear surface of the vibration member to vibrate the vibration member. The vibration apparatus may include at least one or more first vibration portions and a plurality of second vibration portions different from the at least one or more first vibration portions, and the at least one or more first vibration portions may be at a periphery of the plurality of second vibration portions.

According to one or more embodiments of the present disclosure, the at least one or more first vibration portions may include polycrystalline ceramic, and the plurality of second vibration portions may include single crystalline ceramic.

According to one or more embodiments of the present disclosure, the at least one or more first vibration portions may have a tetragonal shape, and a lengthwise length of the tetragonal shape may be longer than a widthwise length of the tetragonal shape.

According to one or more embodiments of the present disclosure, the at least one or more first vibration portions may have a tetragonal shape or a circular shape.

According to one or more embodiments of the present disclosure, the plurality of second vibration portions may include a first one and a second one of the plurality of second vibration portions. According to one or more embodiments of the present disclosure, the plurality of second vibration portions may include a 2-1$^{st}$ vibration portion and a 2-2$^{nd}$ vibration portion.

According to one or more embodiments of the present disclosure, a widthwise length of each of the first one and the second one of the plurality of second vibration portions may be longer than a lengthwise length of a corresponding one of the first one and the second one of the plurality of second vibration portions. According to one or more embodiments of the present disclosure, a widthwise length of each of the 2-1$^{st}$ vibration portion and the 2-2$^{nd}$ vibration portion may be longer than a lengthwise length thereof.

According to one or more embodiments of the present disclosure, the apparatus may further include a first partition member surrounding a corresponding first vibration portion of the at least one or more first vibration portions; a second partition member surrounding the first one of the plurality of second vibration portions; and a third partition member surrounding the second one of the plurality of second vibration portions. According to one or more embodiments of the present disclosure, the apparatus may further include a first partition member surrounding a corresponding first vibration portion of the at least one or more first vibration portions, a second partition member surrounding the 2-1$^{st}$ vibration portion, and a third partition member surrounding the 2-2$^{nd}$ vibration portion.

According to one or more embodiments of the present disclosure, the at least one or more first vibration portions may include a first one, a second one, a third one and a fourth one of the at least one or more first vibration portions. The plurality of second vibration portions may include a first one and a second one of the plurality of second vibration portions. According to one or more embodiments of the present disclosure, the at least one or more first vibration portions may include a 1-1$^{st}$ vibration portion, a 1-2$^{nd}$ vibration portion, a 1-3$^{rd}$ vibration portion, and a 1-4$^{th}$ vibration portion, and the plurality of second vibration portions may include a 2-1$^{st}$ vibration portion and a 2-2$^{nd}$ vibration portion.

According to one or more embodiments of the present disclosure, the first one, the second one, the third one and the fourth one of the at least one or more first vibration portions may be at a periphery of the first one and the second one of the plurality of second vibration portions. According to one or more embodiments of the present disclosure, the 1-1$^{st}$ to 1-4$^{th}$ vibration portions may be at a periphery of the 2-1$^{st}$ vibration portion and the 2-2$^{nd}$ vibration portion.

According to one or more embodiments of the present disclosure, the apparatus may further include a first partition member surrounding the first one and the second one of the at least one or more first vibration portions; a second partition member surrounding the third one and the fourth one of the at least one or more first vibration portions; and a third partition member surrounding the first one and the second one of the plurality of second vibration portions. According to one or more embodiments of the present disclosure, the apparatus may further include a first partition member surrounding the 1-1$^{st}$ vibration portion and the 1-2$^{nd}$ vibration portion, a second partition member surrounding the 1-3$^{nd}$ vibration portion and the 1-4$^{th}$ vibration portion, and a third partition member surrounding the 2-1$^{st}$ vibration portion and the 2-2$^{nd}$ vibration portion.

According to one or more embodiments of the present disclosure, each of the first one, the second one, the third one and the fourth one of the at least one or more first vibration portions and each of the first one and the second one of the plurality of second vibration portions may be configured to be supplied with an independent sound signal. According to one or more embodiments of the present disclosure, each of the 1-1$^{st}$ to 1-4$^{th}$ vibration portions and each of the 2-1$^{st}$ and 2-2$^{nd}$ vibration portions may be supplied with an independent sound signal.

According to one or more embodiments of the present disclosure, each of the at least one or more first vibration portions and the plurality of second vibration portions may include a vibration layer, a first electrode portion at a first surface of the vibration layer, and a second electrode portion at a surface different from the first surface of the vibration layer.

According to one or more embodiments of the present disclosure, the apparatus may further include a first cover member at the first electrode portion, and a second cover member at the second electrode portion.

According to one or more embodiments of the present disclosure, the first cover member and the second cover member may include different materials.

According to one or more embodiments of the present disclosure, one of the first cover member and the second cover member may include an adhesive member.

According to one or more embodiments of the present disclosure, the apparatus may further include a first adhesive layer between the first cover member and the first electrode portion, and a second adhesive layer between the second cover member and the second electrode portion.

According to one or more embodiments of the present disclosure, the vibration member may include a metal material, or may include a single nonmetal or composite nonmetal material including one or more of wood, rubber, plastic, glass, fiber, cloth, paper, a mirror, and leather.

According to one or more embodiments of the present disclosure, the vibration member may include one or more of a display panel including a plurality of pixels configured to display an image, a light emitting diode lighting panel, an organic light emitting diode lighting panel, or an inorganic light emitting diode lighting panel.

According to one or more embodiments of the present disclosure, the vibration member may include one or more of a display panel including a pixel configured to display an image, a screen panel on which an image is to be projected from a display apparatus, a lighting panel, a signage panel, a vehicular interior material, a vehicular glass window, a vehicular external material, a ceiling material of a building, an interior material of a building, a window of a building, an interior material of an aircraft, a window of an aircraft, metal, wood, rubber, plastic, glass, fiber, cloth, paper, leather, and a mirror.

According to one or more embodiments of the present disclosure, the vibration member may include a first region and a second region, and the vibration apparatus may be disposed in or at one or more of the first region and the second region.

An apparatus according to one or more embodiments of the present disclosure may include a vibration member, and a vibration apparatus provided on a rear surface of the vibration member to vibrate the vibration member. The vibration apparatus may include a plate connected to a rear surface of the vibration member, the vibration apparatus may include at least one or more first vibration portions and a plurality of second vibration portions different from the at least one or more first vibration portions, and the at least one or more first vibration portions may be at a periphery of the plurality of second vibration portions.

According to one or more embodiments of the present disclosure, the plate may include a plurality of opening portions arranged to allow sound waves to be concentrated on the vibration member.

According to one or more embodiments of the present disclosure, the plate may have a mesh shape.

An apparatus according to one or more embodiments of the present disclosure may include an exterior material covering a main structure, an interior material covering one or more of the main structure and the exterior material, and one or more vibration generating apparatuses in or at one or more of (a) the exterior material, (b) the interior material, (c) a region between the main structure and the exterior material, and (d) a region between the main structure and the interior material. The apparatus may include a vibration member. The one or more vibration generating apparatuses may include a vibration apparatus. The vibration apparatus may be provided on or at a rear surface of the vibration member to vibrate the vibration member. The vibration apparatus may include at least one or more first vibration portions and a plurality of second vibration portions different from the at least one or more first vibration portions, and the at least one or more first vibration portions may be at a periphery of the plurality of second vibration portions. The vibration member may be the exterior material or the interior material, and one or more of the exterior material and the interior material may be configured to output a sound based on vibrations of the one or more vibration generating apparatuses.

According to one or more embodiments of the present disclosure, the interior material may include one or more materials of wood, rubber, plastic, glass, fiber, cloth, paper, metal, and leather.

According to one or more embodiments of the present disclosure, the interior material may include at least one or more of a vehicular dashboard, a pillar interior material, a roof interior material, a door interior material, a seat interior material, a handle interior material, a floor interior material, and a rear package interior material, and the one or more vibration generating apparatuses may be configured to vibrate at least one or more of the vehicular dashboard, the pillar interior material, the roof interior material, the door interior material, the seat interior material, the handle interior material, the floor interior material, and the rear package interior material.

According to one or more embodiments of the present disclosure, the apparatus may include a window, and a transparent vibration generating apparatus disposed at the window.

According to one or more embodiments of the present disclosure, the window may include at least one or more of a front window, a side window, a rear window, and a roof window of a vehicular apparatus, and the transparent vibration generating apparatus may be configured to vibrate at least one or more of the front window, the side window, the rear window, and the roof window.

According to one or more embodiments of the present disclosure, the one or more vibration generating apparatuses may include a first one and a second one of the one or more vibration generating apparatuses. Each of the first one and the second one of the one or more vibration generating apparatuses may include the vibration apparatus. With respect to the first one of the one or more vibration generating apparatuses disposed at a position close to an ear of a passenger of the apparatus, the corresponding at least one or more first vibration portions, rather than the corresponding plurality of second vibration portions, may be disposed at a center of the vibration member. With respect to the second one of the one or more vibration generating apparatuses disposed at a position far away from the ear of the passenger, the corresponding plurality of second vibration portions, rather than the corresponding at least one or more first vibration portions, may be disposed at the center of the vibration member. According to one or more embodiments of the present disclosure, a vibration generating apparatus disposed at a position close to an ear of a passenger of the apparatus may be a vibration apparatus where the first vibration portion is disposed at a center of the vibration member compared to the second vibration portion, and a vibration generating apparatus disposed at a position far away from the ear of the passenger may be a vibration apparatus where the second vibration portion is disposed at the center of the vibration member compared to the first vibration portion. According to one or more embodiments of the present disclosure, the one or more vibration generating apparatuses may include a first vibration generating apparatus arranged to be disposed at a position close to an ear of a passenger of the apparatus, the first vibration generating apparatus may include a vibration apparatus where the first vibration portion is disposed at a center of the vibration member compared to the second vibration portion, and a second vibration generating apparatus arranged to be disposed at a position far away from the ear of the passenger, the second vibration generating apparatus may include a vibration apparatus where the second vibration portion is disposed at the center of the vibration member compared to the first vibration portion.

According to one or more embodiments of the present disclosure, the one or more vibration generating apparatuses may include a first one and a second one of the one or more vibration generating apparatuses. Each of the first one and the second one of the one or more vibration generating apparatuses may include the vibration apparatus. With respect to the first one of the one or more vibration generating apparatuses disposed at a position close to an ear of a passenger of the apparatus, an area of one of the corresponding at least one or more first vibration portions may be greater than an area of one of the corresponding plurality of second vibration portions. With respect to the second one of the one or more vibration generating apparatuses disposed at a position far away from the ear of the passenger, an area of one of the corresponding at least one or more first vibration portions may be less than an area of one of the corresponding plurality of second vibration portions. According to one or more embodiments of the present disclosure, a vibration generating apparatus disposed at a position close to an ear of a passenger of the apparatus may be a vibration apparatus where an area of the first vibration portion is greater than an area of the second vibration portion, and a vibration generating apparatus disposed at a position far away from the ear of the passenger may be a vibration apparatus where an area of the first vibration portion is less than an area of the second vibration portion. According to one or more embodiments of the present disclosure, the one or more vibration generating apparatuses may include a first vibration generating apparatus arranged to be disposed at a position close to an ear of a passenger of the apparatus, the first vibration generating apparatus may include a vibration apparatus where an area of the first vibration portion is greater than an area of the second vibration portion, and a second vibration generating apparatus arranged to be disposed at a position far away from the ear of the passenger, the second vibration generating apparatus may include a vibration apparatus where an area of the first vibration portion is less than an area of the second vibration portion.

An apparatus according to one or more embodiments of the present invention may include a vibration apparatus which vibrates a display panel or a vibration member, and thus, may generate a sound so that a sound travels toward a front surface of the display panel or the vibration member.

An apparatus according to one or more embodiments of the present invention may include a vibration apparatus including a single crystal and a poly crystal, and thus, may complement a sound characteristic and/or a sound pressure level characteristic of a low-pitched sound band based on the single crystal, thereby providing an apparatus having a sound characteristic and/or a sound pressure level characteristic in a uniform pitched sound band.

It will be apparent to those skilled in the art that various modifications and variations can be made in the apparatus of the present disclosure without departing from the technical idea or scope of the present disclosure. Thus, it is intended that the present disclosure covers the modifications and variations of this disclosure provided they come within the scope of the appended claims and their equivalents.

What is claimed is:

1. An apparatus, comprising:

a vibration member; and a vibration apparatus provided at a rear surface of the vibration member to vibrate the vibration member, wherein the vibration apparatus comprises at least one or more first vibration portions and a plurality of second vibration portions different from the at least one or more first vibration portions, wherein the at least one or more first vibration portions are at a periphery of the plurality of second vibration portions, wherein the plurality of second vibration portions are disposed above and below the at least one or more first vibration portions in plan view, and wherein the plurality of second vibration portions as a group are vertically aligned with the at least one or more first vibration portions as a group in plan view.

2. The apparatus of claim 1, wherein the at least one or more first vibration portions comprise polycrystalline ceramic, and wherein the plurality of second vibration portions comprise single crystalline ceramic.

3. The apparatus of claim 1, wherein the at least one or more first vibration portions have a tetragonal shape, and wherein a lengthwise length of the tetragonal shape is longer than a widthwise length of the tetragonal shape.

4. The apparatus of claim 1, wherein the at least one or more first vibration portions have a tetragonal shape or a circular shape.

5. The apparatus of claim 1, wherein a widthwise length of each of the plurality of second vibration portions is longer than a lengthwise length of a corresponding one of the plurality of second vibration portions.

6. The apparatus of claim 1, further comprising:

a first partition member surrounding a corresponding first vibration portion of the at least one or more first vibration portions;

a second partition member surrounding one of the plurality of second vibration portions; and a third partition member surrounding another one of the plurality of second vibration portions.

7. The apparatus of claim 1, wherein the at least one or more first vibration portions comprise four vibration portions, and the plurality of second vibration portions comprise two vibration portions, wherein the four vibration portions of the at least one or more first vibration portions are at a periphery of the two vibration portions of the plurality of second vibration portions.

8. The apparatus of claim 1, wherein the at least one or more first vibration portions comprise four vibration portions, and the plurality of second vibration portions comprise two vibration portions, and:

wherein the apparatus comprises:

a first partition member surrounding two of the four vibration portions of the at least one or more first vibration portions;

a second partition member surrounding remaining two of the four vibration portions of the at least one or more first vibration portions; and a third partition member surrounding the two vibration portions of the plurality of second vibration portions.

9. The apparatus of claim 1, wherein the at least one or more first vibration portions comprise four vibration portions, and the plurality of second vibration portions comprise two vibration portions, and wherein each of the four vibration portions of the at least one or more first vibration portions and each of the two vibration portions of the plurality of second vibration portions are configured to be supplied with an independent sound signal.

10. The apparatus of claim 1, wherein each of the at least one or more first vibration portions and the plurality of second vibration portions comprises:

a vibration layer;

a first electrode portion at a first surface of the vibration layer; and a second electrode portion at a surface different from the first surface of the vibration layer.

11. The apparatus of claim 10, further comprising:

a first cover member at the first electrode portion; and a second cover member at the second electrode portion.

12. The apparatus of claim 11, wherein the first cover member and the second cover member comprise different materials.

13. The apparatus of claim 12, wherein one of the first cover member and the second cover member comprise an adhesive member.

14. The apparatus of claim 11, further comprising:

a first adhesive layer between the first cover member and the first electrode portion; and a second adhesive layer between the second cover member and the second electrode portion.

15. The apparatus of claim 1, wherein the vibration member comprises a metal material, or comprises a single nonmetal or composite nonmetal material including one or more of wood, rubber, plastic, glass, fiber, cloth, paper, a mirror, and leather.

16. The apparatus of claim 1, wherein the vibration member comprises one or more of a display panel, a light emitting diode lighting panel, an organic light emitting diode lighting panel, an inorganic light emitting diode lighting panel, a screen panel, a lighting panel, a signage panel, a vehicular interior material, a vehicular glass window, a vehicular external material, a ceiling material of a building, an interior material of a building, a window of a building, an interior material of an aircraft, a window of an aircraft, metal, wood, rubber, plastic, glass, fiber, cloth, paper, leather, and a mirror, wherein the display panel includes a plurality of pixels configured to display an image, and wherein an image is to be projected on the screen panel from a display apparatus.

17. The apparatus of claim 1, wherein the vibration member comprises a first region and a second region, and the vibration apparatus is disposed at one or more of the first region and the second region.

18. An apparatus, comprising:

a vibration member; and a vibration apparatus provided at a rear surface of the vibration member to vibrate the vibration member, wherein the vibration apparatus comprises a plate connected to the rear surface of the vibration member, wherein the vibration apparatus comprises at least one or more first vibration portions and a plurality of second vibration portions different from the at least one or more first vibration portions, wherein the at least one or more first vibration portions are at a periphery of the plurality of second vibration portions, and wherein the plate comprises a plurality of opening portions arranged to allow sound waves to be concentrated on the vibration member.

19. The apparatus of claim 18, wherein the plate has a mesh shape.

20. The apparatus of claim 1, wherein:

an exterior material covers a main structure;

an interior material covers one or more of the main structure and the exterior material;

one or more vibration generating apparatuses are disposed at one or more of the exterior material, the interior material, a region between the main structure and the exterior material, and a region between the main structure and the interior material;

the one or more vibration generating apparatuses comprise the vibration apparatus;

the vibration member is the exterior material or the interior material; and one or more of the exterior material and the interior material are configured to output a sound based on vibrations of the one or more vibration generating apparatuses.

21. The apparatus of claim 20, wherein the interior material comprises one or more materials of wood, rubber, plastic, glass, fiber, cloth, paper, metal, and leather.

22. The apparatus of claim 20, wherein the interior material comprises at least one or more of a vehicular dashboard, a pillar interior material, a roof interior material, a door interior material, a seat interior material, a handle interior material, a floor interior material, and a rear package interior material, and wherein the one or more vibration generating apparatuses are configured to vibrate at least one or more of the vehicular dashboard, the pillar interior material, the roof interior material, the door interior material, the seat interior material, the handle interior material, the floor interior material, and the rear package interior material.

23. The apparatus of claim 20, comprising:

a window; and a transparent vibration generating apparatus disposed at the window.

24. The apparatus of claim 23, wherein the window comprises at least one or more of a front window, a side window, a rear window, and a roof window of a vehicular apparatus, and wherein the transparent vibration generating apparatus is configured to vibrate at least one or more of the front window, the side window, the rear window, and the roof window.

25. The apparatus of claim 20, wherein:

one or more vibration members are disposed to correspond to the one or more vibration generating apparatuses, respectively;

each of the one or more vibration members comprises the vibration member;

each of the one or more vibration generating apparatuses comprises the vibration apparatus;

with respect to one of the one or more vibration generating apparatuses configured to be located at a first distance from an object receiving a sound from the corresponding vibration member, the corresponding at least one or more first vibration portions are disposed at a center of the corresponding vibration member, and the corresponding plurality of second vibration portions are not disposed at the center of the corresponding vibration member;

with respect to the another one of the one or more vibration generating apparatuses configured to be located at a second distance from the object receiving a sound from the corresponding vibration member, the corresponding plurality of second vibration portions are disposed at a center of the corresponding vibration member, and the corresponding at least one or more first vibration portions are not disposed at the center of the corresponding vibration member; and the first distance is shorter than the second distance.

26. The apparatus of claim 20, wherein:

one or more vibration members are disposed to correspond to the one or more vibration generating apparatuses, respectively;

each of the one or more vibration members comprises the vibration member;

each of the one or more vibration generating apparatuses comprises the vibration apparatus;

with respect to one of the one or more vibration generating apparatuses configured to be located at a first distance from an object receiving a sound from the corresponding vibration member, an area of one of the corresponding at least one or more first vibration portions is greater than an area of one of the corresponding plurality of second vibration portions;

with respect to another one of the one or more vibration generating apparatuses configured to be located at a second distance from the object receiving a sound from the corresponding vibration member, an area of one of the corresponding at least one or more first vibration portions is less than an area of one of the corresponding plurality of second vibration portions; and the first distance is shorter than the second distance.

27. The apparatus of claim 1, wherein the at least one or more first vibration portions are disposed at a center of the vibration member, and wherein each of the at least one or more first vibration portions and the plurality of second vibration portions is configured to generate a vibration.

28. The apparatus of claim 1, wherein a center of each of the plurality of second vibration portions is vertically aligned with a center of each of the at least one or more first vibration portions in plan view.

29. The apparatus of claim 1, wherein a largest gap between any one of the plurality of second vibration portions and any one of the at least one or more first vibration portions is less than a largest widthwise length of any one of the plurality of second vibration portions and the at least one or more first vibration portions.

30. The apparatus of claim 1, wherein the plurality of second vibration portions and the at least one or more first vibration portions are disposed in a localized region without being laterally distributed across the rear surface of the vibration member in plan view.

* * * * *